United States Patent
Cirik et al.

(10) Patent No.: US 12,464,535 B2
(45) Date of Patent: Nov. 4, 2025

(54) METHODS, DEVICES, AND APPARATUSES FOR BEAM MANAGEMENT

(71) Applicant: Ofinno, LLC, Reston, VA (US)

(72) Inventors: Ali Cagatay Cirik, Chantilly, VA (US); Esmael Hejazi Dinan, McLean, VA (US); Hua Zhou, Vienna, VA (US); Hyoungsuk Jeon, Centreville, VA (US); Alireza Babaei, Fairfax, VA (US); Kyungmin Park, Vienna, VA (US); Kai Xu, Great Falls, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/635,356

(22) Filed: Apr. 15, 2024

(65) Prior Publication Data

US 2025/0089056 A1 Mar. 13, 2025

Related U.S. Application Data

(63) Continuation of application No. 17/850,532, filed on Jun. 27, 2022, now Pat. No. 11,991,720, which is a
(Continued)

(51) Int. Cl.
*H04W 72/23* (2023.01)
*H04B 7/06* (2006.01)
(Continued)

(52) U.S. Cl.
CPC ........ *H04W 72/23* (2023.01); *H04B 7/06964* (2023.05); *H04B 7/06968* (2023.05);
(Continued)

(58) Field of Classification Search
CPC ... H04W 72/23; H04W 72/046; H04W 80/02; H04B 7/0695; H04B 7/088; H04L 5/0051; H04L 5/10; H04L 25/0226
See application file for complete search history.

(56) References Cited

U.S. PATENT DOCUMENTS 10,651,917 B2    5/2020   John Wilson et al.
10,856,316 B2   12/2020   Liou et al.
(Continued)

FOREIGN PATENT DOCUMENTS

CN    108199819 A    6/2018
EP      3319244 A1   5/2018

OTHER PUBLICATIONS

Mar. 25, 2020—European Extended Search Report—EP 20151054.2.
(Continued)

*Primary Examiner* — Chae S Lee
(74) *Attorney, Agent, or Firm* — Patrick Moon; Kavon Nasabzadeh; Jacob L. Mangan

(57) ABSTRACT

Wireless communications are described. A wireless device and/or a base station may determine/select one or more beams for transmission of signals (e.g., sounding reference signals, SRSs) in one or more cells. The wireless device and/or the base station may determine/select a beam based on one or more of: cell indicators of a first cell and/or a second cell, antenna panel indicators associated with SRS transmissions, priorities of SRS transmissions, resource set indicators corresponding to the SRS transmissions, and/or other information.

18 Claims, 27 Drawing Sheets

Related U.S. Application Data continuation of application No. 16/738,502, filed on Jan. 9, 2020, now Pat. No. 11,405,092.

(60) Provisional application No. 62/790,753, filed on Jan. 10, 2019, provisional application No. 62/790,317, filed on Jan. 9, 2019.

(51) Int. Cl.

| | | |
|---|---|---|
| *H04B 7/08* | (2006.01) | |
| *H04L 5/00* | (2006.01) | |
| *H04L 5/10* | (2006.01) | |
| *H04L 25/02* | (2006.01) | |
| *H04W 72/044* | (2023.01) | |
| *H04W 80/02* | (2009.01) | |

(52) U.S. Cl.
CPC ........... *H04B 7/088* (2013.01); *H04L 5/0051* (2013.01); *H04L 5/10* (2013.01); *H04L 25/0226* (2013.01); *H04W 72/046* (2013.01); *H04W 80/02* (2013.01)

(56) References Cited

U.S. PATENT DOCUMENTS

| | | | |
|---|---|---|---|
| 10,925,083 B2 | 2/2021 | Lee et al. | |
| 10,931,355 B2 | 2/2021 | Huang | |
| 10,931,389 B2 | 2/2021 | Lee et al. | |
| 10,952,231 B2 | 3/2021 | Liou | |
| 10,986,622 B2 | 4/2021 | Zhang et al. | |
| 11,006,403 B2 | 5/2021 | Zhang et al. | |
| 11,882,580 B2 | 1/2024 | Song et al. | |
| 2017/0237478 A1 | 8/2017 | Kwak et al. | |
| 2019/0027363 A1 | 1/2019 | Im et al. | |
| 2019/0104477 A1 | 4/2019 | MolavianJazi et al. | |
| 2019/0320469 A1 | 10/2019 | Huang et al. | |
| 2019/0342907 A1 | 11/2019 | Huang et al. | |
| 2020/0204246 A1 | 6/2020 | Zhou et al. | |
| 2020/0221405 A1* | 7/2020 | Zarifi | H04W 52/50 |
| 2020/0221435 A1 | 7/2020 | Kim et al. | |
| 2020/0221485 A1 | 7/2020 | Cirik et al. | |
| 2020/0288479 A1 | 9/2020 | Xi et al. | |
| 2020/0337058 A1 | 10/2020 | Song et al. | |
| 2021/0045141 A1 | 2/2021 | Lee et al. | |
| 2021/0051667 A1 | 2/2021 | Yang et al. | |
| 2021/0159966 A1* | 5/2021 | Xi | H04B 7/0695 |
| 2021/0167821 A1* | 6/2021 | Chen | H04B 7/0617 |
| 2021/0168714 A1 | 6/2021 | Guan et al. | |
| 2021/0212098 A1 | 7/2021 | Yoon et al. | |
| 2021/0250152 A1 | 8/2021 | Zhang et al. | |
| 2021/0337453 A1 | 10/2021 | Gao et al. | |
| 2021/0345390 A1* | 11/2021 | Okamura | H04B 7/0695 |
| 2021/0409091 A1* | 12/2021 | Svedman | H04B 7/088 |
| 2021/0409094 A1 | 12/2021 | Yuan et al. | |
| 2022/0116247 A1 | 4/2022 | Sengupta et al. | |
| 2023/0115798 A1 | 4/2023 | Lee et al. | |

OTHER PUBLICATIONS

R1-1807958 3GPP TSG RAN1 Meeting #93, Busan, Korea, May 21-25, 2018, Source: Nokia, Title: CR to 38.214 capturing the RAN1#92bis and RAN1#93 meeting agreements.
R1-1810256 3GPP TSG RAN WG1 Meeting #94bis, Chengdu, China, Oct. 8-12, 2018, Source: LG Electronics, Title: Remaining issues on downlink control channel.
R1-1814380 3GPP TSG-RAN WG1 Meeting #95, Spokane, USA, Nov. 12-16, 2018, Source: Samsung, Title: CR to 38.213 capturing the RAN1#94bis and RAN1#95 meeting agreements.
R1-1814400 3GPP TSG-RAN WG1 Meeting #95, Spokane, USA, Nov. 12-16, 2018, Source: Huawei, Title: Combined CR of all essential corrections to 38.212 from RAN1#94bis and RAN1#95.
3GPP TS 38.213 V15.3.0 (Sep. 2018); Technical Specification; 3rd Generation Partnership Project; Technical Specification Group Radio Access Network; NR; Physical layer procedures for control (Release 15).
R1-1814395 3GPP TSG-RAN WG1 Meeting #95, Spokane, USA, Nov. 12-16, 2018, Source: Nokia, Title: Combined CR of all essential corrections to 38.214 from RAN1#94bis and RAN1#95.
3GPP TS 38.214 V15.3.0 (Sep. 2018); Technical Specification; 3rd Generation Partnership Project; Technical Specification Group Radio Access Network; NR; Physical layer procedures for data (Release 15).
3GPP TS 38.321 V15.3.0 (Sep. 2018); Technical Specification; 3rd Generation Partnership Project; Technical Specification Group Radio Access Network; NR; Medium Access Control (MAC) protocol specification (Release 15).
3GPP TS 38.331 V15.3.0 (Sep. 2018), Technical Specification, 3rd Generation Partnership Project; Technical Specification Group Radio Access Network; NR; Radio Resource Control (RRC) Protocol Specification (Release 15).
R2-1818749 3GPP TSG-RAN WG2 Meeting #104, Spokane, USA, Nov. 12-16, 2018, Source: Samsung, Title: Miscellaneous corrections.
R1-1809881 3GPP TSG-RAN WG1 Meeting #94, Gothenburg, Sweden, Aug. 20-24, 2018, Source: [RAN1], Intel, Title: draft LS on UE behaviour on reception of channels or RS in the same OFDM symbol.
R1-181xxxx 3GPP TSG-RAN WG1 Meeting #95, Spokane, USA, Nov. 12-16, 2018, Source: Intel Corporation, Title: Summary for simultaneous Tx and Rx of channels and RS.
R1-1808142 3GPP TSG-RAN WG1 Meeting #94, Gothenburg, Sweden, Aug. 20-24, 2018, Source: Huawei, HiSilicon, Title: Remaining issues on simultaneous reception or transmission over CCs and BWPs.
R1-1808198 3GPP TSG-RAN WG1 Meeting #94, Gothenburg, Sweden, Aug. 20-24, 2018, Source: ZTE, Title: Simultaneous transmission and reception of different channels and reference signals.
R1-1808199 3GPP TSG-RAN WG1 Meeting #94, Gothenburg, Sweden, Aug. 20-24, 2018, Source: ZTE, Title: Enhancements on multi-beam operation.
R1-1808223 3GPP TSG-RAN WG1 Meeting #94, Gothenburg, Sweden, Aug. 20-24, 2018, Source: vivo, Title: Remaining issues on simultaneous reception of DL/UL physical channels and RSs.
R1-1808265 3GPP TSG-RAN WG1 Meeting #94, Gothenburg, Sweden, Aug. 20-24, 2018, Source: MediaTek Inc., Title: Discussions on simultaneous reception and transmission across CCs.
R1-1808377 3GPP TSG-RAN WG1 Meeting #94, Gothenburg, Sweden, Aug. 20-24, 2018, Source: CATT, Title: Discussion on simultaneous transmission and reception of physical signals/channels.
R1-1808489 3GPP TSG-RAN WG1 Meeting #94, Gothenburg, Sweden, Aug. 20-24, 2018, Source: LG Electronics, Title: Remaining issues on simultaneous Tx/Rx.
R1-1808671 3GPP TSG-RAN WG1 Meeting #94, Gothenburg, Sweden, Aug. 20-24, 2018, Source: Intel Corporation, Title: Simultaneous Tx and Rx of channels and RS.
R1-1808752 3GPP TSG-RAN WG1 Meeting #94, Gothenburg, Sweden, Aug. 20-24, 2018, Source: Samsung, Title: Simultaneous reception of physical channels and reference signals.
R1-1809140 3GPP TSG-RAN WG1 Meeting #94, Gothenburg, Sweden, Aug. 20-24, 2018, Source: NTT Docomo, Inc., Title: Simultaneous Tx/Rx of UL/DL physical channels and reference signals.
R1-1809199 3GPP TSG-RAN WG1 Meeting #94, Gothenburg, Sweden, Aug. 20-24, 2018, Source: Ericsson, Title: On simultaneous transmission and reception in FR2.
R1-1809240 3GPP TSG-RAN WG1 Meeting #94, Gothenburg, Sweden, Aug. 20-24, 2018, Source: Nokia, Nokia Shanghai Bell, Title: On simultaneous transmission and reception of multiplexed channels.
R1-1809425 3GPP TSG-RAN WG1 Meeting #94, Gothenburg, Sweden, Aug. 20-24, 2018, Source: Qualcomm Incorporated, Title: Details on simultaneous reception/transmission of PHY channels and RS in FR2.

(56) References Cited

OTHER PUBLICATIONS

R1-1809820 3GPP TSG-RAN WG1 Meeting #94, Gothenburg, Sweden, Aug. 20-24, 2018, Source: Intel Corporation, Title: Summary of simultaneous Rx and Tx.
R1-1809882 3GPP TSG-RAN WG1 Meeting #94, Gothenburg, Sweden, Aug. 20-24, 2018, Source: Intel Corporation, Title: Guidance on simultaneous reception of channels or RS.
R1-1810102 3GPP TSG RAN WG1 Meeting #94bis, Chengdu, China, Oct. 8-12, 2018, Source: Huawei, HiSilicon, Title: Remaining issues on simultaneous reception or transmission over CC/BWP(s).
R1-1810216 3GPP TSG RAN WG1 Meeting #94bis, Chengdu, China, Oct. 8-12, 2018, Source: ZTE, Title: Simultaneous transmission and reception of channels/signals.
R1-1810368 3GPP TSG RAN WG1 Meeting #94bis, Chengdu, China, Oct. 8-12, 2018, Source: vivo, Title: Maintenance for simultaneous reception of DL/UL physical channels and RSs.
R1-1810753 3GPP TSG RAN WG1 Meeting #94bis, Chengdu, China, Oct. 8-12, 2018, Source: Intel Corporation, Title: Simultaneous Tx and Rx of channels and RS.
R1-1810841 3GPP TSG RAN WG1 Meeting #94bis, Chengdu, China, Oct. 8-12, 2018, Source: Samsung, Title: Simultaneous reception of physical channels and reference signals.
R1-1811233 3GPP TSG RAN WG1 Meeting #94bis, Chengdu, China, Oct. 8-12, 2018, Source: Qualcomm Incorporated, Title: Details on simultaneous reception/transmission of PHY channels and RS in FR2.
R1-1811353 3GPP TSG RAN WG1 Meeting #94bis, Chengdu, China, Oct. 8-12, 2018, Source: NTT Docomo, Inc., Title: Simultaneous Tx/Rx for physical channels.
R1-1811549 3GPP TSG RAN WG1 Meeting #94bis, Chengdu, China, Oct. 8-12, 2018, Source: Ericsson, Title: On simultaneous transmission and reception in FR2.
R1-1811820 3GPP TSG RAN WG1 Meeting #94bis, Chengdu, China, Oct. 8-12, 2018, Source: NTT Docomo, Inc., Title: Offline summary for PDCCH structure and search space.
R1-1812004 3GPP TSG RAN WG1 Meeting #94bis, Chengdu, China, Oct. 8-12, 2018, Source: Intel Corporation, Title: Summary of simultaneous Rx and Tx.
R1-1812241 3GPP TSG RAN WG1 Meeting #95, Spokane, USA, Nov. 12-16, 2018, Source: Huawei, HiSilicon, Title: Simultaneous Rx or Tx over CC/BWP(s).
R1-1812268 3GPP TSG RAN WG1 Meeting #95, Spokane, USA, Nov. 12-16, 2018, Source: ZTE, Title: Discussion on draft CR on simultaneous transmission and reception.
R1-1812268 3GPP TSG RAN WG1 Meeting #95, Spokane, USA, Nov. 12-16, 2018, Source: ZTE, Title: Draft CR to TS 38.213 on simultaneous transmission of CORESET+PDSCH.
R1-1812287 3GPP TSG RAN WG1 Meeting #95, Spokane, USA, Nov. 12-16, 2018, Source: vivo, Title: Draft CR on simultaneous reception of DL/UL physical channels and RSs.
R1-1812287 3GPP TSG RAN WG1 Meeting #95, Spokane, USA, Nov. 12-16, 2018, Source: vivo, Title: CR on simultaneous reception of DL/UL physical channels and RSs.
R1-1812469 3GPP TSG RAN WG1 Meeting #95, Spokane, USA, Nov. 12-16, 2018, Source: Intel Corporation, Title: CR to 38.214 for CSI-RS (TRS, CSI, IM) + PDSCH multiplexing.
R1-1812469 3GPP TSG RAN WG1 Meeting #95, Spokane, USA, Nov. 12-16, 2018, Source: Intel Corporation, Title: CR to 38.214 for PDCCH + PDSCH multiplexing.
R1-1812469 3GPP TSG RAN WG1 Meeting #95, Spokane, USA, Nov. 12-16, 2018, Source: Intel Corporation, Title: CR to 38.214 for SRS + SRS multiplexing.
R1-1812469 3GPP TSG RAN WG1 Meeting #95, Spokane, USA, Nov. 12-16, 2018, Source: Intel Corporation, Title: Simultaneous Tx and Rx of channels and RS.
R1-1812548 3GPP TSG RAN WG1 Meeting #95, Spokane, USA, Nov. 12-16, 2018, Source: LG Electronics, Title: Draft CR on simultaneous Tx/Rx.
R1-1812959 3GPP TSG RAN WG1 Meeting #95, Spokane, USA, Nov. 12-16, 2018, Source: Samsung, Title: Simultaneous reception of physical channels and reference signals.
R1-1813251 3GPP TSG RAN WG1 Meeting #95, Spokane, USA, Nov. 12-16, 2018, Source: Ericsson, Title: Correction to 38.214 on simultaneous reception of PDCCH and PDSCH.
R1-1813251 3GPP TSG-RAN WG1 Meeting #95, Spokane, USA, Nov. 12-16, 2018, Source: Ericsson, Title: Draft CR to TS 38.213 on PDCCH QCL TypeD collision.
R1-1813251 3GPP TSG-RAN WG1 Meeting #95, Spokane, USA, Nov. 12-16, 2018, Source: Ericsson, Title: Maintenance for simultaneous RX and TX.
R1-1813300 3GPP TSG-RAN WG1 Meeting #95, Spokane, USA, Nov. 12-16, 2018, Source: NTT Docomo, Inc., Title: Simultaneous Tx for physical channels.
R1-1813398 3GPP TSG-RAN WG1 Meeting #95, Spokane, USA, Nov. 12-16, 2018, Source: Qualcomm Incorporated Title: Details on simultaneous reception/transmission of PHY channels and RS in FR2.
R1-18xxxxx 3GPP TSG-RAN WG1 Meeting #95, Spokane, USA, Nov. 12-16, 2018, Source: NTT Docomo, Inc., Title: Offline summary for PDCCH structure and search space.
R1-1814011 3GPP TSG-RAN WG1 Meeting #95, Spokane, USA, Nov. 12-16, 2018, Source: Intel, Ericsson, Huawei, Vivo, Nokia, Title: Proposal for simultaneous Tx and Rx of channels and RS.
R1-1814011 3GPP TSG-RAN WG1 Meeting #95, Spokane, USA, Nov. 12-16, 2018, Source: Intel, Ericsson, Huawei, Vivo, Nokia, Title: Proposal for simultaneous Tx and Rx of channels and RS (draft).
May 20, 2020—European Extended Search Report—EP 20150971. 8.
R1-1813915 3GPP TSG-RAN WG1 Meeting #95, Spokane, USA, Nov. 12-16, 2018, Source: ZTE; Title: Discussion on draft CRs on RS and QCL.
R1-1810643 3GPP TSG RAN WG1 Meeting #94, Gothenburg, Sweden, Aug. 20-24, 2018, Source: Sony, Title: Considerations on Multi-TRP/Panel Transmission.
R1-1813896 3GPP TSG RAN WG1 Meeting #95, Spokane, USA, Nov. 12-16, 2018, Source: Intel Corporation, Title: Summary for simultaneous Tx and Rx of channels and RS.
Jul. 27, 2021—European Office Action—EP 20151054.2.
Nov. 18, 2022—EP Search Report—EP App. No. 22187003.3.
R1-1811996 3GPP TSG RAN WG1 Meeting #94bis, Chengdu, China, Oct. 8-12, 2018, Source: Ericsson, Title: Summary of views on beam measurement and reporting—v3.
Apr. 11, 2023—EP Office Action—EP App. No. 20151054.2.
Office Action mailed Feb. 5, 2025 in U.S. Appl. No. 18/598,531.
Notice of Allowance mailed Jul. 8, 2025 in U.S. Appl. No. 18/598,531.

* cited by examiner

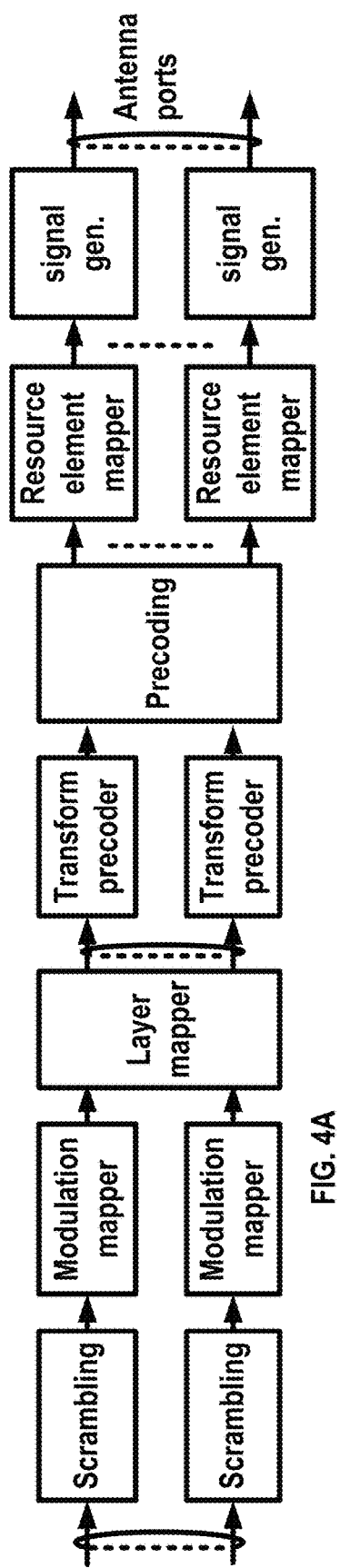
FIG. 4A
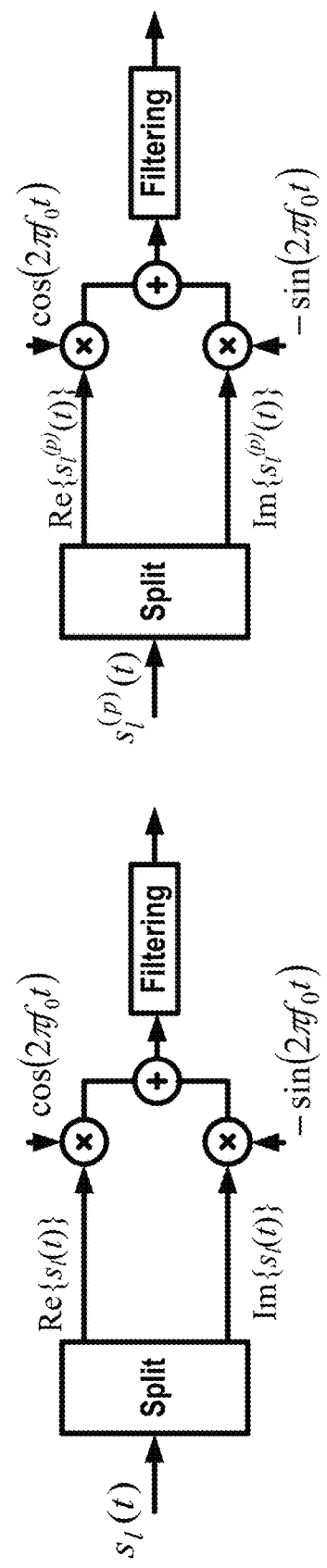
FIG. 4B
FIG. 4D
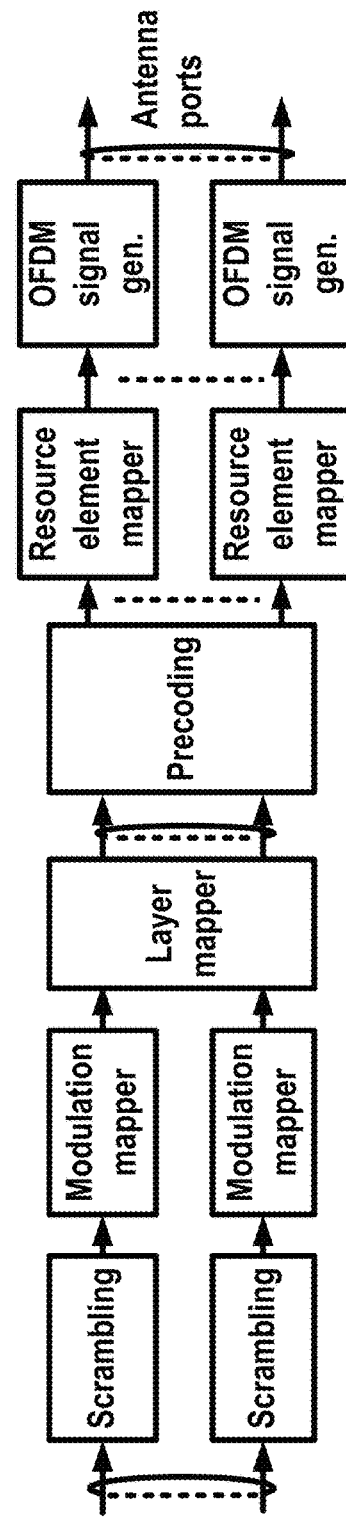
FIG. 4C

METHODS, DEVICES, AND APPARATUSES FOR BEAM MANAGEMENT

CROSS-REFERENCE TO RELATED APPLICATIONS

This application is a continuation of U.S. application Ser. No. 17/850,532, filed on Jun. 27, 2022, which is a continuation of U.S. application Ser. No. 16/738,502 (now U.S. Pat. No. 11,405,092), filed on Jan. 9, 2020, which claims the benefit U.S. Provisional Application No. 62/790,317, titled "Prioritization in Downlink Beam Management" and filed on Jan. 9, 2019, and U.S. Provisional Application No. 62/790,753, titled "Prioritization in Uplink Beam Management" and filed on Jan. 10, 2019. The above-referenced applications are hereby incorporated by reference in their entireties.

BACKGROUND

Various procedures may be used for selecting wireless communication resources. A wireless device and/or a base station may select one or more beams among the multiple beams for transmission and/or reception of signals. Signaling protocols may not be able to indicate/provide information for the wireless device to select beams, which may result in the wireless device being unable to determine a beam to be used for transmission and/or reception of signals.

SUMMARY

The following summary presents a simplified summary of certain features. The summary is not an extensive overview and is not intended to identify key or critical elements.

Wireless communications using one or more serving beams are described. A wireless device may determine/select one or more beams for transmission of signals (e.g., sounding reference signals, SRSs) to one or more cells. The wireless device may select a beam (e.g., based on various considerations), among a plurality of beams used for transmission of a signal in a first cell, for transmission of another signal in a second cell. The base station may be aligned to use a beam that may be based on a selection rule applied at the wireless device. Beam selection techniques described herein may result in advantages such as improved decoding/reception performance of SRS transmission, uplink channel estimation, uplink scheduling, and/or downlink scheduling.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

DETAILED DESCRIPTION

Figure 1:
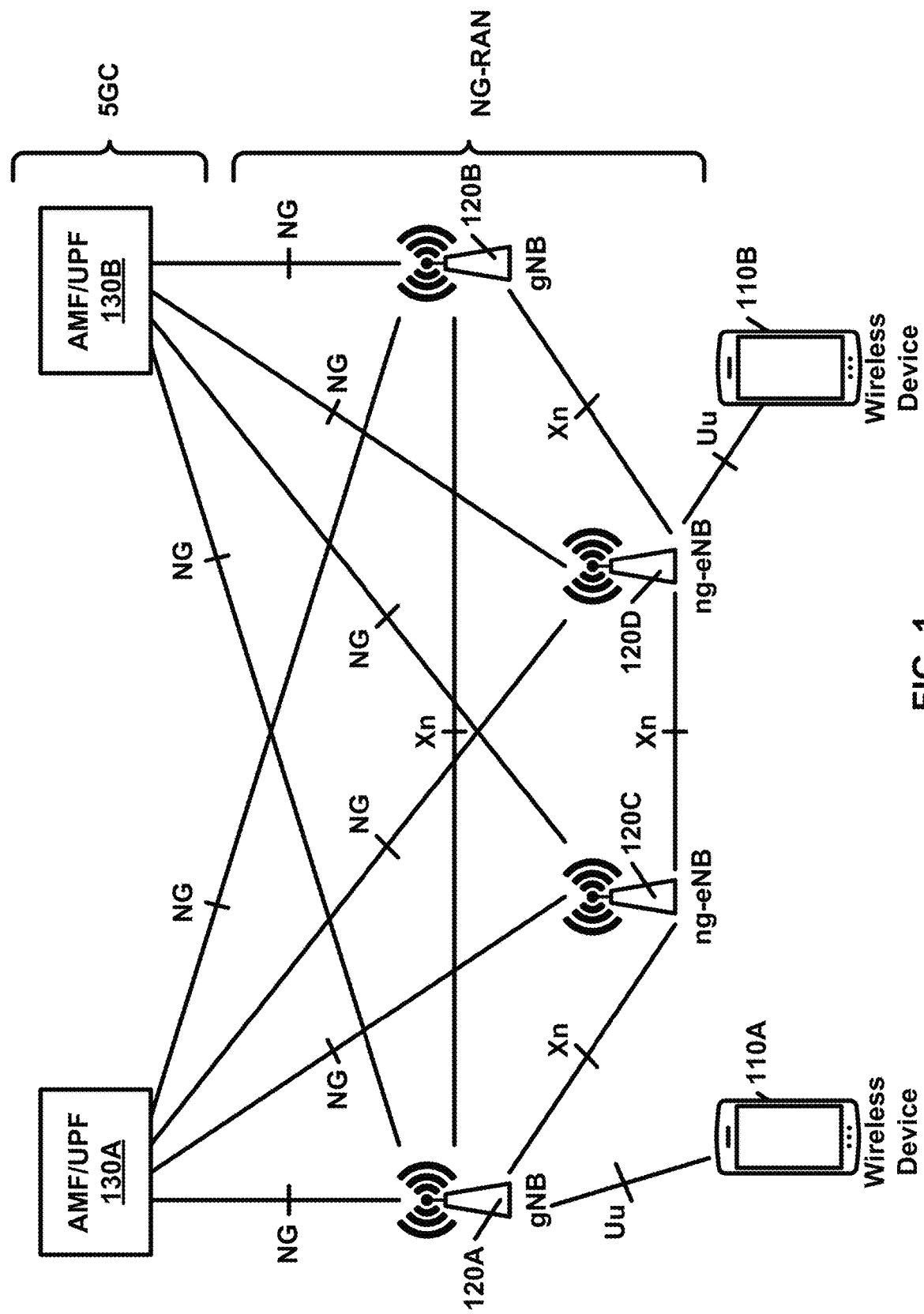
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to beam management procedures in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCH Logical Channel
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location
QFI Quality of Service Indicator
QOS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request SRB Signaling Radio Bearer
SRS Sounding Reference Signal
SS Synchronization Signal
SSB Synchronization Signal Block
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QOS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QOS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
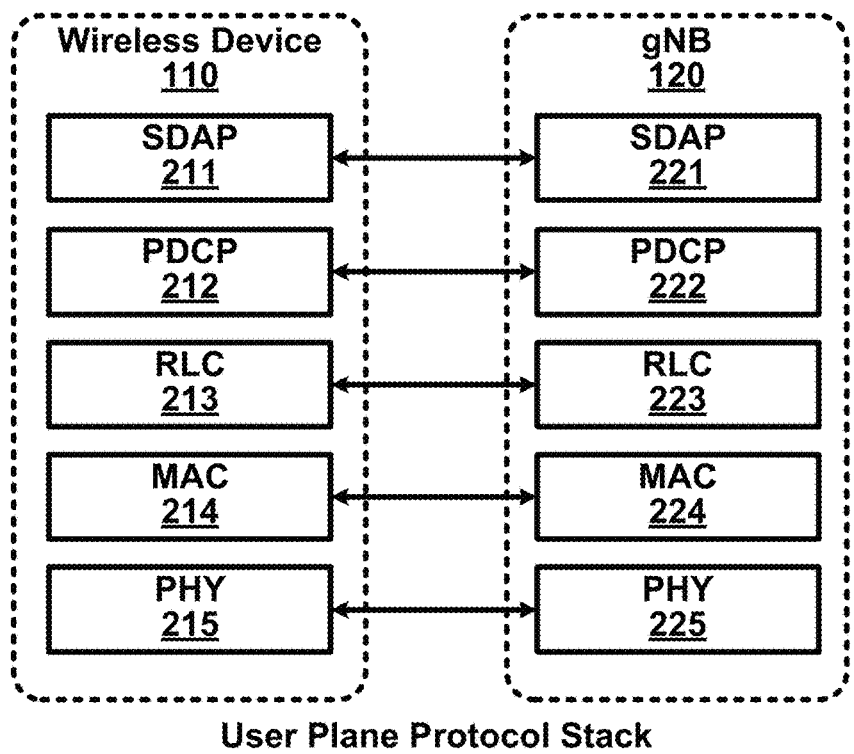
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
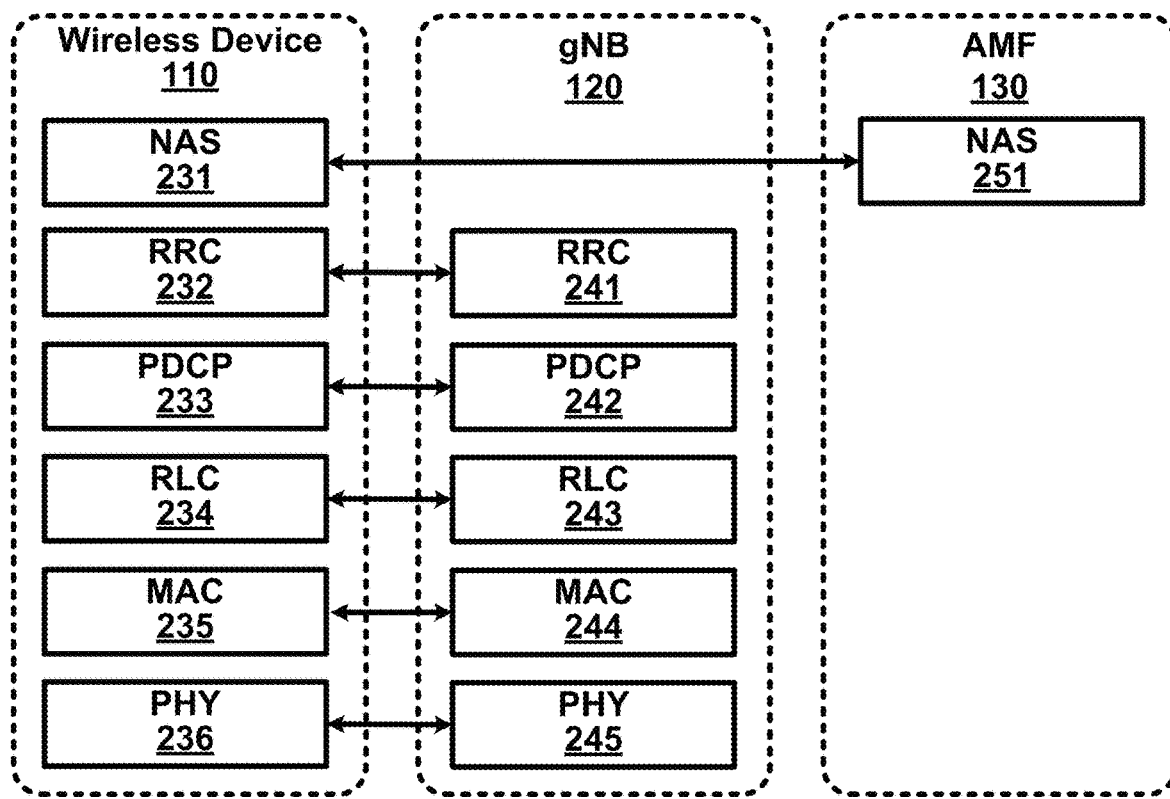
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
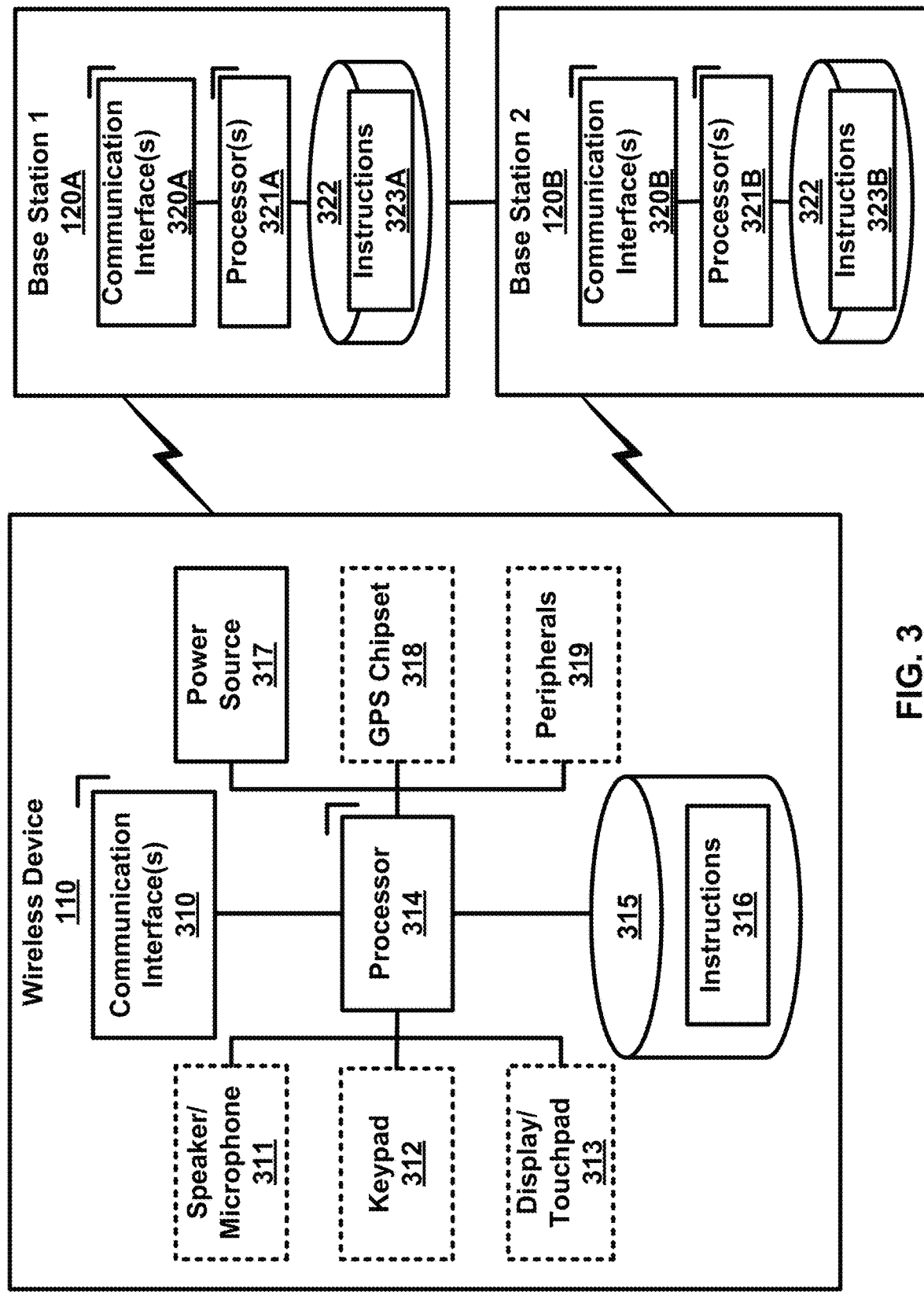
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QOS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2, 120B and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel. A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
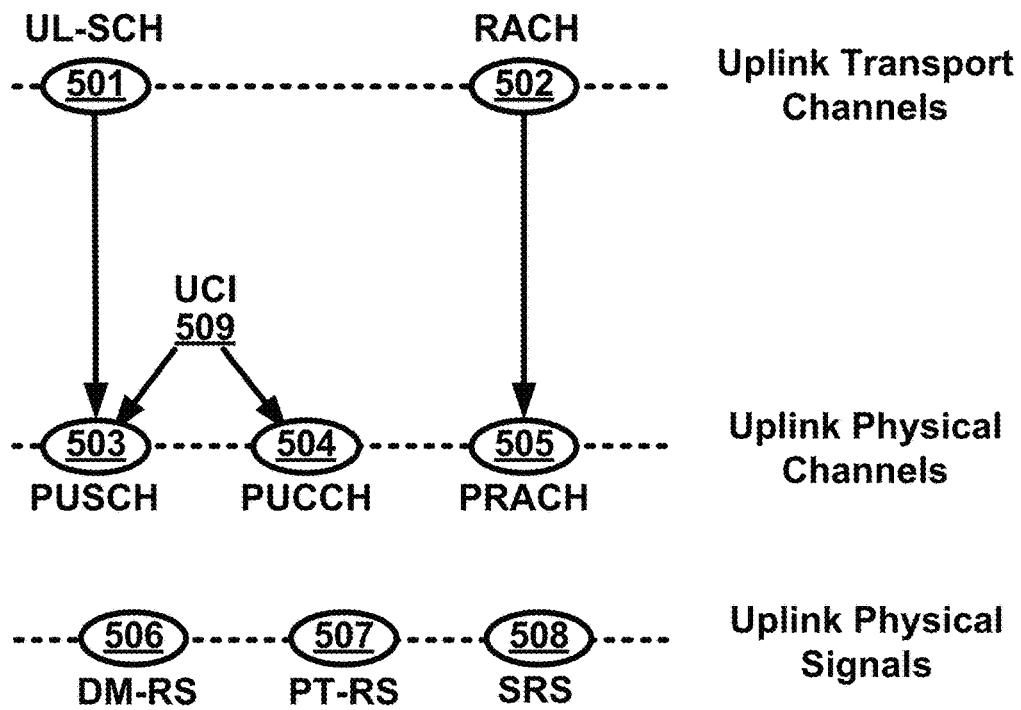
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DM-RS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
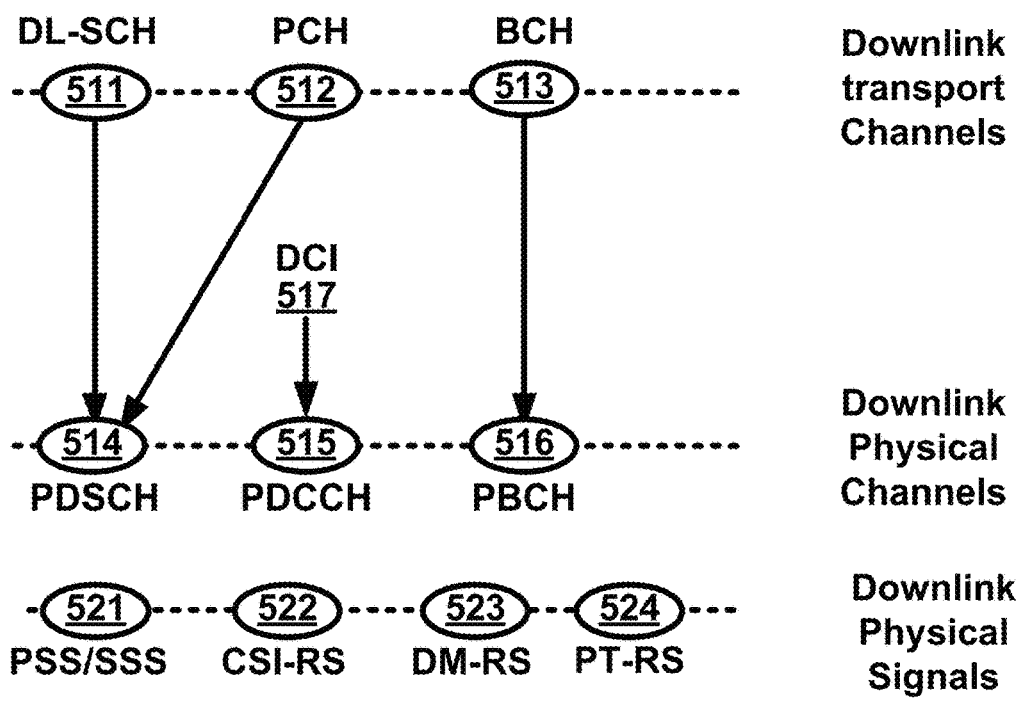
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A number of PT-RS ports may be less than a number of DM-RS ports in a scheduled resource. The downlink PT-RS 524 may be confined in the scheduled time/frequency duration for a wireless device.

Figure 6:
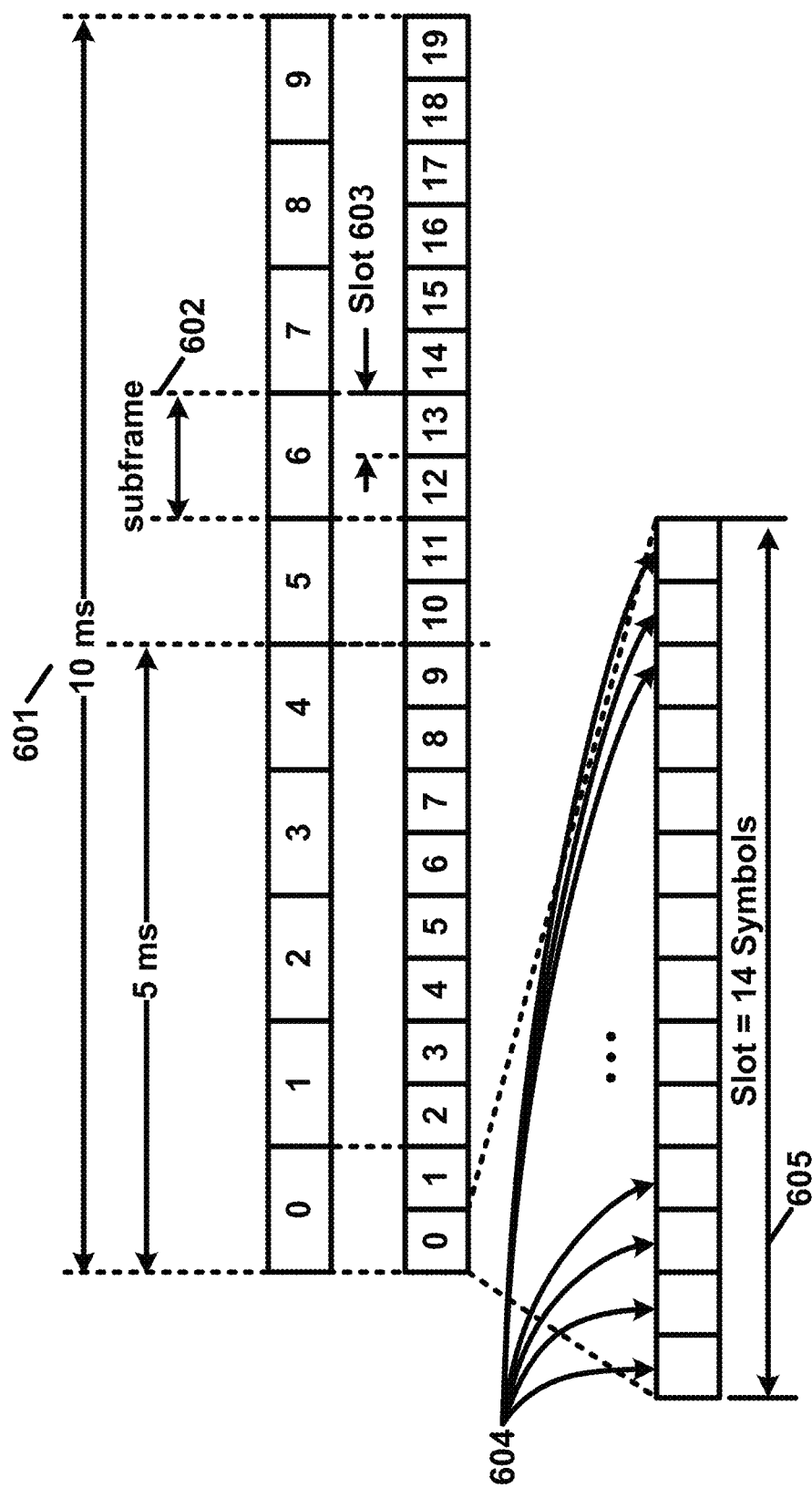
FIG. 6 shows an example transmission time and/or reception time for a carrier.

FIG. 6 shows an example transmission time and reception time, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
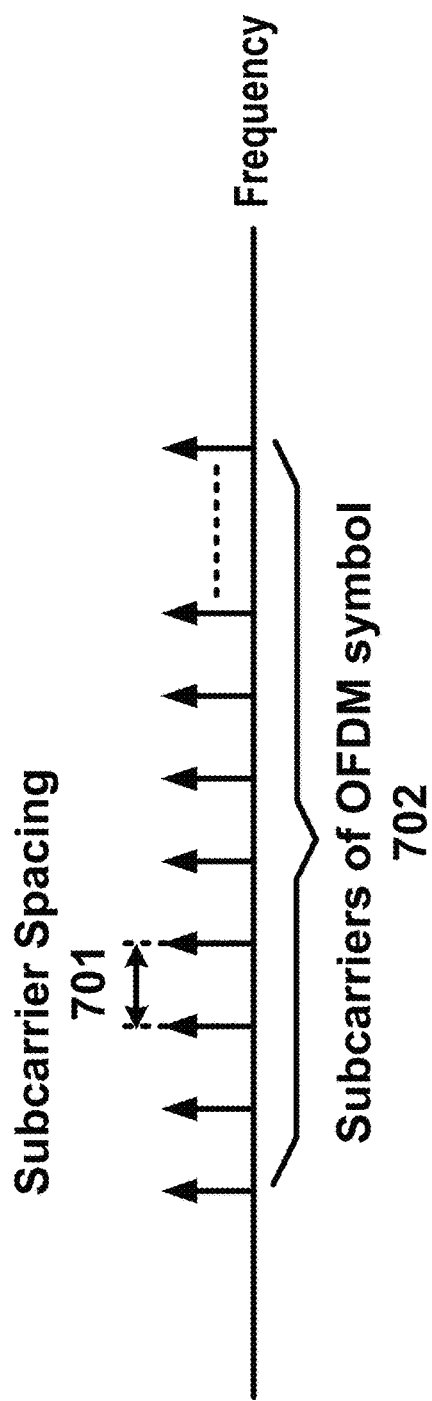
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
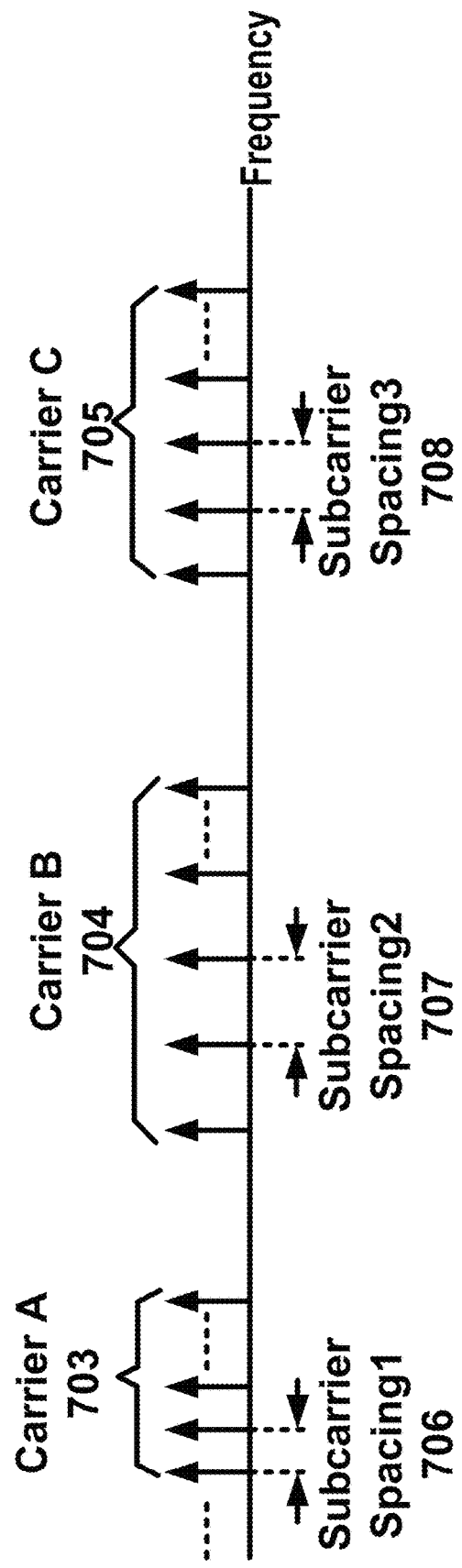

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
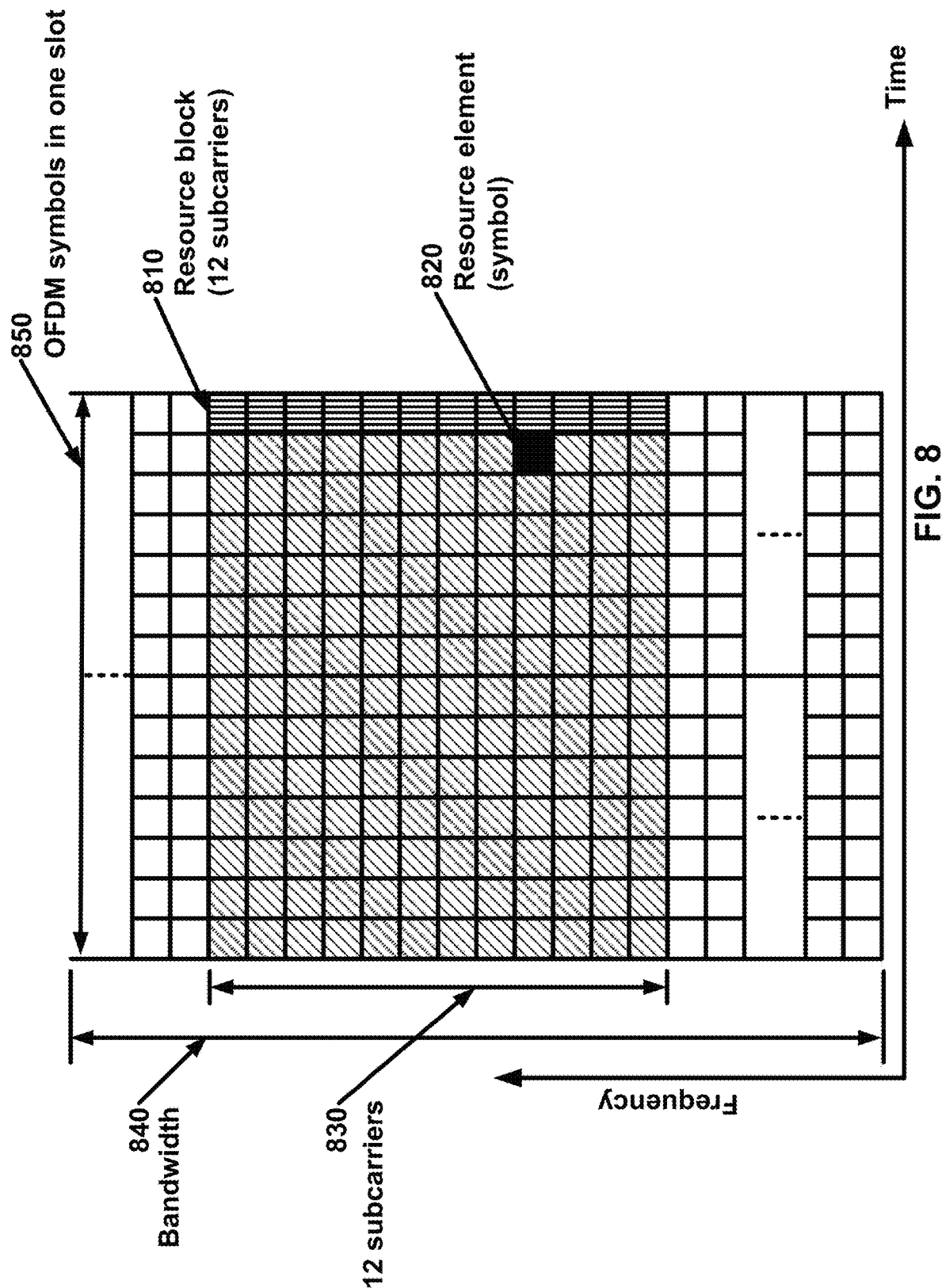
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 KHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol (s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
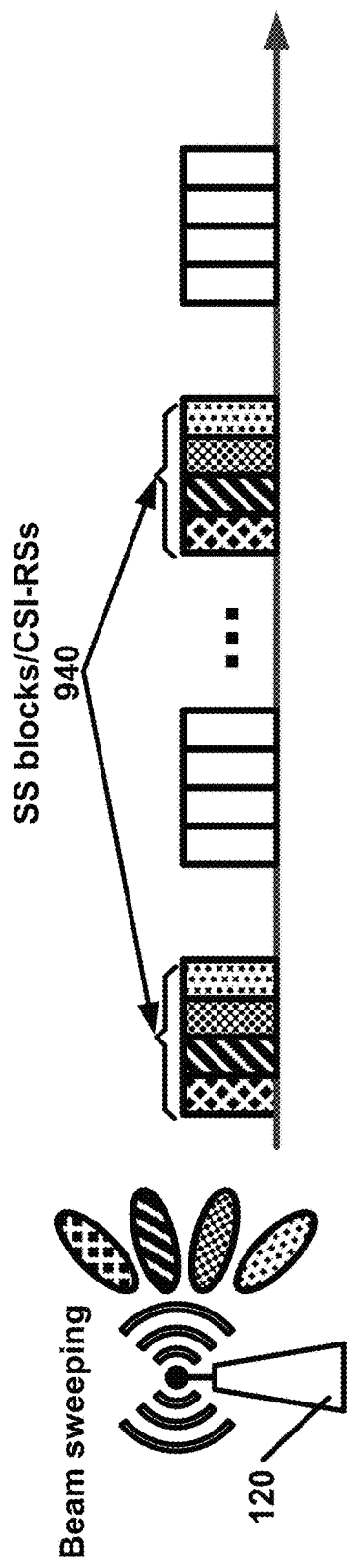
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
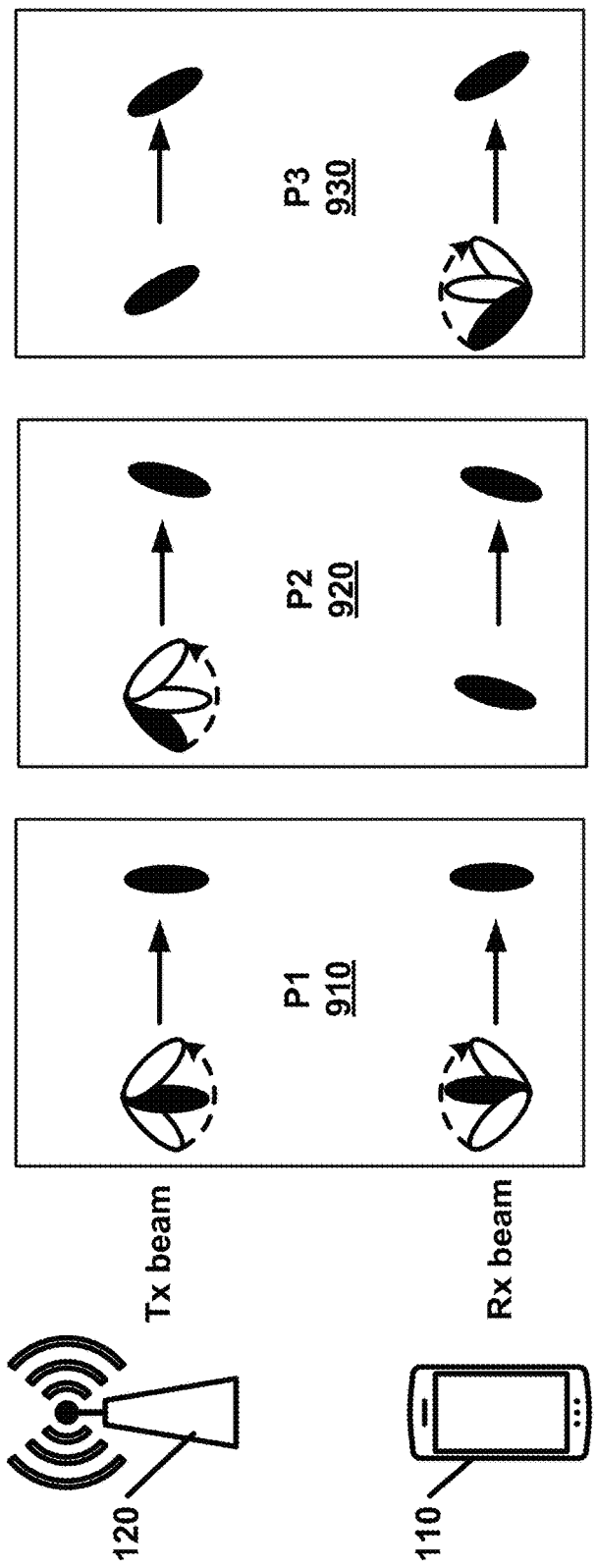
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
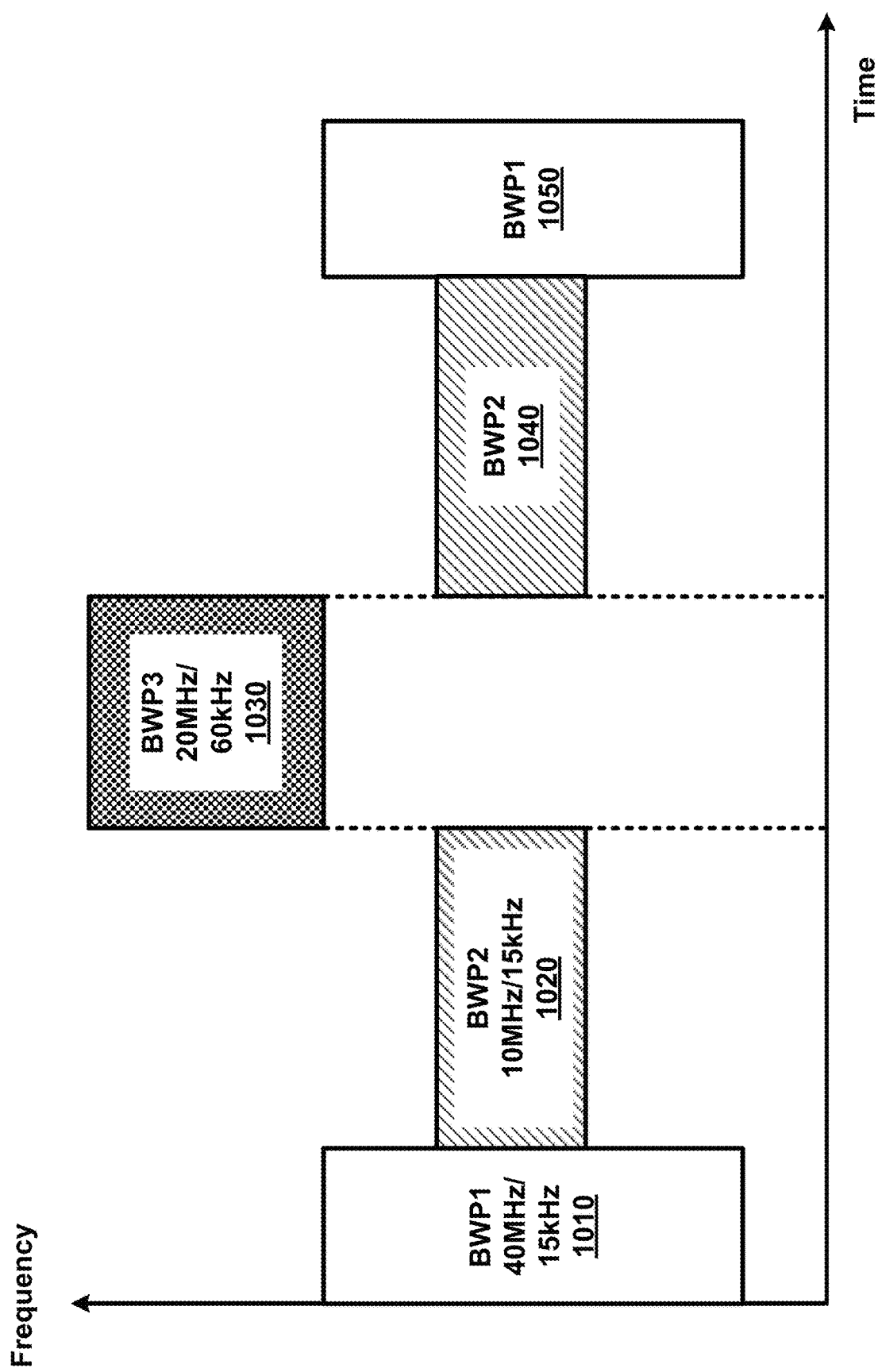
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
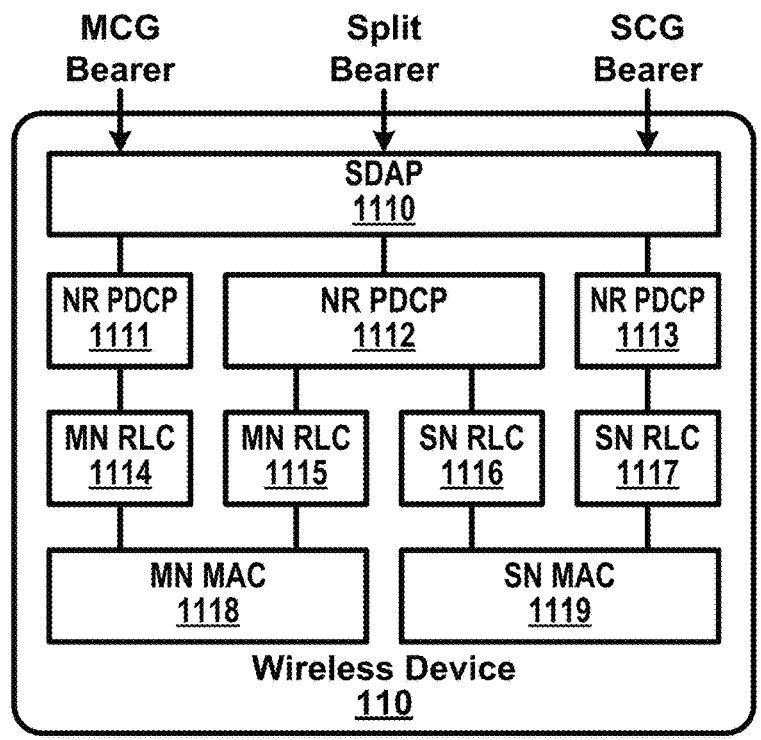
FIG. 11A and FIG. 11B show examples of multi connectivity.
Figure 11B:
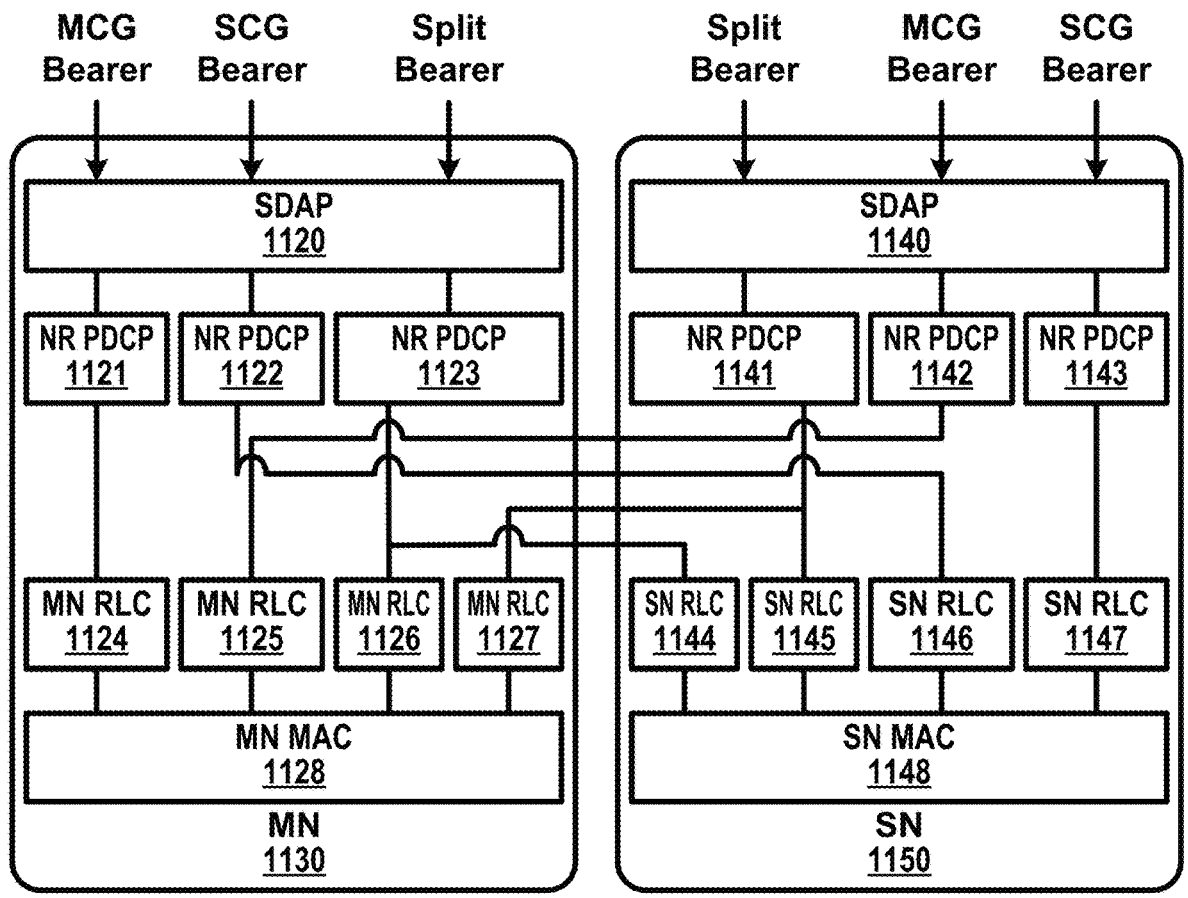

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
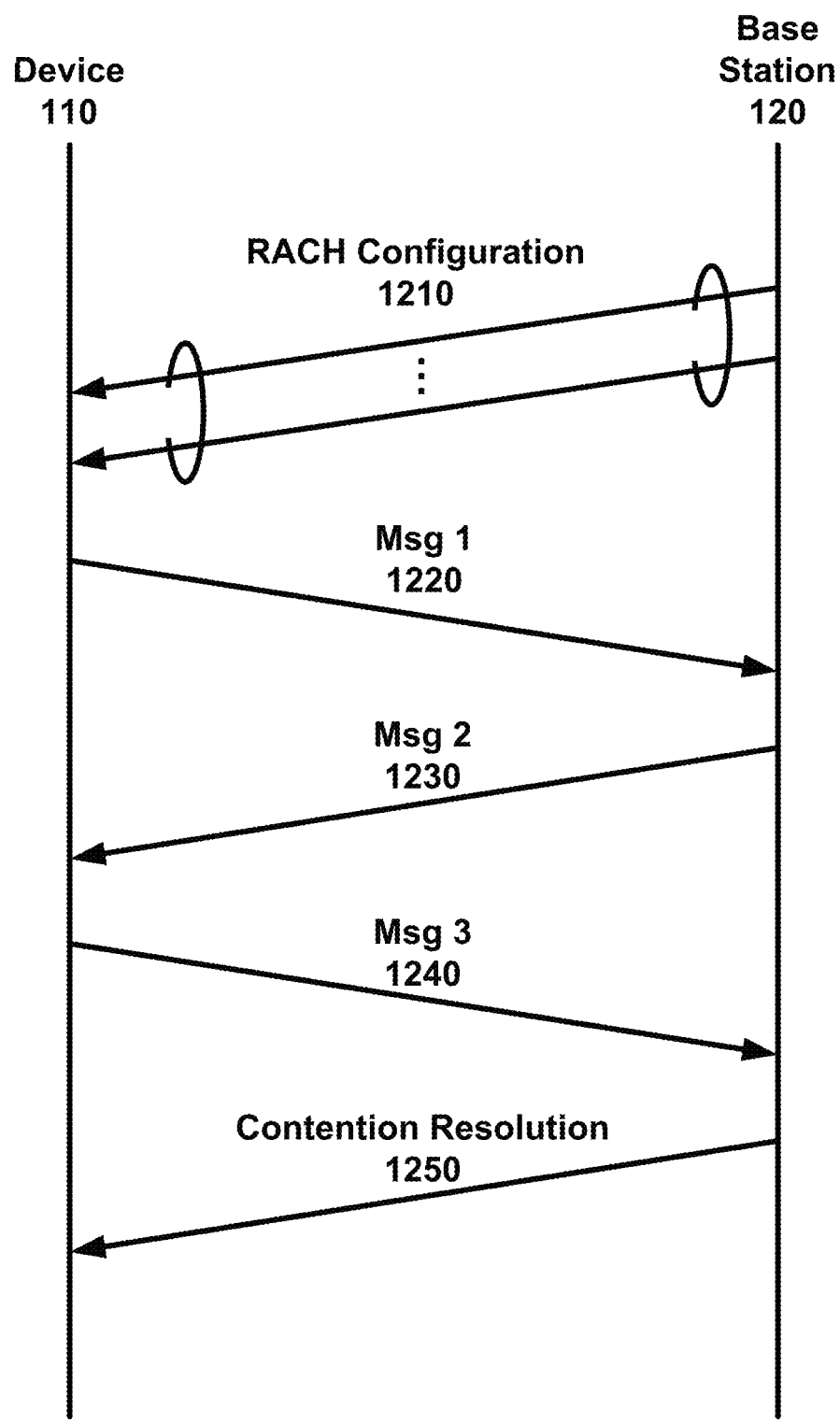
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery request and corresponding PRACH resource(s) (e.g., if any), a time window to monitor RA response(s), a time window to monitor response(s) on a beam failure recovery request, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery request associated with at least one of SS blocks and/or CSI-RSs. A wireless device may select a random access preamble index corresponding to a selected SS block or a CSI-RS from a set of one or more random access preambles for a beam failure recovery request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery request. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-Response Window) to monitor a random access response. For a beam failure recovery procedure, the base station may configure the wireless device with a different time window (e.g., bfr-Response Window) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention-free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1240, the wireless device may determine that the contention resolution (e.g., comprising contention resolution 1250) is successful and/or the wireless device may determine that the random access procedure is successfully completed.

Figure 13:
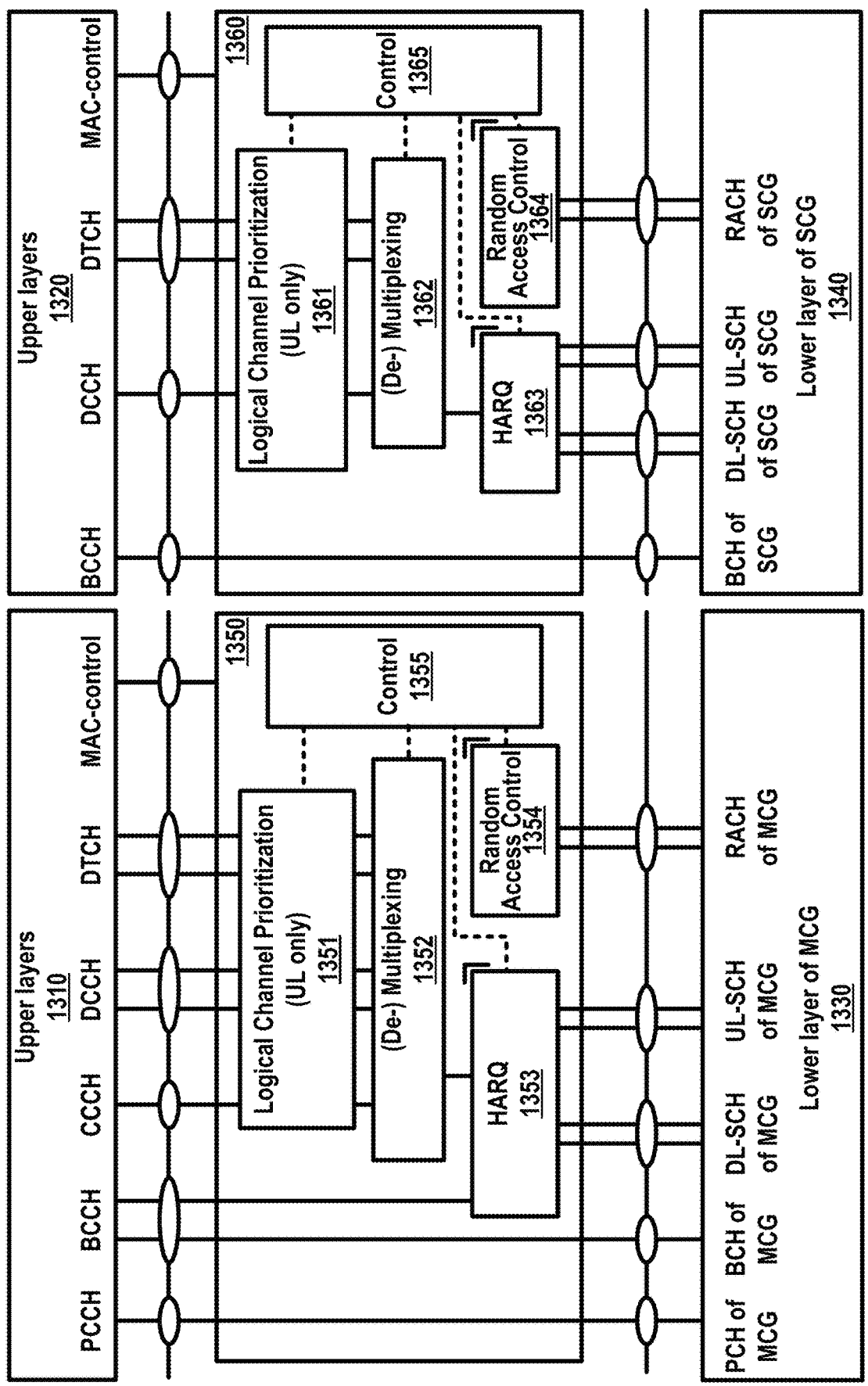
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
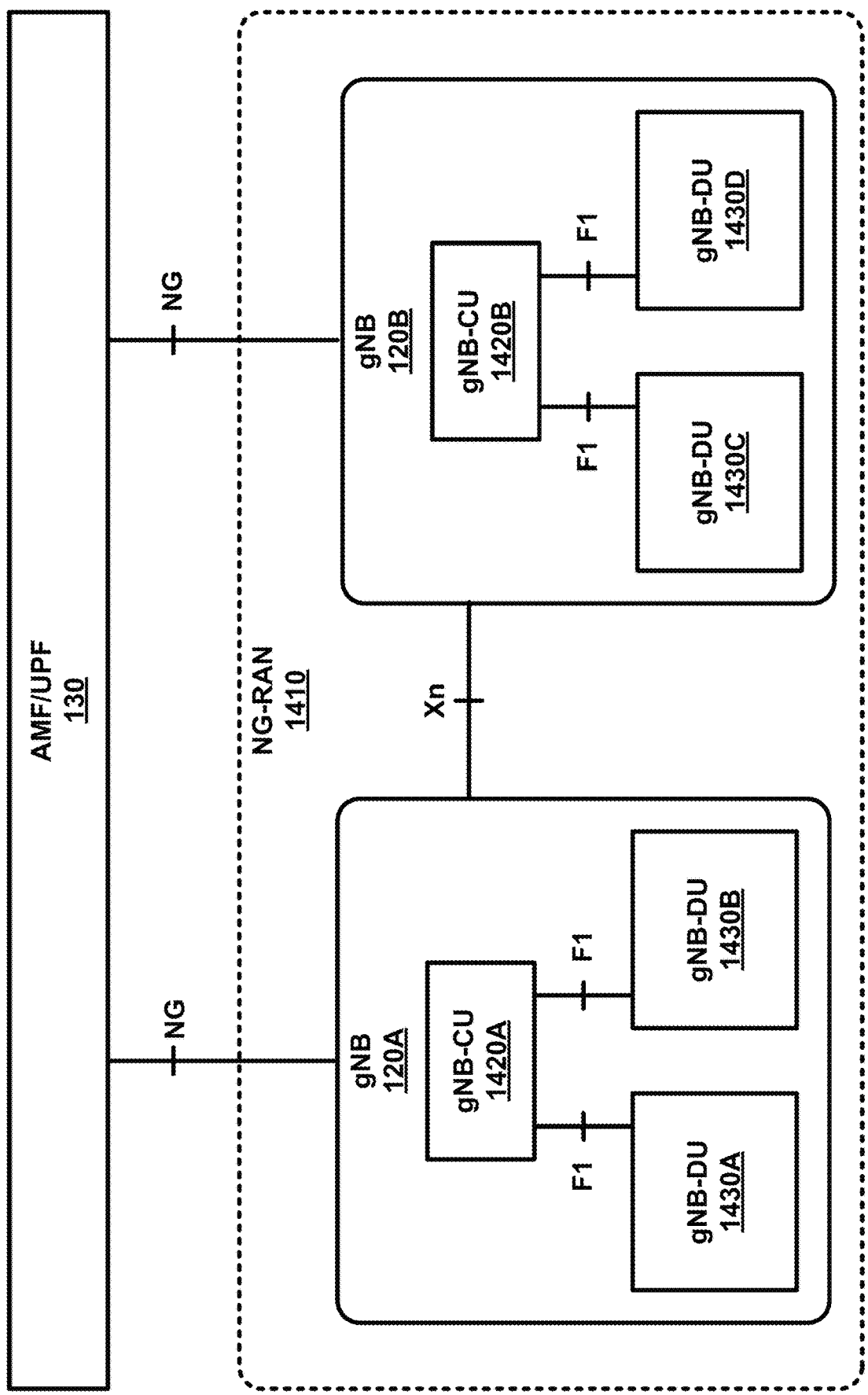
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
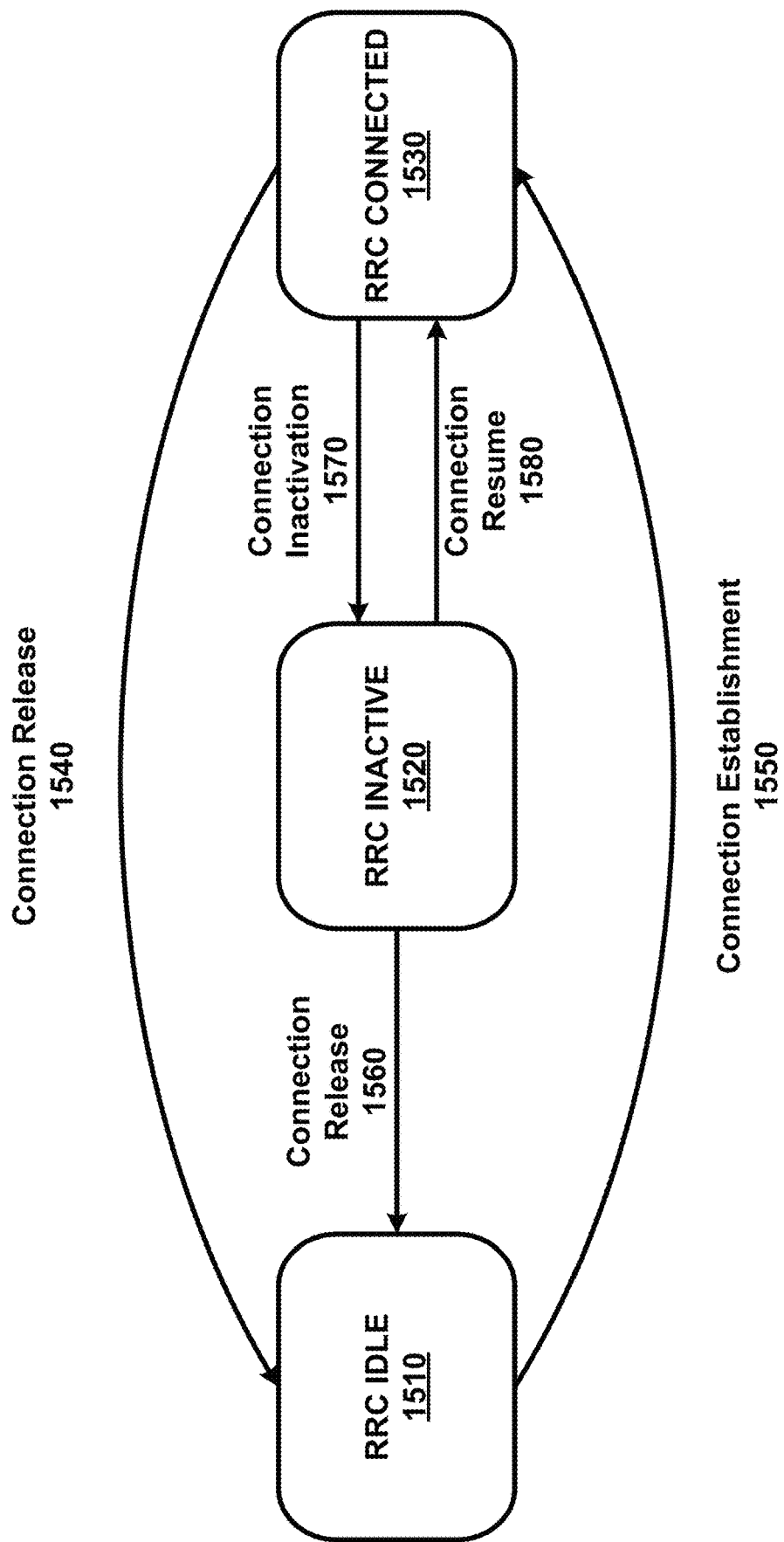
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer. Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) DCI via a PDCCH for at least one of: a scheduling assignment and/or grant; a slot format notification; a preemption indication; and/or a power-control command. The DCI may comprise at least one of: an identifier of a DCI format; a downlink scheduling assignment(s); an uplink scheduling grant(s); a slot format indicator; a preemption indication; a power-control for PUCCH/PUSCH; and/or a power-control for SRS.

A downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; a frequency domain resource assignment; a time domain resource assignment; a time resource allocation; a bandwidth part indicator; a HARQ process number; one or more MCS; one or more NDI; one or more RV; MIMO related information; a downlink assignment index (DAI); PUCCH resource indicator; PDSCH-to-HARQ feedback timing indicator; a TPC for PUCCH; an SRS request; and/or padding (e.g., if necessary). The MIMO related information may comprise at least one of: a PMI; precoding information; a transport block swap flag; a power offset between PDSCH and a reference signal; a reference-signal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; a frequency domain resource assignment; a time domain resource assignment; a time resource allocation; an MCS; an NDI; a phase rotation of the uplink DM-RS; precoding information; a CSI request; an SRS request; an uplink index/DAI; a TPC for PUSCH; and/or padding (e.g., if necessary).

A base station may perform CRC scrambling for DCI, for example, before transmitting the DCI via a PDCCH. The base station may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) and the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different CORESETs, for example, to support a wide bandwidth operation. A base station may transmit one or more RRC messages comprising configuration parameters of one or more CORESETs. A CORESET may comprise at least one of: a first OFDM symbol; a number of consecutive OFDM symbols; a set of resource blocks; and/or a CCE-to-REG mapping. A base station may send (e.g., transmit) a PDCCH in a dedicated CORESET for particular purpose, for example, for beam failure recovery confirmation. A wireless device may monitor a PDCCH for detecting DCI in one or more configured CORESETs, for example, to reduce the power consumption.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

A MAC subheader may comprise an eight-bit L field. The LCID field may have six bits in length, and the L field may have eight bits in length. A MAC subheader may comprise a sixteen-bit L field. The LCID field may be six bits in length, and the L field may be sixteen bits in length.

A MAC subheader may comprise: an R field with two bits in length; and an LCID field with multiple bits in length, when the MAC subheader corresponds to a fixed sized MAC CE, or padding. The LCID field may have six bits in length, and the R field may have two bits in length.

DL MAC PDU, multiple MAC CEs may be placed together. A MAC subPDU comprising MAC CE may be placed before any MAC subPDU comprising a MAC SDU, or a MAC subPDU comprising padding.

UL MAC PDU, multiple MAC CEs may be placed together. A MAC subPDU comprising MAC CE may be placed after all MAC subPDU comprising a MAC SDU. The MAC subPDU may be placed before a MAC subPDU comprising padding.

A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate a MAC CE associated with the MAC subheader is a long DRX command MAC CE.

The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a PCell. A base station may send (e.g., transmit), to a wireless device, one or more messages comprising configuration parameters of a plurality of one or more SCells, for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivation Timer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivation-Timer timer) associated with an activated SCell expires. The wireless device may stop the timer (e.g., sCellDeactivation-Timer timer) associated with the activated SCell, for example, after or in response to deactivating the activated SCell. The wireless device may stop a BWP inactivity timer associated with the activated SCell, for example, after or in response to deactivating the activated SCell. The wireless device may deactivate any active BWP associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, for example, after or in response to deactivating the activated SCell. The wireless device may flush HARQ buffers associated with the activated SCell.

A wireless device may not perform certain operations, for example, if an SCell is deactivated. The wireless device may not perform one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

An SCell activation/deactivation MAC CE may comprise, for example, one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

An SCell Activation/Deactivation MAC CE may comprise, for example, any size such as any quantity of octets (e.g., four octets). A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station may configure a wireless device with control information (e.g., TCI) associated with a downlink channel and/or an uplink channel. The control information may be used, for example, by the wireless device to receive data via the downlink channel. The control information may be transmitted via a channel that may be different from the downlink channel.

A base station may configure a wireless device with a list of one or more TCI state configurations (e.g., TCI-States)

using and/or via a higher layer parameter, for example, PDSCH-Config for a serving cell. A number (e.g., quantity, plurality, etc.) of the one or more TCI-States may depend on a capability of the wireless device. The wireless device may use the one or more TCI-States to decode a PDSCH based on a detected PDCCH with a DCI. The DCI may be intended, for example, for the wireless device and/or the serving cell. Each of the one or more TCI-States state may contain one or more parameters. The wireless device may use the one or more parameters, for example, to configure a quasi-co-location relationship between one or more downlink reference signals (e.g., a first DL RS and/or a second DL RS) and the DM-RS ports of the PDSCH. The quasi-co-location relationship may be configured by a higher layer parameter QCL-Type1 for the first DL RS. The quasi-co-location relationship may be configured by a higher layer parameter QCL-Type2 for the second DL RS, for example, if the second DL RS is configured.

A first QCL type of a first DL RS and a second QCL type of a second a second DL RS may not be the same, for example, if the wireless device configures a quasi co-location relationship between the two DL RSs. The first DL RS and the second DL RS may be the same. The first DL RS and the second DL RS may be different.

A quasi co-location type (e.g., the first QCL type, the second QCL type) of a DL RS (e.g., the first DL RS, the second DL RS) may be provided to the wireless device by a higher layer parameter (e.g., QCL-Type in QCL-Info). The higher layer parameter QCL-Type may be at least one of: QCL-TypeA: {Doppler shift, Doppler spread, average delay, delay spread}, QCL-TypeB: {Doppler shift, Doppler spread}, QCL-TypeC: {average delay, Doppler shift} and QCL-TypeD: {Spatial Rx parameter}.

A wireless device may receive an activation command. The activation command may be used to map one or more TCI states (e.g., 8 states) to one or more codepoints of a TCI field in DCI. Mapping between one or more TCI states and one or more codepoints of the TCI field in DCI may be applied starting from slot $n+3N_{slot}^{subframe,\mu}+1$, for example, if a HARQ-ACK corresponding to a PDSCH carrying the activation command is sent (e.g., transmitted) in slot n. The wireless device may determine (e.g., assume) that one or more DM-RS ports of a PDSCH of a serving cell are quasi-co-located with an SSB/PBCH block, for example, (i) before the wireless device receives the activation command and/or (ii) after the wireless device receives a higher layer configuration of TCI-States. The SSB/PBCH block may be determined in an initial access procedure with respect to one or more of QCL-TypeA' and QCL-TypeD', for example, if applicable.

A wireless device may be configured by a base station, with a higher layer parameter TCI-PresentInDCI. The wireless device may determine (e.g., assume) that a TCI field is present in a DCI format (e.g., DCI format 1_1) of a PDCCH transmitted on the CORESET, for example, if the higher layer parameter TCI-PresentInDCI is set as 'Enabled' for a CORESET scheduling a PDSCH.

A base station and/or a wireless device may configure one or more wireless resources for communications between the base station and the wireless device. The wireless resources may comprise, for example, one or more CORESETS. The base station may configure the one or more CORESETS for the wireless device. The base station may (or may not) configure a CORESET with a higher layer parameter (e.g., TCI-PresentInDCI). The CORESET may schedule a PDSCH transmission. A time offset between a reception of DCI (e.g., DCI format 1_1, DCI format 1_0) in the CORESET and a corresponding PDSCH transmission may be equal to or greater than a threshold (e.g., Threshold-Sched-Offset). The threshold may be based on a reported capability of the wireless device. The wireless device may apply/associate a second TCI state for the CORESET used for/with a PDCCH transmission of the DCI. The wireless device may apply/associate a second QCL assumption for/with the CORESET used for a PDCCH transmission of the DCI. The wireless device may perform a default PDSCH RS (reference signal) selection, for example, based on one or more of: the base station not configuring the CORESET with a higher layer parameter (e.g., TCI-PresentInDCI) and/or the time offset between the reception of the DCI and the PDSCH being equal or greater than the threshold. The wireless device may determine/assume, in the default PDSCH RS selection and in order to determine antenna port quasi co-location of the PDSCH, that a first TCI state or a first QCL assumption for the PDSCH is identical to (or substantially the same as) the second TCI state or the second QCL assumption applied for the CORESET.

A base station may configure a CORESET with a higher layer parameter (e.g., TCI-PresentInDCI). The higher layer parameter (e.g., TCI-PresentInDCI) may be set as enabled (e.g., 1 or other value). The CORESET may schedule a PDSCH with DCI (e.g., DCI format 1_0). The DCI may not comprise a TCI field. A time offset between a reception of the DCI in the CORESET and a corresponding PDSCH may be equal to or greater than a threshold (e.g., Threshold-Sched-Offset). The threshold may be based on a reported capability of the wireless device. The wireless device may apply/associate a second TCI state for the CORESET used for a PDCCH transmission of the DCI. The wireless device may apply/associate a second QCL assumption for the CORESET used for a PDCCH transmission of the DCI. The wireless device may perform a default PDSCH RS selection, for example, based on one or more of: the base station scheduling the PDSCH with the DCI not comprising the TCI field and/or the time offset between the reception of the DCI and the PDSCH transmission being equal or greater than the threshold. The wireless device may determine/assume, in the default PDSCH RS selection (e.g., to determine antenna port quasi co-location of the PDSCH), that a first TCI state and/or a first QCL assumption for the PDSCH is identical to (or substantially the same as) the second TCI state and/or the second QCL assumption applied for the CORESET. As described herein, the terms "TCI state" and "QCL assumption" may be used interchangeably. "TCI state" and/or "QCL assumption" may indicate a beam used for reception of data (e.g., reception of PDSCH data).

A base station may configure a CORESET with a higher layer parameter (e.g., TCI-PresentInDCI). The higher layer parameter (e.g., TCI-PresentInDCI) may be set as enabled (e.g., 1 or other value). The wireless device may receive DCI in the CORESET of a scheduling component carrier. The DCI may comprise a TCI field. The TCI field in the DCI in the scheduling component carrier may indicate one or more activated TCI states (e.g., after receiving the activation command) in a scheduled component carrier or in a DL BWP, for example, based on the higher layer parameter (e.g., TCI-PresentInDCI) being set as enabled (e.g., 1 or other value).

A base station may configure a CORESET with a higher layer parameter (e.g., TCI-PresentInDCI). The higher layer parameter (e.g., TCI-PresentInDCI) may be set as enabled (e.g., 1 or other value). The wireless device may receive DCI (e.g., DCI format 1_1) in the CORESET. The DCI may schedule a PDSCH of a wireless device. The DCI may comprise a TCI field. The value of the TCI field may indicate the TCI state. A time offset between a reception of the DCI and the corresponding scheduled PDSCH may be equal to or greater than a threshold (e.g., Threshold-Sched-Offset). The threshold may be based on a capability or reported capability of the wireless device. The wireless device may use a TCI state according to a value of the TCI field (e.g., in a detected PDCCH with the DCI) to determine antenna port quasi co-location for the PDSCH. The wireless device may determine antenna port quasi co-location for the PDSCH, for example, based on one or more of: the TCI field being present in the DCI scheduling the PDSCH, and/or a higher layer parameter (e.g., TCI-PresentInDCI) being set as enabled for the CORESET. Using the TCI state according to the value of the TCI field may comprise the wireless device determining/assuming that one or more DM-RS ports of the PDSCH of a serving cell are quasi co-located with one or more RS(s) in the TCI state with respect to one or more QCL type parameter(s) given by the TCI state, for example, if the time offset between the reception of the DCI and the PDSCH is equal or greater than the threshold.

A base station may configure a wireless device with a single slot PDSCH (e.g., and/or any other quantity of slot PDSCH). The single slot PDSCH may be scheduled in a slot. The base station may activate one or more TCI states in the slot. A TCI state (e.g., indicated by a TCI field in DCI scheduling the single slot PDSCH) may be based on the one or more activated TCI states in the slot with the scheduled single slot PDSCH. The TCI state may be one of the one or more activated TCI states in the slot. The TCI field in the DCI may indicate a TCI state of the one or more activated TCI states in the slot.

A wireless device may be configured with a CORESET. The CORESET may be associated with a search space set for cross-carrier scheduling. The wireless device may determine/expect/assume that a higher layer parameter (e.g., TCI-PresentInDCI) is set as enabled for the CORESET, for example, based on the CORESET being associated with the search space set for cross-carrier scheduling. A base station may configure a serving cell with one or more TCI states. The wireless device may detect, in the search space set, a PDCCH (e.g., comprising DCI) for scheduling a PDSCH. A TCI field in the DCI may indicate at least one of the one or more TCI states. The at least one of the one more TCI states (e.g., scheduled by the search space set) may comprise a QCL type (e.g., QCL-TypeD). The wireless device may determine/expect/assume that a time offset between a reception of the PDCCH detected in the search space set and the PDSCH is greater than or equal to a threshold (e.g., Threshold-Sched-Offset), for example, based on at least one of the one or more TCI states scheduled by the search space set containing the QCL type.

A base station may configure a CORESET with a higher layer parameter (e.g., TCI-PresentInDCI). The higher layer parameter (e.g., TCI-PresentInDCI) may be set as enabled. An offset between a reception of DCI in the CORESET and a PDSCH scheduled by the DCI may be less than a threshold (e.g., Threshold-Sched-Offset), for example, if the higher layer parameter (e.g., TCI-PresentInDCI) is set to be enabled for the CORESET.

A base station may or may not configure a CORESET with a higher layer parameter (e.g., TCI-PresentInDCI). The wireless device may be, for example, in an RRC connected mode. The wireless device may be, for example, in an RRC idle mode. The wireless device may be, for example, in an RRC inactive mode. An offset between a reception of DCI in the CORESET and a PDSCH scheduled by the DCI may be less than a threshold (e.g., Threshold-Sched-Offset), for example, if the higher layer parameter (e.g., TCI-PresentIn-DCI) is not configured for the CORESET.

A wireless device may monitor one or more CORESETs and/or one or more search spaces within/in an active BWP (e.g., an active downlink BWP) of a serving cell in one or more slots (e.g., one or more time slots). Monitoring the one or more CORESETs within/in the active BWP of the serving cell in the one or more slots may comprise monitoring at least one CORESET within/in the active BWP of the serving cell in each slot of the one or more slots. A latest slot of the one or more slots may be a most recent slot. The wireless device may monitor, within/in the active BWP of the serving cell, one or more second CORESETs of the one or more CORESETs in the latest slot. The wireless device may determine the latest slot, for example, based on monitoring the one or more second CORESETs in the latest slot. Each CORESET of the one or more second CORESETs may be indicated/identified by a CORESET-specific index (e.g., indicated by a higher layer parameter, such as CORESET-ID). A CORESET specific index of a CORESET of the one or more second CORESETs may be least among the CORESET specific indices of the one or more second CORESETs. The wireless device may monitor a search space associated with the CORESET (e.g., in the latest slot). The wireless device may select the CORESET of the one or more second CORESETs, for example, based on one or more of: the CORESET-specific index of the CORESET being the least, and/or the monitoring the search space associated with the CORESET in the latest slot (or any other slot). The wireless device may determine/assume that one or more DM-RS ports of the PDSCH of the serving cell are quasi co-located with one or more RSs in a TCI state with respect to one or more QCL type parameter(s), for example, if an offset between the reception of the DCI in the CORESET and the PDSCH scheduled by the DCI is less than a threshold (e.g., Threshold-Sched-Offset). The one or more RSs in the TCI state may be used for PDCCH quasi co-location indication of the CORESET of the one or more second CORESETs, based on or in response to the selecting the CORESET.

A wireless device may receive DCI via a PDCCH in a CORESET. The DCI may schedule a PDSCH. An offset between a reception of the DCI and the PDSCH may be less than a threshold (e.g., Threshold-Sched-Offset). A first QCL type (e.g., QCL-TypeD) of one or more DM-RS ports of the PDSCH may be different from a second QCL type (e.g., QCL-TypeA) of one or more second DM-RS ports of the PDCCH. The PDSCH and the PDCCH may overlap in at least one symbol. The wireless device may prioritize a reception of the PDCCH associated with the CORESET, for example, based on one or more of: the PDSCH and the PDCCH overlapping in at least one symbol, and/or the first QCL type being different from the second QCL type. The prioritizing may apply to an intra-band CA case, for example, if the PDSCH and the CORESET are in different component carriers. The prioritizing the reception of the PDCCH may comprise receiving the PDSCH with the second QCL type of one or more second DM-RS ports of the PDCCH. The prioritizing the reception of the PDCCH may comprise overwriting the first QCL type of the one or more DM-RS ports of the PDSCH with the second QCL type of the one or more second DM-RS ports of the PDCCH. The prioritizing the reception of the PDCCH may comprise assuming a spatial QCL of the PDCCH (e.g., the second QCL type), for the simultaneous reception of the PDCCH and the PDSCH. The prioritizing the reception of the PDCCH may comprise applying a spatial QCL of the PDCCH (e.g., the second QCL type), for the simultaneous reception of the PDCCH and the PDSCH.

The configured TCI states may or may not comprise an indication of a QCL type (e.g., none of the configured TCI states may comprise an indication of a QCL typeD). The wireless device may determine assume QCL assumptions for the configured TCI states, for example, based on indicated TCI states for one or more scheduled PDSCH transmissions, for example, if none of the configured TCI states comprise the indication of the QCL type (e.g., QCL TypeD). The wireless device may determine QCL assumptions for the configured TCI states, for example, irrespective of the time offset between the reception of the DCI and the corresponding PDSCH.

A wireless device may use a CSI-RS for at least one of: time/frequency tracking, CSI computation, L1-RSRP computation, and/or mobility. A base station may configure a wireless device to monitor a CORESET on one or more symbols (e.g., OFDM symbols). A CSI-RS resource may be associated with a resource set parameter (e.g., non-zero power CSI-RS resource set, NZP-CSI-RS-ResourceSet). A higher layer parameter repetition of the NZP-CSI-RS-ResourceSet may be set to 'on' or another indication/value (e.g., 1, enabled, etc.). The wireless device may not determine/expect to be configured with a CSI-RS of the CSI-RS resource over the one or more symbols, for example, based on or in response to the CSI-RS resource being associated with the NZP-CSI-RS-ResourceSet with the higher layer parameter repetition set to 'on' or another indication/value (e.g., 1, enabled, etc.).

A higher layer parameter repetition of the NZP-CSI-RS-ResourceSet may not be set to 'on' or another indication/value (e.g., 1, enabled, etc.). A base station may configure a CSI-RS resource and/or one or more search space sets associated with a CORESET in the same (or different) one or more symbols (e.g., OFDM symbols). The wireless device may determine/assume that a CSI-RS of the CSI-RS resource and one or more DM-RS ports of a PDCCH are quasi co-located with QCL-TypeD, for example, based on one or more of: the higher layer parameter repetition of the NZP-CSI-RS-ResourceSet not being set to 'on' or another indication/value (e.g., 1, enabled, etc.), and/or the CSI-RS resource and the one or more search space sets associated with the CORESET being configured in the same one or more symbols. The base station may send (e.g., transmit_the PDCCH in the one or more search space sets associated with the CORESET.

A higher layer parameter repetition of the NZP-CSI-RS-ResourceSet may not be set to 'on' or another indication/value (e.g, may be set to 0, disabled, etc.). In A base station may configure a CSI-RS resource of a first cell and one or more search space sets associated with a CORESET of a second cell in the same (or different) one or more symbols (e.g., OFDM symbols). The wireless device may determine/assume that a CSI-RS of the CSI-RS resource and one or more DM-RS ports of a PDCCH are quasi co-located with QCL-TypeD, for example, based on one or more of: the higher layer parameter repetition of the NZP-CSI-RS-ResourceSet not being set to 'on' or another indication/value (e.g., 1, enabled, etc.), and/or the CSI-RS resource and the one or more search space sets associated with the CORESET being configured in the same one or more symbols. The base station may send (e.g., transmit) the PDCCH in the one or more search space sets associated with the CORESET. The first cell and the second cell may be in different intra-band component carriers.

A base station may configure a wireless device with a CSI-RS in a first set of PRBs. The base station may configure the wireless device with one or more search space sets associated with a CORESET in one or more symbols (e.g., OFDM symbols) and/or in a second set of PRBs. The wireless device may not determine/expect that the first set of PRBs and the second set of PRBs overlap in the one or more symbols.

A base station may configure a wireless device with a CSI-RS resource and an SS/PBCH block in the same (or different) one or more symbols (e.g., OFDM symbols). The wireless device may determine/assume that the CSI-RS resource and the SS/PBCH block are quasi co-located with a QCL type (e.g., QCL-TypeD), for example, based on the CSI-RS resource and the SS/PBCH block being configured in the same one or more symbols.

The base station may configure the CSI-RS resource in a first set of PRBs for the wireless device. The base station may configure the SS/PBCH block in a second set of PRBs for the wireless device. The wireless device may not determine/expect that the first set of PRBs overlap with the second set of PRBs.

The base station may configure the CSI-RS resource with a first subcarrier spacing for the wireless device. The base station may configure the SS/PBCH block with a second subcarrier spacing for the wireless device. The wireless device may determine/expect that the first subcarrier spacing and the second subcarrier spacing are the same.

A base station may configure a wireless device with an NZP-CSI-RS-ResourceSet. The NZP-CSI-RS-ResourceSet may be configured with a higher layer parameter repetition set to 'on' or another indication/value (e.g., 1, enabled, etc.). The wireless device may determine/assume that the base station may send (e.g., transmit) one or more CSI-RS resources within the NZP-CSI-RS-ResourceSet with a same downlink spatial domain transmission filter, for example, based on the NZP-CSI-RS-ResourceSet being configured with the higher layer parameter repetition set to 'on' or another indication/value (e.g., 1, enabled, etc.). The base station may send (e.g., transmit) each CSI-RS resource of the one or more CSI-RS resources in different symbols (e.g., OFDM symbols).

The NZP-CSI-RS-ResourceSet may be configured with a higher layer parameter repetition set to 'off' or another indication/value (e.g., 0, disabled, etc.). The wireless device may not determine/assume that the base station may send (e.g., transmit) one or more CSI-RS resources within the NZP-CSI-RS-ResourceSet with a same downlink spatial domain transmission filter, for example, based on the NZP-CSI-RS-ResourceSet being configured with the higher layer parameter repetition set to 'off' or another indication/value (e.g., 0, disabled, etc.).

A base station may configure a wireless device with a higher layer parameter (e.g., groupBasedBeamReporting). The base station may set the higher layer parameter (e.g., groupBasedBeamReporting) to enabled or another indication/value (e.g., 1, on, etc.). The wireless device may report at least two different resource indicators (e.g., CRI, SSBRI) in a single reporting instance to report setting of one or more report settings, for example, based on the higher layer parameter groupBasedBeamReporting being set to enabled or another indication/value (e.g., 1, on, etc.). The wireless device may receive at least two RSs (e.g., CSI-RS, SSB) indicated by the at least two different resource indicators simultaneously. The wireless device may receive (e.g., simultaneously receive) the at least two RSs with a single spatial domain receive filter. The wireless device may receive (e.g., simultaneously receive) the at least two RSs with a plurality of simultaneous spatial domain receive filters.

A base station may need/request radio access capability information of a wireless device. The base station may initiate a procedure to request the radio access capability information. The base station may use, for example, an information element (e.g., UECapabilityEnquiry). The wireless device may use an information element (e.g., UECapabilityInformation) to transfer wireless device radio access capability information requested by the base station. The wireless device may send/provide, for example, a parameter (e.g., timeDurationForQCL) in a message (e.g., FeatureSetDownlink) indicating a set of features that the wireless device supports.

The wireless device may send/provide a threshold (e.g., timeDurationForQCL, Threshold-Sched-Offset) in an indication/message (e.g., FeatureSetDownlink) that indicates a set of features that the wireless device supports. The threshold may comprise a quantity (e.g., minimum quantity/number) of OFDM symbols required, by the wireless device, to perform a PDCCH reception with DCI, and to apply a spatial QCL information (e.g., TCI-State) received in (or indicated by) the DCI for processing a PDSCH that is scheduled by the DCI. The wireless device may require the quantity (e.g., minimum quantity/number) of OFDM symbols between the PDCCH reception and the processing of the PDSCH to apply the spatial QCL information, indicated by the DCI, to the PDSCH.

A base station may transmit reference signals (e.g., SRSs). The reference signals may be used, by a wireless device, for various purposes such as channel state estimation, uplink scheduling, downlink scheduling, link adaptation, and/or the like. A base station may configure a wireless device with one or more sounding reference signal (SRS) resource sets, for example, using a higher layer parameter (e.g., SRS-ResourceSet). The base station may configure the wireless device with one or more SRS resources, for an SRS resource set of the one or more SRS resource sets, for example, using a higher layer parameter (e.g., SRS-Resource). The wireless device may indicate a quantity (e.g., maximum value of a quantity/number) of the one or more SRS resources to the base station (e.g., using SRS_capability parameter). The base station may configure an applicability of the SRS resource set, for example, using a higher layer parameter (e.g., usage) in the higher layer parameter (e.g., SRS-ResourceSet).

The wireless device may send (e.g., transmit), at a time duration or a given time instant, one SRS resource of the one or more SRS resources in each SRS resource set (e.g., simultaneously), for example, if a higher layer parameter (e.g., usage) is set to a value/indication (e.g., BeamManagement). The wireless device may determine that the one SRS resource of the one or more SRS resources in each SRS resource set may have the same time domain behavior in a same BWP (e.g., UL BWP). The wireless device may send/transmit (e.g., simultaneously send/transmit) the one SRS resource of the one or more SRS resources in each SRS resource set in the same BWP, for example, based on the determining.

The wireless device may send (e.g., transmit,) at a time duration or a given time instant, only one SRS resource in each of the one or more SRS resource sets (e.g., simultaneously), for example, if the higher layer parameter (e.g., usage) is set to a value/indication (e.g., BeamManagement). The wireless device may determine that the only one SRS resource in each of the one or more SRS resource sets may have the same time domain behavior in a same BWP (e.g., UL BWP). The wireless device may simultaneously transmit the only one SRS resource in each of the one or more SRS resource sets in the same BWP, for example, based on the determining.

The wireless device may simultaneously transmit, at a given time instant, one SRS resource in each of one or more SRS resource sets, for example, if the higher layer parameter (e.g., usage) is set to a value/indication (e.g., BeamManagement). The wireless device may determine that the one SRS resource in each of the one or more SRS resource sets may have the same time domain behavior in a same BWP (e.g., UL BWP). The wireless device may simultaneously transmit the one SRS resource in each of the one or more SRS resource sets in the same BWP, for example, based on the determining.

The one or more SRS resource sets may comprise a first SRS resource set and a second SRS resource set. The first SRS resource set may comprise one or more first SRS resources. The one or more first SRS resources may comprise a first SRS resource and a second SRS resource. The second SRS resource set may comprise one or more second SRS resources. The one or more second SRS resources may comprise a third SRS resource and a fourth SRS resource.

A first time domain behavior of the first SRS resource and a third time domain behavior of the third SRS resource may be the same in a BWP and/or other wireless resource. The wireless device may send/transmit (e.g., simultaneously send/transmit), in a time duration or at a given time instant in the BWP, the first SRS resource of the first SRS resource set and the third SRS resource of the second SRS resource set, for example, based on a higher layer parameter (e.g., usage) being set to a value/indication (e.g., BeamManagement), and/or the first time domain behavior of the first SRS resource and the third time domain behavior of the third SRS resource being the same (or substantially the same).

A first time domain behavior of the first SRS resource and a fourth time domain behavior of the fourth SRS resource may be different in a BWP and/or other wireless resource. The wireless device may not send/transmit (e.g., simultaneously send/transmit), in a time duration or a given time instant in the BWP and/or other wireless resource, the first SRS resource of the first SRS resource set and the fourth SRS resource of the second SRS resource set, for example, based on a higher layer parameter (e.g., usage) being set to a value/indication (e.g., BeamManagement), and/or based on the first time domain behavior of the first SRS resource and the fourth time domain behavior of the fourth SRS resource being different.

A second time domain behavior of the second SRS resource and a fourth time domain behavior of the fourth SRS resource may be the same (or substantially the same) in a BWP and/or other wireless resource. The wireless device may send/transmit (e.g., simultaneously send/transmit), in a time duration or a given time instant in the BWP or other wireless resource, the second SRS resource of the first SRS resource set and the fourth SRS resource of the second SRS resource set, for example, based on a higher layer parameter (e.g., usage) being set to a value/indication (e.g., BeamManagement), and/or based on the second time domain behavior of the second SRS resource and the fourth time domain behavior of the fourth SRS resource being the same (or substantially the same).

A second time domain behavior of the second SRS resource and a third time domain behavior of the third SRS resource may be different in a BWP and/or other wireless resource. The wireless device may not send/transmit (e.g., may not simultaneously send/transmit), in a time duration or at a given time instant in the BWP or other wireless resource, the second SRS resource of the first SRS resource set and the third SRS resource of the second SRS resource set, for example, based on a higher layer parameter (e.g., usage) being set to a value/indication (e.g., BeamManagement), and/or based on the second time domain behavior of the second SRS resource and the third time domain behavior of the third SRS resource being different.

A wireless device (e.g., a higher layer parameter of the wireless device such as SRS-Resource) may configure, semi-statically, at least one of: an SRS resource indicator/ index (e.g., indicated/provided by a higher layer parameter SRS-ResourceId) indicating a configuration of an SRS resource; a time domain behavior of the configuration of the SRS resource (e.g., indicated by a higher layer parameter resourceType); an SRS sequence indicator/ID (e.g., indicated/provided by a higher layer parameter sequenceId); and/or a configuration of a spatial relation between a reference RS and a target SRS. The base station may configure the wireless device with a higher layer parameter (e.g., spatialRelationInfo). The higher layer parameter (e.g., spatialRelationInfo) may comprise an indicator (e.g., an index or an ID) of the reference RS. The domain behavior of an SRS resource may be a periodic transmission, a semi-persistent transmission, or an aperiodic SRS transmission. A time domain behavior of an SRS resource may comprise a transmission periodicity, a transmission offset of the SRS resource, and/or any other information/characteristic.

The wireless device may determine that a higher layer parameter indicating a serving cell (e.g., servingCellId) may be present in another higher layer parameter (e.g., spatialRelationInfo). The wireless device may determine that the reference RS may be a first RS (e.g., SS/PBCH block, CSI-RS) configured on the serving cell, for example, based on the determining.

The wireless device may determine that a higher layer parameter indicating an UL BWP (e.g., uplinkBWP) and a higher layer parameter indicating a serving cell (e.g., servingCellId) may be present in another higher layer parameter (e.g., spatialRelationInfo). The wireless device may determine that the reference RS may be a first RS (e.g., SRS) configured on the UL BWP of the serving cell, for example, based on the determining.

The base station may configure the target SRS on a serving cell. The wireless device may determine that a higher layer parameter (e.g., servingCellId) may be absent from another higher layer parameter (e.g., spatialRelationInfo). The wireless device may determine that the reference RS may be a first RS (e.g., SS/PBCH block, CSI-RS) configured on the serving cell, for example, based on the determining.

The base station may configure the target SRS on a serving cell. The wireless device may determine that a higher layer parameter (e.g., servingCellId) is absent and a higher layer parameter (e.g., uplinkBWP) indicating an UL BWP (or other wireless resource) is present in another higher layer parameter (e.g., spatialRelationInfo). The wireless device may determine that the reference RS may be a first RS (e.g., SRS) configured on the uplink BWP the serving cell, for example, based on the determining.

The wireless device may send (e.g., transmit) a PUSCH transmission and an SRS in a same slot. The base station may configure the wireless device to send (e.g., transmit) the SRS after the transmission of the PUSCH (and the corresponding DM-RS), for example, if the wireless device sends (e.g., transmits) the PUSCH transmission and the SRS in the same slot.

The base station may configure the wireless device with one or more SRS resource configurations. A higher layer parameter (e.g., resourceType) in a higher layer parameter (e.g., SRS-Resource) may be set to be periodic.

The base station may configure the wireless device with a higher layer parameter (e.g., spatialRelationInfo). The higher layer parameter (e.g., spatialRelationInfo) may comprise an indicator (e.g., an ID) of a reference RS (e.g., ssb-Index, csi-RS-Index, SRS).

The reference RS may be a SS/PBCH block. The reference RS may be a CSI-RS (e.g., periodic CSI-RS, semi-persistent CSI-RS, aperiodic CSI-RS). The wireless device may use a spatial domain receiving filter to receive the reference RS. The wireless device may send (e.g., transmit) a target SRS resource with a spatial domain transmission filter that may be the same as the spatial domain receiving filter, for example, based on a higher layer parameter (e.g., spatialRelationInfo) indicating the reference RS (e.g., using an ID of the reference RS) being the SS/PBCH block or the CSI-RS. The wireless device may send (e.g., transmit) a target SRS resource with the spatial domain receiving filter, for example, based on the higher layer parameter (e.g., spatialRelationInfo) indicating the reference RS (e.g., by the ID of the reference RS).

The reference RS may be an SRS (e.g., periodic SRS, semi-persistent SRS, aperiodic SRS). The wireless device may use a spatial domain transmission filter to send (e.g., transmit) the reference RS. The wireless device may send (e.g., transmit) a target SRS resource with the spatial domain transmission filter, for example, based on the higher layer parameter (e.g., spatialRelationInfo) indicating the reference RS (e.g., by the ID of the reference RS) being the SRS.

The base station may activate and/or deactivate one or more configured SRS resource sets (e.g., semi-persistent SRS resource sets) of a serving cell by sending a semi-persistent (SP) SRS Activation/Deactivation control element (e.g., MAC CE). The one or more configured SRS resource sets may be initially deactivated upon configuration. The one or more configured SRS resource sets may be deactivated after a handover.

A base station may configure a wireless device with one or more SRS resource sets (e.g., semi-persistent SRS resource sets). A higher layer parameter (e.g., resourceType) in a higher layer parameter (e.g., SRS-Resource) may be set to be semi-persistent. The wireless device may receive, from the base station, an activation command (e.g., SP SRS Activation/Deactivation MAC CE) for an SRS resource set of the one or more SRS resource sets. A PDSCH transmission may carry the activation command. The wireless device may send (e.g., transmit) an HARQ-ACK for the PDSCH in a slot n. The wireless device may apply one or more assumptions/actions for an SRS transmission of the SRS resource set starting from the slot $n+3N_{slot}^{subframe,\mu}+1$ or from slot $n+3N_{slot}^{subframe,\mu}$, for example, based on transmitting the HARQ-ACK for the PDSCH in the slot n. The activation command may comprise one or more spatial relation assumptions for one or more SRS resources of the SRS resource set. A first field (e.g., Resource IDi) in the activation command may comprise an indicator (e.g., identifier) of a resource (e.g., SS/PBCH block, NZP CSI-RS, SRS) that may be used for spatial relationship derivation for an SRS resource of the one or more SRS resources. The one or more spatial relation assumptions may be indicated/ provided by a list of references to one or more reference signal indicators (e.g., IDs such as SSB-Index, SRS-ResourceId, etc). The activation command may comprise one reference signal indicator per SRS resource of the (activated) SRS resource set. A spatial relation assumption of the one or more spatial relation assumption may be indicated/provided by a reference to an indicator (e.g., ID) of a reference RS. The reference RS may be at least one of: an SS/PBCH block, an NZP CSI-RS resource, and/or an SRS.

A Resource Serving Cell indicator (e.g., ID) field may be present in the activation command. The Resource Serving Cell ID field may indicate a serving cell. The reference RS may be an SS/PBCH block resource or an NZP CSI-RS resource. The reference RS (e.g., SS/PBCH block, NZP CSI-RS resource) may be configured on the serving cell, for example, based on the Resource Serving Cell ID field (or other field) being present and the reference RS being the SS/PBCH block resource, the NZP CSI-RS resource, or other resource.

The base station may configure the SRS resource set (e.g., the activated SRS resource set) on a serving cell. A Resource Serving Cell ID field may be absent in the activation command. The reference RS (e.g., SS/PBCH block, NZP CSI-RS resource) may be configured on the serving cell, for example, based on the Resource Serving Cell ID field being absent and/or the base station configuring the SRS resource set on the serving cell.

A Resource Serving Cell ID field indicating a serving cell, and/or a Resource BWP ID field indicating an UL BWP may be present in the activation command. The reference RS (e.g., SRS resource) may be configured on the UL BWP of the serving cell, for example, based on the Resource Serving Cell ID field and/or the Resource BWP ID field being present.

The base station may configure the SRS resource set on an UL BWP (or other wireless resource) of a serving cell. A Resource Serving Cell ID field and/or a Resource BWP ID field may be absent in the activation command. The reference RS (e.g., SRS resource) may be configured on the UL BWP (or other wireless resource) of the serving cell, for example, based on the Resource Serving Cell ID field and/or the Resource BWP ID field being absent, and/or based on the SRS resource set being configured on the UL BWP of the serving cell.

The base station may configure an SRS resource in the SRS resource set (e.g., the activated SRS resource set) with a higher layer parameter (e.g., spatialRelationInfo). The wireless device may assume/determine that a reference RS (e.g., indicated by an ID of the reference RS) in the activation command overrides a second reference RS configured in the higher layer parameter spatialRelationInfo, for example, based on the SRS resource, in the activated SRS resource set, being configured with a higher layer parameter (e.g., spatialRelationInfo).

The wireless device may receive, from the base station, a deactivation command (e.g., SP SRS Activation/Deactivation MAC CE) for an SRS resource set (e.g., activated SRS resource set) of the one or more SRS resource sets. A PDSCH transmission may carry the deactivation command. The wireless device may send (e.g., transmit) an HARQ-ACK for the PDSCH transmission in a slot n. The wireless device may apply one or more assumptions/actions for a cessation of an SRS transmission of the SRS resource set (e.g., deactivated SRS resource set) starting from the slot $n+3N_{slot}^{subframe,\mu}+1$ or from slot $n+3N_{slot}^{subframe,\mu}$, for example, based on transmitting the HARQ-ACK for the PDSCH transmission in the slot n.

A wireless device may activate a semi-persistent SRS resource configuration on an UL BWP (or other wireless resource) of a serving cell, for example, based on or in response to receiving, from a base station, an activation command for the semi-persistent SRS resource configuration. The wireless device may not receive, from the base station, a deactivation command for the semi-persistent SRS resource configuration.

The UL BWP may be an active uplink BWP of the serving cell. The wireless device may determine/consider that the semi-persistent SRS resource configuration is active, for example, based on the UL BWP being the active uplink BWP of the serving cell and/or based on not receiving the deactivation command for the semi-persistent SRS resource configuration. The wireless device may send (e.g., transmit) an SRS transmission, via the UL BWP of the serving cell, according to the semi-persistent SRS resource configuration, for example, based on considering/determining that the semi-persistent SRS resource configuration is active.

The UL BWP may not be an active uplink BWP of the serving cell. The UL BWP may be, for example, deactivated in the serving cell. In The wireless device may determine/assume that the semi-persistent SRS configuration is suspended in the UL BWP of the serving cell, for example, based on not receiving the deactivation command for the semi-persistent SRS resource configuration and/or based on the UL BWP being deactivated. The semi-persistent SRS configuration being suspended in the UL BWP may comprise that the wireless device may reactivate the semi-persistent SRS configuration, for example, if the UL BWP becomes an active UL BWP of the serving cell.

A first SRS resource of an SRS resource set may have a first time domain behavior (e.g., periodic, semi-persistent, aperiodic). A second SRS resource of the SRS resource set may have a second time domain behavior (e.g., periodic, semi-persistent, aperiodic). The first time domain behavior may be the same as, substantially the same as, or different from, the second time domain behavior. The wireless device may determine/expect that the first time domain behavior and the second time behavior are the same (or substantially the same), for example, based on the first SRS resource and the second SRS resource being in the (same) SRS resource set. The wireless device may not determine/expect that the first time domain behavior and the second time behavior are different, for example, based on the first SRS resource and the second SRS resource being in the (same) SRS resource set.

An SRS resource of an SRS resource set may have a first time domain behavior (e.g., periodic, semi-persistent, aperiodic). The SRS resource set may have a second time domain behavior (e.g., periodic, semi-persistent, aperiodic). The wireless device may determine/expect that the first time domain behavior and the second time behavior are the same (or substantially the same), for example, based on the SRS resource being associated with the SRS resource set. The wireless device may not determine/expect that the first time domain behavior and the second time behavior are different, for example, based on the SRS resource being associated with the SRS resource set. The SRS resource being associated with the SRS resource set may comprise that the SRS resource set comprises the SRS resource. The SRS resource being associated with the SRS resource set may comprise that the SRS resource is an element of the SRS resource set.

A base station may configure a wireless device with a PUCCH transmission on at least one first symbol on a carrier (e.g., SUL, NUL). The PUCCH transmission may carry/comprise one or more CSI reports. The PUCCH transmission may carry/comprise one or more L1-RSRP reports. The PUCCH transmission may carry/comprise HARQ-ACK and/or SR. The base station may configure the wireless device with an SRS configuration on the carrier. The SRS configuration may be a semi-persistent SRS configuration. The SRS configuration may be a periodic SRS configuration. The wireless device may determine that the PUCCH transmission and an SRS transmission of the SRS configuration overlap in, for example, at least one symbol. The wireless device may determine that the at least one first symbol of the PUCCH transmission and at least one second symbol of the SRS transmission of the SRS configuration may overlap in the at least one symbol. The wireless device may not perform the SRS transmission, on the carrier and/or on the at least one symbol, for example, based on the determining.

A base station may configure a wireless device with a PUCCH transmission on at least one first symbol on a carrier (e.g., SUL, NUL). The PUCCH may carry/comprise HARQ-ACK and/or SR. The base station may trigger an SRS configuration on the carrier. The SRS configuration may be an aperiodic SRS configuration. The wireless device may determine that the PUCCH transmission and an SRS transmission of the SRS configuration overlap in at least one symbol. The wireless device may determine that the at least one first symbol of the PUCCH transmission and at least one second symbol of the SRS transmission of the SRS configuration may overlap in the at least one symbol. The wireless device may not perform the SRS transmission, on the carrier and on the at least one symbol, for example, based on the determining.

The wireless device may drop the SRS transmission on the at least one symbol, for example, if the wireless device does not perform the SRS transmission. The wireless device may perform the SRS transmission on at least one third symbol of the at least one second symbol. The at least one third symbol may not overlap with the at least one symbol.

A base station may configure a wireless device with a PUCCH transmission on at least one first symbol on a carrier (e.g., SUL, NUL). The PUCCH transmission may carry/comprise one or more semi-persistent CSI reports. The PUCCH transmission may carry/comprise one or more periodic CSI reports. The PUCCH transmission may carry/comprise one or more semi-persistent L1-RSRP reports. The PUCCH transmission may carry/comprise one or more periodic L1-RSRP reports. The base station may trigger an SRS configuration on the carrier. The SRS configuration may be an aperiodic SRS configuration. The wireless device may determine that the PUCCH transmission and an SRS transmission of the SRS configuration overlap in at least one symbol. The wireless device may determine that the at least one first symbol of the PUCCH transmission and at least one second symbol of the SRS transmission of the SRS configuration being the aperiodic SRS configuration may overlap in the at least one symbol. The wireless device may not send (e.g., may not transmit) the PUCCH transmission, on the carrier, on the at least one symbol, for example, based on or in response to the determining.

A wireless device may not send/transmit (e.g., simultaneously send/transmit) an SRS and a PUCCH/PUSCH transmission, for example, in an intra-band CA or in an inter-band CA band-band combination. A base station may not configure the wireless device with an SRS transmission from/in a first carrier and a PUCCH/PUSCH transmission (e.g., PUSCH/UL DM-RS/UL PT-RS/PUCCH formats) from/in a second carrier in the same symbol, for example, based on not sending/transmitting the SRS and the PUCCH/PUSCH transmission simultaneously. The first carrier may be different from (or the same as) the second carrier.

A wireless device may not send/transmit (e.g., may not simultaneously send/transmit) an SRS and a PRACH, for example, in an intra-band CA and/or in an inter-band CA band-band combination. The wireless device may not send/transmit an SRS from a first carrier, and a PRACH transmission from a second carrier, simultaneously, for example based on or in response to not sending/transmitting the SRS and the PRACH transmission simultaneously. The first carrier may be different from (or the same as) the second carrier.

A base station may configure a wireless device with a periodic SRS transmission on at least one symbol (e.g., an OFDM symbol). The base station may configure an SRS resource with a higher layer parameter (e.g., resourceType) set as aperiodic. The base station may trigger the SRS resource on the at least one symbol. The wireless device may send (e.g., transmit) the aperiodic SRS resource on the at least one overlapping symbol, for example, based on the SRS resource (e.g., with the higher layer parameter resourceType set as aperiodic) being triggered on the at least one symbol that is configured with the periodic SRS transmission. The wireless device may not perform the periodic SRS transmission on the at least one symbol, for example, based on the SRS resource (e.g., with the higher layer parameter resourceType set as aperiodic) being triggered on the at least one symbol configured with the periodic SRS transmission. The not performing the periodic SRS transmission may comprise that the wireless device may not send/transmit an SRS associated with the periodic SRS transmission on the at least one overlapping symbol.

A base station may configure a wireless device with a semi-persistent SRS transmission on at least one symbol (e.g., an OFDM symbol). The base station may configure an SRS resource with a higher layer parameter (e.g., resourceType) set as 'aperiodic'. The base station may trigger the SRS resource on the at least one symbol. The wireless device may send (e.g., transmit) the aperiodic SRS resource on the at least one overlapping symbol, for example, based the SRS resource (e.g., with the higher layer parameter resourceType set as aperiodic) being triggered on the at least one symbol that is configured with the semi-persistent SRS transmission. The wireless device may not perform the semi-persistent SRS transmission on the at least one symbol, for example, based the SRS resource (e.g., with the higher layer parameter resourceType set as aperiodic) being triggered on the at least one symbol that is configured with the semi-persistent SRS transmission. The not performing the semi-persistent SRS transmission may comprise that the wireless device may not transmit an SRS associated with the semi-persistent SRS transmission on the at least one overlapping symbol.

A base station may configure a wireless device with a periodic SRS transmission on at least one symbol (e.g., an OFDM symbol). The base station may configure an SRS resource with a higher layer parameter (e.g., resourceType) set as semi-persistent. The base station may trigger the SRS resource on the at least one symbol. The wireless device may send (e.g., transmit) the semi-persistent SRS resource on the at least one overlapping symbol, for example, based on the SRS resource (e.g., with the higher layer parameter resourceType set as semi-persistent) being triggered on the at least one symbol that is configured with the periodic SRS transmission. The wireless device may not perform the periodic SRS transmission on the at least one symbol, for example, based on the SRS resource (e.g., with the higher layer parameter resourceType set as semi-persistent) being triggered on the at least one symbol that is configured with the periodic SRS transmission. The not performing the periodic SRS transmission may comprise that the wireless device may not send (e.g., transmit) an SRS associated with the periodic SRS transmission on the at least one overlapping symbol.

A wireless device may be configured, by a base station, with one or more serving cells. The base station may activate one or more second serving cells of the one or more serving cells. The base station may configure each activated serving cell, of the one or more second serving cells, with a respective PDCCH monitoring configuration. The wireless device may monitor a set of PDCCH candidates, in one or more CORESETs, on an active DL BWP of each activated serving cell that is configured with the respective PDCCH monitoring configuration. The wireless device may monitor the set of PDCCH candidates in the one or more CORESETs based on or according to corresponding search space sets. The monitoring may comprise decoding each PDCCH candidate of the set of PDCCH candidates according to monitored DCI formats.

A set of PDCCH candidates that are monitored by a wireless device may be defined in terms of PDCCH search space sets. A search space set may be a common search space (CSS) set or a wireless device-specific search space set (e.g., a UE-specific search space (USS) set).

One or more PDCCH monitoring occasions may be associated with a SS/PBCH block. The SS/PBCH block may be quasi-co-located with a CSI-RS. A TCI state of an active BWP may comprise the CSI-RS. The active BWP may comprise a CORESET that is indicated (e.g., identified) by an index that is equal to zero (e.g., CORESET zero). The wireless device may determine the TCI state by one or more of (e.g., the most recent of): an indication by a MAC CE activation command, and/or an RA procedure that is not initiated by a PDCCH order that triggers a non-contention based RA procedure. A wireless device may monitor, for a DCI format with CRCs scrambled by a C-RNTI, corresponding PDCCH candidates at the one or more PDCCH monitoring occasions, for example, based on the one or more PDCCH monitoring occasions being associated with the SS/PBCH block.

A base station may configure a wireless device with one or more DL BWPs in a serving cell. The wireless device may be indicated/provided, by a higher layer signaling, with one or more (e.g., 2, 3, or any other quantity of) CORESETs for a DL BWP of the one or more DL BWPs. The base station may send/provide, a higher layer parameter (e.g., ControlResourceSet) to the wireless device. The higher layer parameter may be for a CORESET of the one or more CORESETs, and/or may indicate/provide at least one of: a CORESET index (e.g., indicated/provided by higher layer parameter, controlResourceSetId), a DM-RS scrambling sequence initialization value (e.g., indicate/provided by a higher layer parameter, pdcch-DM-RS-ScramblingID), a quantity of consecutive symbols (e.g., indicated/provided by a higher layer parameter, duration), a set of resource blocks (e.g., indicated/provided by higher layer parameter, frequencyDomainResources), CCE-to-REG mapping parameters (e.g., indicated/provided by higher layer parameter, cce-REG-MappingType), an antenna port quasi co-location (e.g., from a set of antenna port quasi co-locations indicated/provided by a first higher layer parameter, tci-StatesPDCCH-ToAddList, and a second higher layer parameter, tci-StatesPDCCH-ToReleaseList), and/or an indication for a presence or absence of a TCI field for a DCI format (e.g., DCI format 1_1) transmitted by a PDCCH in the CORESET (e.g., indicated/provided by higher layer parameter, TCI-PresentInDCI). The antenna port quasi co-location may indicate a quasi co-location information of one or more DMRS antenna ports for a PDCCH reception in the CORESET. The CORESET index may be unique among the one or more DL BWPs of the serving cell. The wireless device may determine/consider that a TCI field is absent/disabled in the DCI format, for example, if the higher layer parameter (e.g., TCI-PresentInDCI) is absent.

A first higher layer parameter (e.g., tci-StatesPDCCH-ToAddList) and a second higher layer parameter (e.g., tci-StatesPDCCH-ToReleaseList) may indicate/provide a subset of TCI states, such as defined by a third higher layer parameter (e.g., PDSCH-Config). The wireless device may use the subset of the TCI states to indicate/provide one or more QCL relationships between one or more RS in a TCI state of the subset of the TCI states and one or more DM-RS ports of a PDCCH reception in the CORESET.

A base station may configure a CORESET, for a wireless device, with a corresponding CORESET index (e.g., indicated/provided by higher layer parameter, controlResourceSetId) that is non-zero. The base station may or may not configure the wireless device with a configuration of one or more TCI states for the CORESET (e.g., may or may not configure a first higher layer parameter, tci-StatesPDCCH-ToAddList, and/or a second higher layer parameter, tci-StatesPDCCH-ToReleaseList). The wireless device may determine/assume that one or more DMRS antenna ports for a PDCCH reception in the CORESET is quasi co-located with an RS (e.g., SS/PBCH block), for example, based on not being configured with the configuration of the one or more TCI states for the CORESET. The wireless device may indicate/identify the RS during an initial access procedure.

A base station may configure a CORESET for a wireless device with a corresponding CORESET index (e.g., indicated/provided by higher layer parameter, controlResourceSetId) that is non-zero. The base station may configure the wireless device with an initial configuration of at least two TCI states, for the CORESET (e.g., using a first higher layer parameter, tci-StatesPDCCH-ToAddList and/or a second higher layer parameter, tci-StatesPDCCH-ToReleaseList). The wireless device may receive the initial configuration of the at least two TCI states from the base station. The wireless device may or may not receive a MAC CE activation command for at least one of the at least two TCI states for the CORESET. The wireless device may determine/assume that one or more DM-RS antenna ports for a PDCCH reception in the CORESET is quasi co-located with an RS (e.g., SS/PBCH block), for example, based on being configured with the initial configuration for the CORESET and not receiving the MAC CE activation command for the CORESET. The wireless device may indicate/identify the RS during an initial access procedure.

A base station may configure a CORESET for a wireless device with a corresponding CORESET index (e.g., indicated/provided by higher layer parameter controlResourceSetId) that is equal to zero. The wireless device may not receive a MAC CE activation command for a TCI state for the CORESET. The wireless device may determine/assume that one or more DM-RS antenna ports for a PDCCH reception in the CORESET is quasi co-located with an RS (e.g., SS/PBCH block), for example, based on not receiving the MAC CE activation command. The wireless device may indicate/identify the RS during an initial access procedure. The wireless device may indicate/identify the RS from a most recent RA procedure. The wireless device may not initiate (e.g., refrain from initiating) the most recent RA procedure based on or in response to receiving a PDCCH order triggering a non-contention based RA procedure.

A base station may configure a wireless device with a single TCI state for a CORESET. The base station may configure the single TCI state using a first higher layer parameter (e.g., tci-StatesPDCCH-ToAddList) and/or a second higher layer parameter (e.g., tci-StatesPDCCH-ToReleaseList). The wireless device may determine/assume that one or more DM-RS antenna ports for a PDCCH reception in the CORESET is quasi co-located with one or more DL RSs configured by the single TCI state, for example, based on being configure with the single TCI state for the CORESET.

A base station may configure a CORESET for a wireless device. The base station may configure the wireless device with a configuration of at least two TCI states for the CORESET (e.g., using a first higher layer parameter, tci-StatesPDCCH-ToAddList, and/or a second higher layer parameter tci-StatesPDCCH-ToReleaseList). The wireless device may receive the configuration of the at least two TCI states from the base station. The wireless device may receive a MAC CE activation command for at least one of the at least two TCI states for the CORESET. The wireless device may determine/assume that one or more DM-RS antenna ports for a PDCCH reception in the CORESET is quasi co-located with one or more DL RSs configured by the single TCI state, for example, based on the receiving the MAC CE activation command for the at least one of the at least two TCI states.

A base station may configure a CORESET for a wireless device with a corresponding CORESET index (e.g., indicated/provided by higher layer, parameter controlResourceSetId) that is equal to zero. The base station may configure the wireless device with a configuration of at least two TCI states for the CORESET. The wireless device may receive the configuration of the at least two TCI states from the base station. The wireless device may receive a MAC CE activation command for at least one of the at least two TCI states for the CORESET. The wireless device may determine/expect that a QCL type (e.g., QCL-TypeD) of a first RS (e.g., CSI-RS) in the at least one of the at least two TCI states is indicated/provided by a second RS (e.g., SS/PBCH block), for example, based on the CORESET index being equal to zero. The wireless device may determine/expect that a QCL type (e.g., QCL-TypeD) of a first RS (e.g., CSI-RS) in the at least one of the at least two TCI states is spatially QCL-ed with a second RS (e.g., SS/PBCH block), for example, based on the CORESET index being equal to zero.

A wireless device may receive a MAC CE activation command for at least one of at least two TCI states for a CORESET. A PDSCH transmission may comprise the MAC CE activation command. The wireless device may send (e.g., transmit) a HARQ-ACK information for the PDSCH in a slot. The wireless device may apply the MAC CE activation command a time duration (e.g., 3 ms, 5 ms, or any other quantity of time duration) after the slot, for example, if the wireless device receives the MAC CE activation command for the at least one of the at least two TCI states for the CORESET, and/or based on (e.g., after or in response to) the transmitting HARQ-ACK information in the slot. A first BWP may be active in a second/other slot, for example, if the wireless device applies the MAC CE activation command in the second/other slot. The first BWP may be an active BWP, for example, based on the first BWP being active in the second/other slot.

A base station may configure a wireless device with one or more DL BWPs in a serving cell. The wireless device may be configured (e.g., by higher layers) with one or more (e.g., 3, 5, 10, or any other quantity of) search space sets for a DL BWP of the one or more DL BWPs. The wireless device may be configured by a higher layer parameter (e.g., SearchSpace), for a search space set of the one or more search space sets, at least one of: a search space set index (e.g., indicated/provided by a higher layer parameter searchSpaceId); an association between the search space set and a CORESET (e.g., indicated/provided by a higher layer parameter controlResourceSetId); a PDCCH monitoring periodicity of a first number of slots and a PDCCH monitoring offset of a second number of slots (e.g., indicated/provided by a higher layer parameter monitoringSlotPeriodicityAndOffset); a PDCCH monitoring pattern within a slot, indicating first symbol(s) of the CORESET within the slot for PDCCH monitoring, (e.g., indicated/provided by a higher layer parameter monitoringSymbolsWithinSlot); a duration of a third number of slots (e.g., indicated/provided by a higher layer parameter duration); a number of PDCCH candidates; and/or an indication that the search space set is either a common search space set or a wireless device-specific search space set (e.g., indicated/provided by a higher layer parameter searchSpaceType). The duration may indicate a quantity of slots comprising the search space set.

The wireless device may determine a PDCCH monitoring occasion, on an active DL BWP, for example, based on the PDCCH monitoring periodicity, the PDCCH monitoring offset, and/or the PDCCH monitoring pattern within a slot. The wireless device may determine, for the search space set, that a PDCCH monitoring occasion exists in a slot. The wireless device may monitor at least one PDCCH for the search space set for the duration of third number of slots (e.g., consecutive slots) starting from the slot.

A wireless device may monitor one or more PDCCH candidates in a USS set on an active DL BWP of a serving cell. A base station may not configure the wireless device with a carrier indicator field. The wireless device may monitor the one or more PDCCH candidates without the carrier indicator field, for example, if the base station does not configure the wireless device with the carrier indicator field.

A wireless device may monitor one or more PDCCH candidates in a USS set on an active DL BWP of a serving cell. A base station may configure the wireless device with a carrier indicator field. The wireless device may monitor the one or more PDCCH candidates with the carrier indicator field, for example, if the base station configures the wireless device with the carrier indicator field.

A base station may configure a wireless device to monitor one or more PDCCH candidates with a carrier indicator field in a first cell. The carrier indicator field may indicate a second cell. The carrier indicator field may correspond to a second cell. The wireless device may not determine/expect to monitor the one or more PDCCH candidates on an active DL BWP of the second cell, for example, based on monitoring the one or more PDCCH candidates, in the first cell, with the carrier indicator field indicating the second cell.

A wireless device may monitor one or more PDCCH candidates on an active DL BWP of a serving cell. The wireless device may monitor the one or more PDCCH candidates for the serving cell, for example, based on monitoring the one or more PDCCH candidates on the active DL BWP of the serving cell.

A wireless device may monitor one or more PDCCH candidates on an active DL BWP of a serving cell. The wireless device may monitor the one or more PDCCH candidates at least for the serving cell, for example, based on monitoring the one or more PDCCH candidates on the active DL BWP of the serving cell. The wireless device may monitor the one or more PDCCH candidates for the serving cell and/or at least a second serving cell.

A base station may configure a wireless device with one or more cells. The base station may configure the wireless device for a single-cell operation, for example, if a quantity of the one or more cells is one. The base station may configure the wireless device for an operation with a carrier aggregation in a same frequency band (e.g., intra-band), for example, if a quantity of the one or more cells is more than one.

The wireless device may monitor one or more PDCCH candidates in overlapping PDCCH monitoring occasions in a plurality of CORESETs on active DL BWP(s) of the one or more cells. The plurality of the CORESETs may have different QCL-TypeD properties.

The plurality of CORESETs may comprise a first CORESET and/or a second CORESET. A first PDCCH monitoring occasion in the first CORESET of a first cell (e.g., of the one or more cells) may overlap with a second PDCCH monitoring occasion in a second CORESET of the first cell. The wireless device may monitor at least one first PDCCH candidate in the first PDCCH monitoring occasion on an active DL BWP (e.g., of the active DL BWP(s)) of the first cell. The wireless device may monitor at least one second PDCCH candidate in the second PDCCH monitoring occasion on the active DL BWP of the first cell.

The one or more cells may comprise a first cell and a second cell. A first PDCCH monitoring occasion in a first CORESET of a first cell may overlap with a second PDCCH monitoring occasion in a second CORESET of a second cell. The wireless device may monitor at least one first PDCCH candidate in the first PDCCH monitoring occasion on a first active DL BWP (e.g., of the active DL BWP(s)) of the first cell. The wireless device may monitor at least one second PDCCH candidate in the second PDCCH monitoring occasion on a second active DL BWP (e.g., of the active DL BWP(s)) of the second cell.

A first QCL type property (e.g., QCL-TypeD) of the first CORESET may be different from a second QCL type property (e.g., QCL-TypeD) of the second CORESET. The wireless device may use a CORESET determination rule. For example, the wireless device may use a CORESET determination rule to determine a selected CORESET, of the plurality of the CORESETs, of a cell of one or more cells. The wireless device may determine the selected CORESET, for example, based on the monitoring the one or more PDCCH candidates in the overlapping PDCCH monitoring occasions in a first plurality of CORESETs and a second plurality of the CORESETs having the different QCL type properties. The wireless device may monitor at least one PDCCH candidate, in the overlapping PDCCH monitoring occasions, in the selected CORESET on an active DL BWP of the cell, for example, based on determining the selected CORESET. The selected CORESET may be associated with a search space set. The association may be indicated/provided by a higher layer parameter (e.g., controlResourceSetId).

One or more CORESETs of the plurality of CORESETs may be associated with a CSS set. The association of the one or more CORESETs of the plurality of CORESETs with the CSS set may comprise that at least one search space set of a CORESET of the one or more CORESETs has at least one PDCCH candidate in the overlapping PDCCH monitoring occasions and/or is a CSS set. The association between the at least one search space set and the CORESET may be indicated/provided by a higher layer parameter (e.g., controlResourceSetId).

A first CORESET may be associated with a first CSS set. The first CORESET may be associated with a first USS set. A second CORESET may be associated with a second CSS set. The second CORESET may be associated with a second USS set. Association of a CORESET (e.g., the first CORESET, the second CORESET) with a CSS set (e.g., first CSS set, second CSS set) may comprise that at least one search space of the CORESET is the CSS set. Association of CORESET (e.g., the first CORESET, the second CORESET) with an USS set (e.g., first USS set, second USS set) may comprise that at least one search space of the CORESET is the USS set. The one or more CORESETs may comprise the first CORESET and the second CORESET, for example, if the first CORESET is associated with the first CSS set and the second CORESET is associated with the second CSS set.

One or more selected cells may comprise the first cell and the second cell, for example, if the first CORESET is configured in the first cell and the second CORESET is configured in the second cell. The one or more selected cells may comprise the first cell, for example, if the first CORESET is configured in the first cell and the second CORESET is configured in the first cell. At least one CORESET may comprise the first CORESET and the second CORESET. A first search space set of the first CORESET of the at least one CORESET may be indicated/identified by a first search space set specific index (e.g., indicated/provided by a higher layer parameter searchSpaceId). The wireless device may monitor the at least one first PDCCH candidate in the first PDCCH monitoring occasion in the first CORESET associated with the first search space set. The association may be indicated/provided by a higher layer parameter (e.g., controlResourceSetId). A second search space set of the second CORESET of the at least one CORESET may be indicated/identified by a second search space set specific index (e.g., indicated/provided by a higher layer parameter searchSpaceId). The wireless device may monitor the at least one second PDCCH candidate in the second PDCCH monitoring occasion in the second CORESET associated with the second search space set. The association may be indicated/provided by a higher layer parameter (e.g., controlResourceSetId). The first search space set specific index may be lower than the second search space set specific index. The wireless device may select the first search space set (e.g., for a CORESET determination rule), for example, if the first search space set specific index is lower than the second search space set specific index. The wireless device may monitor the at least one first PDCCH candidate in the first PDCCH monitoring occasion in the first CORESET on the active DL BWP of the first cell, for example, based on determining/selecting the first search space set. The wireless device may stop monitoring the at least one second PDCCH candidate in the second PDCCH monitoring occasion in the second CORESET on the active DL BWP of the first cell, for example, based on determining/selecting the first search space set. The wireless device may stop/drop monitoring the at least one second PDCCH candidate in the second PDCCH monitoring occasion in the second CORESET on the active DL BWP of the first cell, for example, based on determining/selecting the first search space set.

The first cell may be indicated/identified by a first cell-specific index and the second cell may be indicated/identified by a second cell-specific index. The first cell-specific index may be less than the second cell-specific index. The wireless device may select the first cell, based on or in response to the first cell-specific index being less than the second cell-specific index, for example, if the one or more selected cells comprises the first cell and the second cell.

The one or more CORESETs may comprise the first CORESET, for example, if the first CORESET is associated with the first CSS set and the second CORESET is associated with the second USS set. The one or more selected cells may comprise the first cell, for example, if the one or more CORESETS comprises the first CORESET and the first CORESET is configured in the first cell.

The one or more CORESETs may comprise the second CORESET. The one or more selected cells may comprise the first cell, for example, if the one or more CORESETs comprises the second CORESET and the second CORESET is configured in the first cell. The one or more selected cells may comprise the second cell, for example, if the one or more CORESETs comprises the second CORESET and the second CORESET is configured in the second cell.

The wireless device may determine that the one or more CORESETs are associated with one or more selected cells of the one or more cells. The base station may configure a first CORESET and a second CORESET of the one or more CORESETs in a first cell of the one or more selected cells. The base station may configure a third CORESET of the one or more CORESETs in a second cell of the one or more selected cells. The first cell and the second cell may be different (or the same).

The wireless device may receive, from the base station, one or more configuration parameters. The one or more configuration parameters may indicate, for example, cell-specific indices (e.g., indicated/provided by a higher layer parameter servCellIndex) for the one or more cells. Each cell of the one or more cells may be indicated/identified by a respective one cell-specific index of the cell-specific indices. A cell-specific index of a cell of the one or more selected cells may be least among the cell-specific indices of the one or more selected cells.

The wireless device may select (e.g., for the CORESET determination rule) the cell, for example, if the cell-specific index of the cell is least among the cell-specific indices of the one or more selected cells. The base station may configure at least one CORESET of the one or more CORESETs in the selected cell. At least one search space set of the at least one CORESET may have at least one PDCCH candidate in the overlapping PDCCH monitoring occasions and/or may be a CSS set.

The one or more configuration parameters may indicate search space set specific indices for the at least one search space set of the cell. The indices may be indicated/provided by a higher layer parameter (e.g., searchSpaceId). Each search space set of the at least one search space set may be indicated/identified by a respective search space set specific index of the search space set specific indices. The wireless device may determine that a search space specific index of a search space set of the at least one search space set may be least among the search space set specific indices of the at least one search space set. The wireless device may determine/select, for the CORESET determination rule, the search space set, for example, if the search space specific index of the search space set specific index is least among the search space set specific indices of the at least one search space set. The search space set may be associated with a selected CORESET of the at least one CORESET. The association may be indicated/provided by a higher layer parameter (e.g., controlResourceSetId).

The wireless device may monitor at least one PDCCH in the selected CORESET of the plurality of the CORESETs on an active DL BWP of the cell of the one or more cells, for example, based on selecting the cell and/or the selecting the search space set associated with the selected CORESET. The wireless device may monitor the at least one PDCCH, for example, if the wireless device monitors the one or more PDCCH candidates in the overlapping PDCCH monitoring occasions in the plurality of CORESETs, and CORESETs in the plurality of the CORESETs have different QCL-Type (e.g. QCLTypeD) properties. The wireless device may determine/select, based on the CORESET determination rule, the determined/selected CORESET associated with the search space set and the cell.

The selected CORESET may have a first QCL-TypeD property. A second CORESET of the plurality of the CORESETs may have a second QCL-TypeD property. The selected CORESET and the second CORESET may be different. The first QCL-TypeD property and the second QCL-TypeD property may be same. The wireless device may monitor at least one second PDCCH candidate (e.g., in the overlapping PDCCH monitoring occasions) in the second CORESET of the plurality of the CORESETs, for example, if the first QCL-TypeD property of the selected CORESET and the second QCL-TypeD property of the second CORESET are the same.

The first QCL-TypeD property and the second QCL-TypeD property may be different. The wireless device may stop/drop monitoring at least one second PDCCH candidate (e.g., in the overlapping PDCCH monitoring occasions) in the second CORESET of the plurality of the CORESETs, for example, if the first QCL-TypeD property of the selected CORESET and the second QCL-TypeD property of the second CORESET are different. The wireless device may stop/drop monitoring at least one second PDCCH candidate (e.g., in the overlapping PDCCH monitoring occasions) in the second CORESET of the plurality of the CORESETs, for example, if the first QCL-TypeD property of the determined/selected CORESET and the second QCL-TypeD property of the second CORESET are different. The wireless device may determine a quantity of active TCI states from the plurality of CORESETs.

A wireless device may determine/consider, for a CORESET determination rule, that a first QCL type (e.g., QCL TypeD) property of a first RS (e.g., SS/PBCH block) is different from a second QCL type (e.g., QCL TypeD) property of a second RS (CSI-RS). A first RS (e.g., CSI-RS) may be associated (e.g., QCL-ed) with an RS (e.g., SS/PBCH block) in a first cell, for example, for the CORESET determination rule. A second RS (e.g., CSI-RS) may be associated (e.g., QCL-ed) with the RS in a second cell. The wireless device may consider that a first QCL type (e.g., QCL TypeD) property of the first RS and a second QCL type (e.g., QCL TypeD) property of the second RS are the same, for example, if the first RS and the second RS are associated with the RS.

A wireless device may monitor a search space set, or multiple search space sets associated with different CORESETs for one or more cells. The wireless device may monitor multiple search space sets, for example, for a single cell operation or for an operation with carrier aggregation in a same frequency band. At least two monitoring occasions of at least two search space sets of the multiple search space sets may overlap in time (e.g., at least one symbol, at least one slot, subframe, etc). The at least two search space sets may be associated with at least two first CORESETs. The at least two first CORESETs may have different QCL-TypeD properties. The wireless device may monitor at least one search space set associated with a selected CORESET in an active DL BWP of a cell, for example, based on a CORESET determination rule. The at least one search space set may be a CSS set. A cell-specific index of the cell may be lowest among cell-specific indices of the one or more cells comprising the cell. At least two second CORESETs of the cell may comprise a CSS set. The wireless device may determine/select a CORESET (e.g., determined/selected CORESET) of the at least two second CORESETs, for example, if a search space specific index of a search space set associated with the determined/selected CORESET is the least among search space specific indices of search space sets associated with the at least two second CORESETs. The wireless device may monitor the search space set in the at least two monitoring occasions.

The wireless device may determine that the at least two first CORESETs may or may not be associated with a CSS set. The wireless device may determine, for example, that each CORESET of the at least two first CORESETs may not be associated with a CSS set. The wireless device may monitor at least one search space set associated with a selected CORESET in an active DL BWP of a cell, for example, based on the CORESET determination rule and/or based on the determining that the at least two first CORESETs are not associated with a CSS set. The at least one search space set may be a USS set. A cell-specific index of the cell may be least among cell-specific indices of the one or more cells comprising the cell. At least two second CORESETs of the cell may comprise a USS set. The wireless device may determine/select a CORESET (e.g., determined/selected CORESET) of the at least two second CORESETs, for example, if a search space specific index of a search space set associated with the selected CORESET is the least among search space specific indices of search space sets associated with the at least two second CORESETs. The wireless device may monitor the search space set in the at least two monitoring occasions.

A base station may indicate to a wireless device, a TCI state for a CORESET of a serving cell, for example, by sending a TCI state indication for wireless device-specific (e.g., UE-specific) PDCCH MAC CE. The base station may indicate the TCI state for a PDCCH reception. The wireless device (e.g., a MAC entity of the wireless device) may indicate to lower layers (e.g., a PHY entity) information regarding the TCI state indication for the wireless device-specific PDCCH MAC CE, for example, if the wireless device (e.g., the MAC entity) receives a TCI state indication for the wireless device-specific PDCCH MAC CE on/for a serving cell.

A TCI state indication for a wireless device-specific PDCCH MAC CE may be indicated/identified by a MAC PDU subheader with LCID. The TCI state indication for a wireless device-specific PDCCH MAC CE may have a fixed size of a quantity of bits such as 16 bits (or any other quantity of bits) and may comprise one or more fields. The one or more fields may comprise a serving cell ID, CORESET ID, TCI state ID, and/or a reserved bit.

The serving cell ID may indicate an identity of the serving cell for which the TCI state indication applies. The length of the serving cell ID may be n bits (e.g., n may be 5 bits, or any other quantity of bits). The CORESET ID may indicate a control resource set. The control resource set may be indicated/identified with a control resource set ID (e.g., ControlResourceSetId). The length of the CORESET ID may be n3 bits (e.g., n3 may be 4 bits, or any other quantity of bits). The TCI state ID (e.g., TCI-StateId) may indicate a TCI state. The TCI state may be applicable to the control resource set indicated/identified by the CORESET ID. The length of the TCI state ID may be n4 bits (e.g., n4=6 bits, or any other quantity of bits). An information element (e.g., ControlResourceSet) may be used to configure a time/frequency control resource set (CORESET) in which to search for DCI.

An information element (e.g., TCI-State) may associate one or two DL reference signals with a corresponding QCL type. The TCI-State may comprise one or more fields (e.g., TCI-StateId and QCL-Info). The TCI-StateID may indicate (e.g., identify) a configuration of a TCI state. The QCL-Info may comprise one or more second fields. The one or more second fields may comprise serving cell index, BWP indicator (e.g., identifier), a reference signal indicator (e.g., SSB-index, NZP-CSI-RS-ResourceID), and/or a QCL Type indicator (e.g., QCL-typeA, QCL-typeB, QCL-typeC, QCL-typeD).

A reference signal may be located in a serving cell. A reference signal indicator (e.g., index) may indicate the reference signal. The serving cell index may indicate the serving cell. An information element TCI-State may apply to a serving cell in which the information element TCI-State is configured, for example, if a serving cell index is absent in the information element TCI-State. The reference signal may be located on a second serving cell other than the serving cell in which the information element TCI-State is configured only if the QCL-Type is configured as a first type (e.g., TypeD, TypeA, TypeB). The BWP ID may indicate a downlink BWP of the serving cell in which the reference signal is located in.

An information element (e.g., SearchSpace) may define how/where to search for PDCCH candidates in a search space. The search space may be indicated/identified by an indicator (e.g., searchSpaceId) field in the information element SearchSpace. Each search space may be associated with a CORESET (e.g., ControlResourceSet). The CORESET may be indicated, for example, by a controlResourceSetId field in the information element SearchSpace. The controlResourceSetId field may indicate the CORESET applicable for the SearchSpace.

A wireless device may indicate (e.g., report), to a base station, an RF capability of the wireless device via a capability signaling of the wireless device. The RF capability may be reception capability and/or transmission capability. The base station may determine whether the wireless device may receive (and/or transmit) simultaneous physical channels and/or RSs via different receiving (and/or transmitting) beams from one or more component carriers in the downlink (and/or uplink) at the same time instant, for example, based on the capability signaling.

A base station may configure (e.g., in intra-band CA) one or more component carriers in the same band. The one or more component carriers may be powered by a same and a single RF chain. The wireless device may apply a single and a same set of TX/RX spatial parameters to the one or more component carriers in the same band at a same (or substantially the same) time instant. Applying the single and the same set of TX/RX spatial parameters may impose limitations on flexibility of multiplexing physical channels (e.g., PDSCH/PUSCH, PDCCH/PUCCH, SRS, PRACH, etc.) and/or reference signals (RSS) (e.g., CSI-RS, SSB, etc.), for example, within and/or across the one or more component carriers.

A first channel/RS of a first serving cell (e.g., PCell, BWP) and a second channel/RS of a second serving cell (e.g., SCell, BWP) may be multiplexed in the same OFDM symbols, for example if the first channel/RS is associated with a second channel/RS (e.g., QCL-ed with QCL type as QCL TypeD). A wireless device may transmit/receive (e.g., simultaneously transmit/receive) the multiplexed first channel/RS and the second channel/RS in the uplink/downlink.

One or more first antenna ports of a first serving cell and one or more second antenna ports of a second serving cell may not be associated (e.g., may not be QCL-ed with QCL type as QCL-TypeD). A wireless device may not determine (e.g., may not infer) one or more channel properties of the one or more first antenna ports of the first serving cell from the one or more second antenna ports of the second serving cell.

The first channel/RS (e.g., PDSCH/PUSCH, PDCCH/PUCCH, SRS, PRACH, CSI-RS, SSB, etc.) and the second channel/RS (e.g., PDSCH/PUSCH, PDCCH/PUCCH, SRS, PRACH, CSI-RS, SSB, etc.) may not be associated (e.g., may not be QCL-ed with QCL type as QCL-TypeD). A base station may configure the first channel/RS may with a first QCL assumption and the second channel/RS with a second QCL assumption. A first transmission/reception of the first channel/RS and a second transmission/reception of the second channel/RS may overlap (e.g., in at least one OFDM symbol). The wireless device may not perform the first transmission/reception and the second transmission/reception simultaneously, for example, if the first QCL assumption and the second QCL assumption are not the same.

Figure 16A:
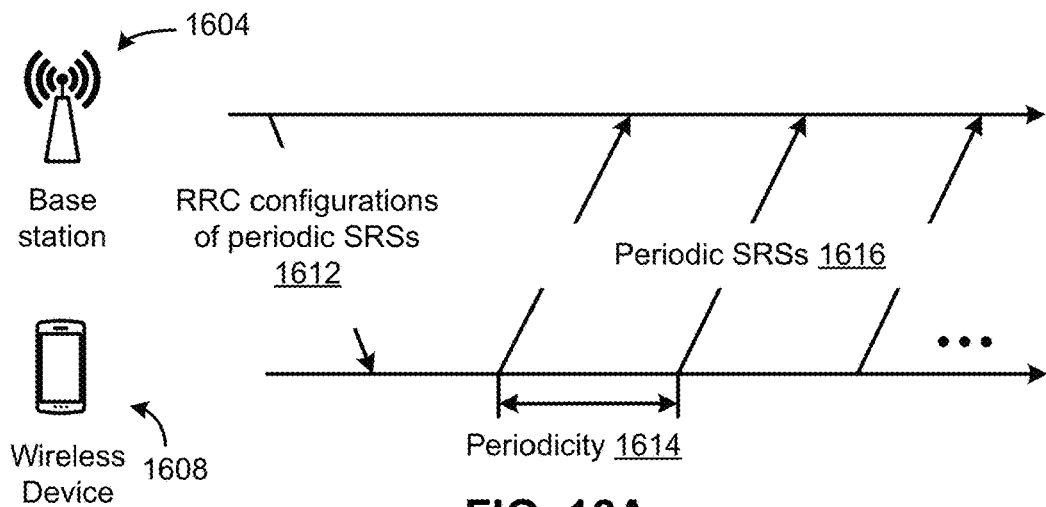
FIG. 16A, FIG. 16B and FIG. 16C show examples of sounding reference signal (SRS) transmissions.
Figure 16B:
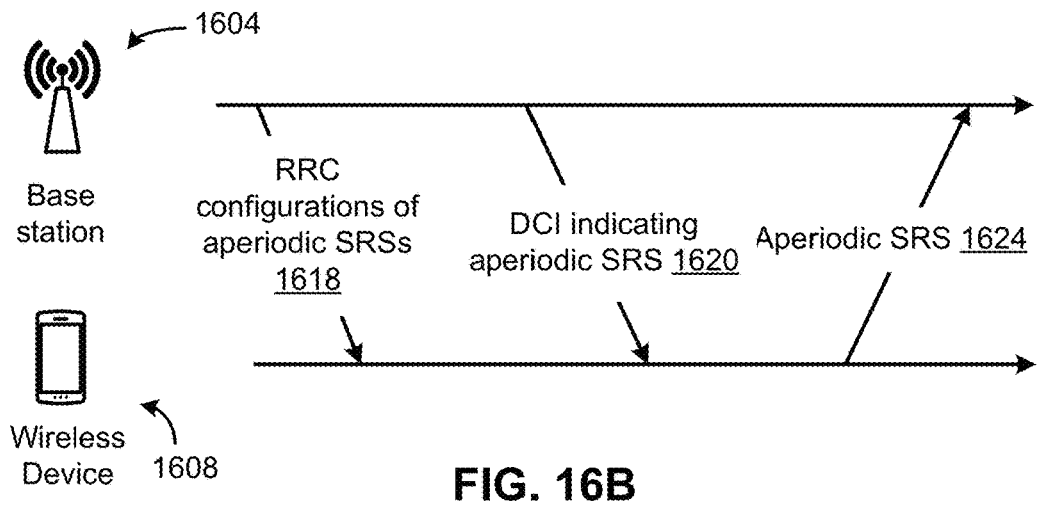
Figure 16C:
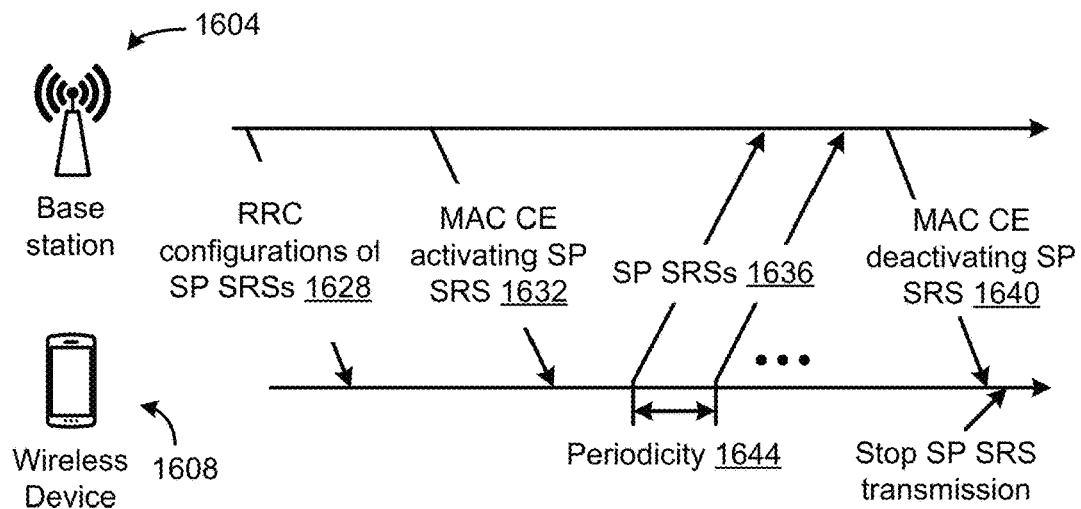

FIG. 16A, FIG. 16B and FIG. 16C show examples of SRS transmissions. A base station 1604 may request (e.g., in an indication) a wireless device 1608 to send (e.g., transmit) one or more SRSs for channel quality estimation (e.g., CSI acquisition, or uplink beam management). The base station 1604 may request the one or more SRSs to enable frequency-selective scheduling on the UL. SRS transmissions may be used for other purposes, such as to enhance power control and/or to support various startup functions for wireless devices not recently scheduled. Some example uses of SRSs may comprise initial MCS selection, initial power control for data transmissions, timing advance, and/or frequency semi-selective scheduling.

The base station 1604 may request (e.g., in an indication) the wireless device 1608 to send (e.g., transmit) at least one of: periodic SRS transmission (type 0); aperiodic SRS transmission (type 1); and/or SP SRS transmission. Subframes in which SRSs may be sent (e.g., transmitted) may be indicated, for example, for periodic SRS transmission, by cell-specific broadcast signaling, and/or wireless device-specific signaling.

FIG. 16A shows an example of periodic SRS transmission. Periodicity of the periodic SRS transmission may be, for example, between 2 ms to 160 ms (or any other quantity of time). The wireless device 1608 may send (e.g., transmit) SRSs 1616 using SC-FDMA or using OFDM symbols in the configured subframes. The wireless device 1608 may send (e.g., transmit) the SRSs 1616, for example, in last one or more symbols (e.g., 1, 2, 3, or any other quantity of symbols) in a subframe. FIG. 16B shows an example of an aperiodic SRS transmission. The wireless device 1608 may send (e.g., transmit) SRSs 1624 aperiodically, for example, based on receiving a DCI 1620 indicating an aperiodic SRS transmission. FIG. 16C shows an example of an SP SRS transmission. The wireless device 1608 may receive configuration parameters (e.g., in an RRC configuration 1628) of an SP SRS transmission. The configuration parameters may comprise at least one of: a periodicity of the SP SRS transmission (e.g., periodicity 1644); a time/frequency radio resource; cyclic shift parameters; and/or other radio parameters (e.g., bandwidth, frequency hopping, transmission comb and offset, frequency-domain position, etc.). The wireless device 1608 may send (e.g., transmit) the SP SRSs 1636, for example, based on or in response to receiving a first message (e.g., a MAC CE 1632) activating the SP SRSs 1636. The wireless device 1608 may repeat the SP SRS transmission (e.g., with the periodicity 1644), for example, at least until the wireless device 1608 receives a second message (e.g., another MAC CE 1640) deactivating the SP SRSs 1636. The wireless device 1608 may deactivate the SP SRS 1636 and stop the SP SRSs transmission, for example, based on or in response to receiving the MAC CE 1640 deactivating the SP SRSs 1636.

The wireless device and the base station may be aligned to use a same transmit/receive filter for transmission and reception of an SRS. The base station may not receive the SRS and/or may receive the SRS with errors, for example, if the base station receives an SRS with a first transmitting/receiving filter (e.g., associated with a first RS) and the wireless device transmits the SRS with a second (e.g., different) transmitting/receiving filter (e.g., associated with a second RS). Using a same transmit/receive filter for SRS transmission/reception may enable more reliable and/or more robust communication. Using the same transmit/receive filter for SRS transmission/reception may improve uplink channel estimation and/or improve performance of downlink scheduling.

Various examples described herein may improve the performance of uplink channel estimation. Various examples described herein may improve the performance of downlink scheduling. Various examples described herein may improve the performance of uplink beam management.

Figure 17:
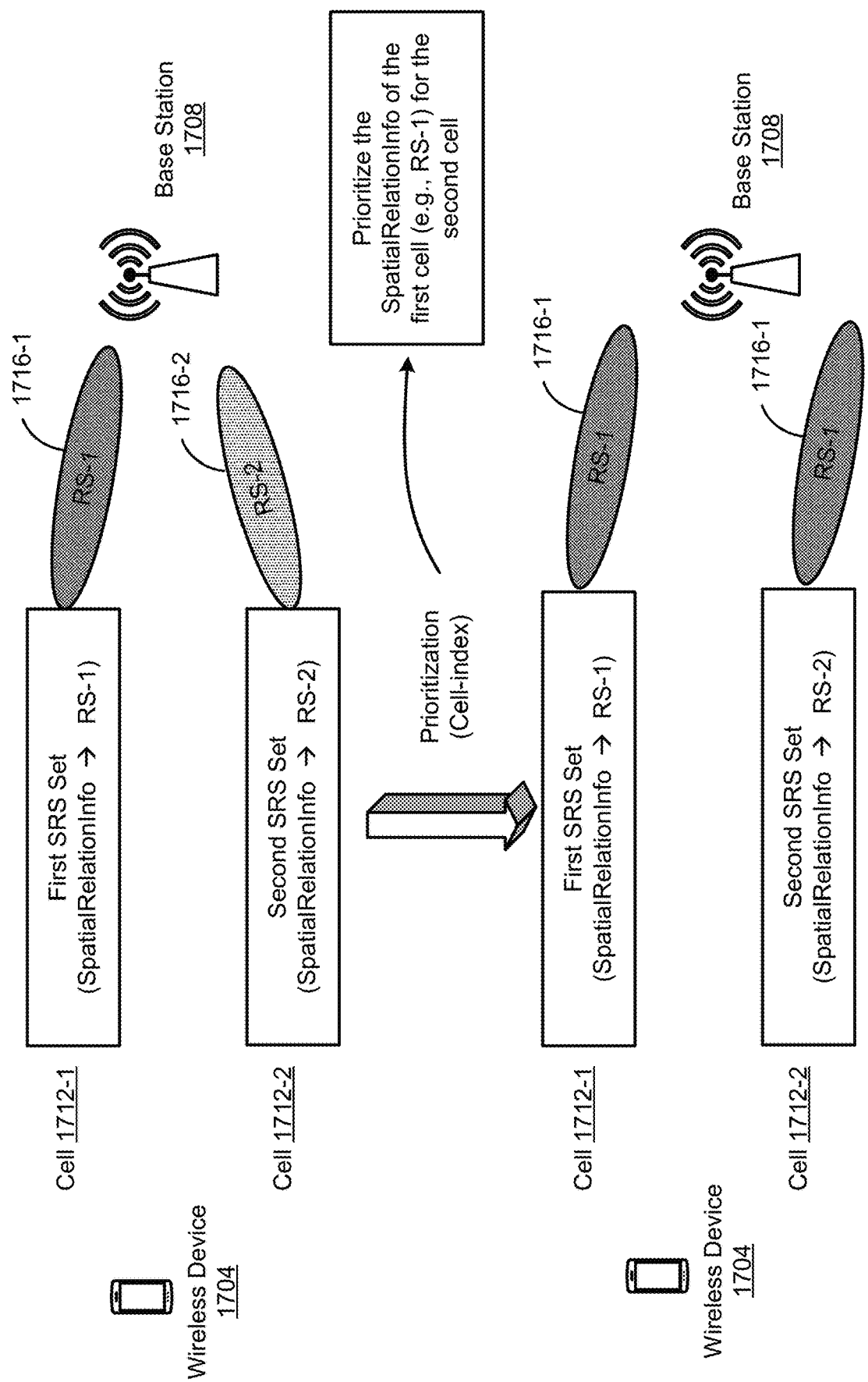
FIG. 17 shows an example SRS beam selection procedure based on cell indicators.
Figure 18:
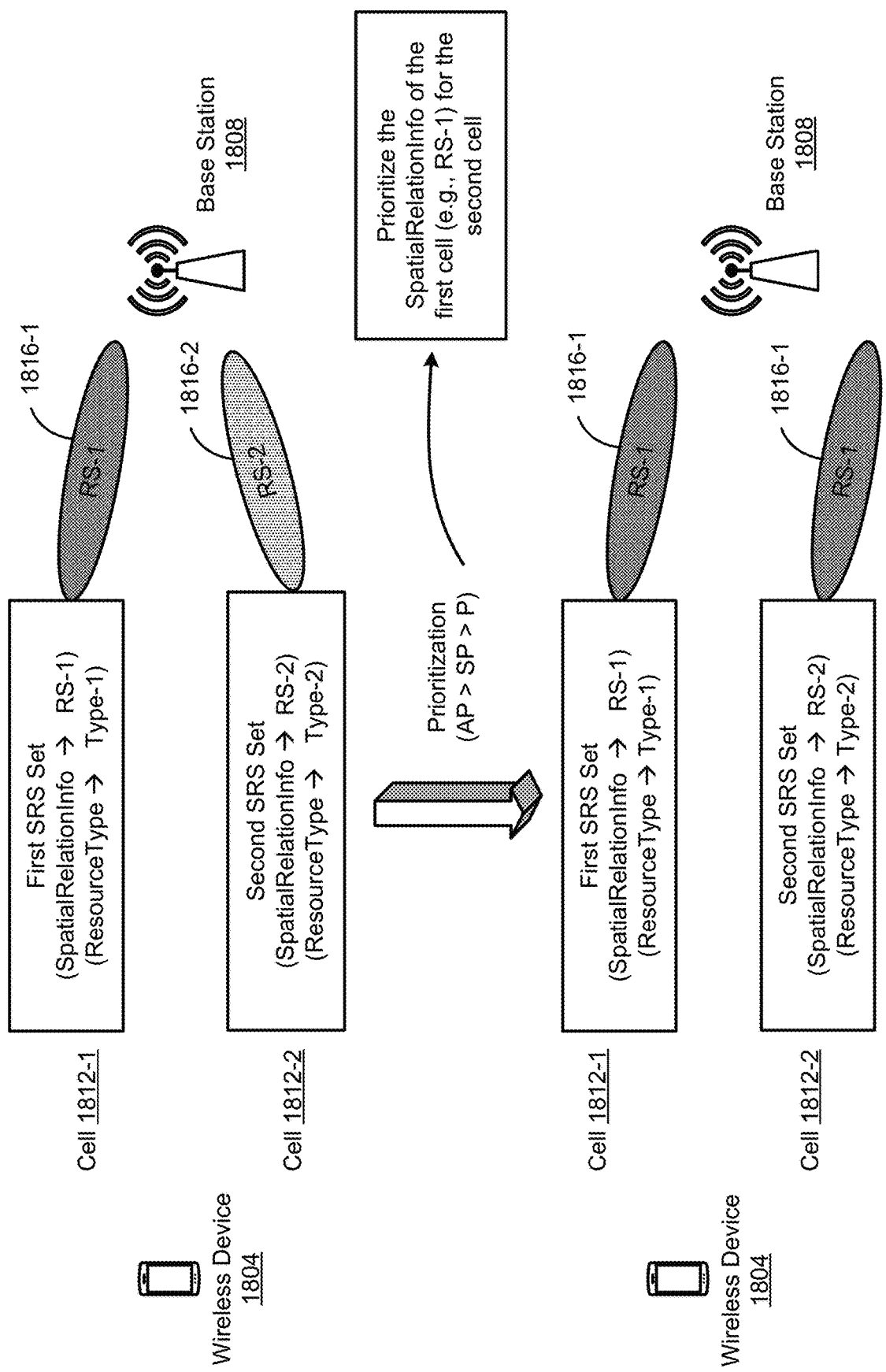
FIG. 18 shows an example SRS beam selection procedure based on SRS priorities.

FIG. 17 and FIG. 18 show example uplink beam management procedures. A wireless device (e.g., the wireless device 1704 in FIG. 17 or the wireless device 1804 in FIG. 18) may receive, from a base station (e.g., the base station 1708 in FIG. 1 or the base station 1808 in FIG. 2), one or more messages (e.g., RRC configuration messages, RRC reconfiguration messages, and/or the like). The one or more messages may comprise one or more configuration parameters of a plurality of cells. The plurality of cells may comprise a first cell (e.g., Cell 1712-1 in FIG. 17 and cell 1812-1 in FIG. 18) and a second cell (e.g., Cell 1712-2 in FIG. 17 and cell 1812-2 in FIG. 18).

The one or more configuration parameters may indicate cell-specific indices (e.g., indicated/provided by a higher layer parameter servCellIndex) for the plurality of cells. Each cell of the plurality of cells may be indicated/identified by a respective one cell-specific index of the cell-specific indices. The first cell (may be indicated/identified by a first cell-specific index. The second cell may be indicated/identified by a second cell-specific index.

The first cell-specific index and the second cell-specific index may be different. The first cell-specific index and the second cell-specific index may be the same.

The one or more configuration parameters may indicate one or more first SRS resource sets for the first cell (e.g., using a higher layer parameter SRS-ResourceSet). The one or more first SRS resource sets may comprise a first SRS resource set (e.g., first SRS set in FIG. 17 and FIG. 18).

The one or more configuration parameters may indicate one or more second SRS resource sets for the second cell (e.g., using a higher layer parameter SRS-ResourceSet). The one or more second SRS resource sets may comprise a second SRS resource set (e.g., second SRS set in FIG. 17 and FIG. 18).

The one or more configuration parameters may indicate SRS resource set indicators/indices for the one or more first SRS resource sets. The SRS resource set indicators may be indicated/provided by a higher layer parameter (e.g., SRS-ResourceSetId). Each SRS resource set of the one or more first SRS resource sets may be indicated (e.g., identified) by a respective one SRS resource set index of the SRS resource set indices. The first SRS resource set (e.g., first SRS Set in FIG. 17 and FIG. 18) may be indicated/identified by a first SRS resource set index.

The one or more configuration parameters may indicate SRS resource set indicators/indices for the one or more second SRS resource sets. The SRS resource set indicators may be indicated/provided by a higher layer parameter (e.g., SRS-ResourceSetId). Each SRS resource set of the one or more second SRS resource sets may be indicated/identified by a respective one SRS resource set index of the SRS resource set indices. The second SRS resource set (e.g., second SRS Set in FIG. 17 and FIG. 18) may be indicated/identified by a second SRS resource set index.

The first SRS resource set index and the second SRS resource set index may be the same. The first SRS resource set index and the second SRS resource set index may be different.

The first SRS resource set may comprise one or more first SRS resources. The once or more SRS resources may be indicated/provided by a higher layer parameter (e.g., SRS-Resource). The one or more first SRS resources may comprise a first SRS resource.

The one or more configuration parameters may indicate SRS resource indicators (e.g., indices) for the one or more first SRS resources. The SRS resource indicators may be indicated/provided by a higher layer parameter (e.g., SRS-ResourceId). Each SRS resource of the one or more first SRS resources may be indicated/identified by a respective one SRS resource index of the SRS resource indices. The first SRS resource may be indicated/identified by a first SRS resource index.

The one or more configuration parameters may indicate SRS resource types for the one or more first SRS resources. The SRS resource types may be indicated/provided by a higher layer parameter (e.g., resourceType). Each SRS resource of the one or more first SRS resources may be indicated (e.g., configured) by a respective one SRS resource type of the SRS resource types. The first SRS resource may be indicated/configured by a first SRS resource type (e.g., type-1 as shown in FIG. 18). The first SRS resource type may correspond to a periodic SRS transmission. The first SRS resource type may correspond to a SP SRS transmission. The first SRS resource type may correspond to an aperiodic SRS transmission.

The one or more configuration parameters may indicate SRS spatial relations for the one or more first SRS resources. The SRS spatial relations may be indicated/provided by a higher layer parameter (e.g., spatialRelationInfo). Each SRS resource of the one or more first SRS resources may be indicated (e.g., configured) by a respective one SRS spatial relation of the SRS spatial relations. The first SRS resource may be indicated/configured by a first SRS spatial relation. The first SRS spatial relation may indicate a first reference RS (e.g., RS 1716-1 in FIG. 17 and RS 1816-1 in FIG. 18). The first SRS spatial relation may comprise a first RS index indicating the first reference RS. The first reference RS may be a first SS/PBCH block. The first reference RS may be a first CSI-RS (e.g., periodic CSI-RS, SP CSI-RS, aperiodic CSI-RS). The first reference RS may be a first SRS (e.g., periodic SRS, SP SRS, aperiodic SRS).

The wireless device may perform a first SRS transmission (or send/transmit a first target SRS) for the first SRS resource with a first spatial domain filter. The wireless device may receive the first SS/PBCH block with a first spatial domain transmission filter. The first spatial domain filter for the first SRS transmission may be the first spatial domain transmission filter, for example, if the first reference RS is the first SS/PBCH block.

The wireless device may receive the first CSI-RS with a first spatial domain transmission filter. The first spatial domain filter for the first SRS transmission may be the first spatial domain transmission filter, for example, if the first reference RS is the first CSI-RS.

The wireless device may send (e.g., transmit) the first SRS with a first spatial domain transmission filter. The first spatial domain filter for the first SRS transmission may be the first spatial domain transmission filter, for example, if the first reference RS is the first.

The second SRS resource set may comprise one or more second SRS resources. The second SRS resource set may be indicated/provided by a higher layer parameter (e.g., SRS-Resource). The one or more second SRS resources may comprise a second SRS resource.

The one or more configuration parameters may indicate SRS resource indices for the one or more second SRS resources. The SRS resource indices may be indicated/provided by a higher layer parameter (e.g., SRS-ResourceId). Each SRS resource of the one or more second SRS resources may be identified by a respective one SRS resource index of the SRS resource indices. The second SRS resource may be indicated/identified by a second SRS resource index.

The one or more configuration parameters may indicate SRS resource types for the one or more second SRS resources. The SRS resource types may be indicated/provided by a higher layer parameter (e.g., resourceType). Each SRS resource of the one or more second SRS resources may be indicated/configured by a respective one SRS resource type of the SRS resource types. The second SRS resource may be indicated/configured by a second SRS resource type (e.g., Type-2 as shown in FIG. 18). The second SRS resource type may correspond to a periodic SRS transmission. The second SRS resource type may correspond to a SP SRS transmission. The second SRS resource type may correspond to an aperiodic SRS transmission.

The one or more configuration parameters may indicate SRS spatial relations (for the one or more second SRS resources. The SRS spatial relations may be indicated/provided by a higher layer parameter (e.g., spatialRelationInfo). Each SRS resource of the one or more second SRS resources may be indicated/configured by a respective one SRS spatial relation of the SRS spatial relations. The second SRS resource may be indicated/configured by a second SRS spatial relation. The second SRS spatial relation may indicate a second reference RS (e.g., RS 1716-2 in FIG. 17 and RS 1816-2 in FIG. 18). The second SRS spatial relation may comprise a second RS index indicating the second reference RS. The second reference RS may be a second SS/PBCH block. The second reference RS may be a second CSI-RS (e.g., periodic CSI-RS, SP CSI-RS, aperiodic CSI-RS). The second reference RS may be a second SRS (e.g., periodic SRS, SP SRS, aperiodic SRS).

The wireless device may perform a second SRS transmission (or send/transmit a second target SRS) for the second SRS resource with a second spatial domain filter. The wireless device may receive the second SS/PBCH block with a second spatial domain transmission filter. The second spatial domain filter for the second SRS transmission may be the second spatial domain transmission filter, for example, if the second reference RS is the second SS/PBCH block.

The wireless device may receive the second CSI-RS with a second spatial domain transmission filter. The second spatial domain filter for the second SRS transmission may be the second spatial domain transmission filter, for example, if the second reference RS is the second CSI-RS.

The wireless device may send (e.g., transmit) the second SRS with a second spatial domain transmission filter. The second spatial domain filter for the second SRS transmission may be the second spatial domain transmission filter, for example, if the second reference RS is the second SRS.

The first cell and the second cell may operate using intra-band CA. The first cell may operate in a first band and the second cell may operate in a second band. The first band and the second band may be the same.

A first SRS transmission for the first SRS resource may be triggered. The base station may request the first SRS transmission (e.g., periodic SRS, SP SRS, aperiodic SRS).

A second SRS transmission for the second SRS resource may be triggered. The base station may request the second SRS transmission (e.g., periodic SRS, SP SRS, aperiodic SRS).

The wireless device may determine that the first SRS resource of the first SRS transmission and the second SRS resource of the second SRS transmission overlap in a time duration. The time duration may be at least one symbol (or any other quantity of symbols). The time duration may be at least one slot (or any other quantity of slots). The time duration may be at least one subframe (or any other quantity of subframes). The time duration may be at least one frame (or any other quantity of frames).

The first SRS spatial relation of the first SRS resource and the second SRS spatial relation of the second SRS resource may or may not be different (e.g., may or may not be identical) in the time duration. The first SRS spatial relation and the second SRS spatial relation being different may comprise that the wireless device may not simultaneously perform the first SRS transmission for the first SRS resource and the second SRS transmission for the second SRS resource in the time duration. The first SRS spatial relation and the second SRS spatial relation being different may comprise that the first reference RS indicated by the first SRS spatial relation and the second reference RS indicated by the second SRS spatial relation may be different. The first SRS spatial relation and the second SRS spatial relation being different may comprise that the first reference RS indicated by the first SRS spatial relation and the second reference RS indicated by the second SRS spatial relation are not QCL-ed.

The wireless device may be configured to apply one beam (or any quantity of beams) at a time for transmissions of SRSs. The wireless device may not be configured to send/transmit two different SRSs with two different beams at the same time (or at substantially the same time). The wireless device may prioritize an SRS spatial relation corresponding to one of the two different SRSs for transmission of both the SRSs. The wireless device may use a single beam, for example, for transmission of both the SRSs.

In FIG. 17, the first cell-specific index may be less than the second cell-specific index. The wireless device may prioritize one of the first SRS spatial relation of the first SRS resource and the second SRS spatial relation of the second SRS resource, for example, if the first SRS resource and the second SRS resource overlap in the time duration, and/or the first SRS spatial relation of the first SRS resource and the second SRS spatial relation of the second SRS resource are different. The wireless device may prioritize one of the first SRS spatial relation of the first SRS resource and the second SRS spatial relation of the second SRS resource, for example, based on cell-specific indices of the first cell and the second cell. The wireless device may prioritize the first SRS spatial relation of the first SRS resource, for example, if the first cell-specific index is less than the second cell-specific index.

In FIG. 18, the first SRS resource type (e.g., type-1) of the first SRS resource may correspond to an aperiodic SRS transmission. The second SRS resource type (e.g., Type-2) of the second SRS resource may correspond to a periodic SRS transmission or to an SP SRS transmission. The aperiodic SRS transmission may have a higher priority than the periodic SRS transmission. The aperiodic SRS transmission may have a higher priority than the SP SRS transmission. The first SRS resource type may have a higher priority than the second SRS resource type, for example, based on the aperiodic SRS transmission having a higher priority than the periodic SRS transmission. The first SRS resource type may have a higher priority than the second SRS resource type, for example, based on the aperiodic SRS transmission having a higher priority than the SP SRS transmission.

In FIG. 18, the first SRS resource type (e.g., type-1) may correspond to a SP SRS transmission. The second SRS resource type (e.g., Type-2) may correspond to a periodic SRS transmission. The SP SRS transmission may have a higher priority than the periodic SRS transmission. The first SRS resource type may have a higher priority than the second SRS resource type, for example, based on the SP SRS transmission having a higher priority than the periodic SRS transmission.

The wireless device may prioritize one of the first SRS spatial relation of the first SRS resource and the second SRS spatial relation of the second SRS resource, for example, if the first SRS resource and the second SRS resource overlap in the time duration, and/or if the first SRS spatial relation of the first SRS resource and the second SRS spatial relation of the second SRS resource are different. The wireless device may prioritize one of the first SRS spatial relation of the first SRS resource and the second SRS spatial relation of the second SRS resource, for example, based on priorities of the first SRS resource type and the second SRS resource type. The wireless device may prioritize the first SRS spatial relation of the first SRS resource, for example, if the first SRS resource type has a higher priority than the second SRS resource type.

The first cell-specific index may be less than the second cell-specific index. The first SRS resource type and the second SRS resource type may be the same (e.g., both periodic SRS or both SP SRS or both aperiodic SRS). The wireless device may determine that the first SRS resource and the second SRS resource overlap in the time duration, and/or the first SRS spatial relation of the first SRS resource and the second SRS spatial relation of the second SRS resource are different. The wireless device may prioritize the first SRS spatial relation of the first SRS resource, for example, if the first SRS resource type and the second SRS resource type are the same and the first cell-specific index is less than the second cell-specific index.

The prioritizing the first SRS spatial relation of the first SRS resource may comprise that the wireless device performs the second SRS transmission for the second SRS resource with the first SRS spatial relation of the first SRS resource in the time duration. The performing the second SRS transmission for the second SRS resource with the first SRS spatial relation may comprise that the wireless device transmits the second SRS resource with the first spatial domain filter (e.g., of the first SRS transmission for the first SRS resource) in the time duration. The performing the second SRS transmission for the second SRS resource with the first SRS spatial relation may comprise that the wireless device applies/uses the first spatial domain filter (e.g., of the first SRS transmission for the first SRS resource) for the second SRS transmission in the time duration.

The prioritizing the first SRS spatial relation of the first SRS resource may comprise that the wireless device performs the first SRS transmission for the first SRS resource with the first SRS spatial relation of the first SRS resource in the time duration. The performing the first SRS transmission for the first SRS resource with the first SRS spatial relation may comprise that the wireless device transmits the first SRS resource with the first spatial domain filter (e.g., of the first SRS transmission for the first SRS resource) in the time duration.

The prioritizing the first SRS spatial relation of the first SRS resource may comprise that the first SRS spatial relation of the first SRS resource overrides the second SRS spatial relation of the second SRS resource in the time duration. The prioritizing the first SRS spatial relation of the first SRS resource may comprise that the wireless device drops the second SRS transmission for the second SRS resource. The prioritizing the first SRS spatial relation of the first SRS resource may comprise that the wireless device drops the second SRS transmission for the second SRS resource at least in the time duration. The dropping the second SRS transmission may comprise stopping the second SRS transmission. The dropping the second SRS transmission may comprise not initiating the second SRS transmission. The dropping the second SRS transmission may comprise not performing the second SRS transmission for the second SRS resource in the time duration. The dropping the second SRS transmission may comprise performing the first SRS transmission for the first SRS resource in the time duration.

The prioritizing the first SRS spatial relation of the first SRS resource may comprise that the wireless device performs the second SRS transmission for the second SRS resource with the first SRS spatial relation of the first SRS resource in the time duration. The prioritizing the first SRS spatial relation of the first SRS resource may comprise that the wireless device performs the second SRS transmission for the second SRS resource with the second SRS spatial relation of the second SRS resource outside of the time duration (e.g., in portions of the second SRS resource that do not overlap with the first SRS resource).

A wireless device may be configured with multiple antennas and/or antenna panels. A wireless device may be configured to use a quantity of beams for transmission of multiple signals (e.g., to multiple reception points). The wireless device may use a beam for transmission of more than one signal (e.g., simultaneously).

The wireless device may use (e.g., simultaneously use) different beams for transmissions over different antenna panels. The wireless device may send/transmit (e.g., simultaneously send/transmit) a first a signal using a first beam (e.g., via a first antenna panel), and the second signal using a second beam (e.g., via a second antenna panel). The first signal and the second signal may be sent/transmitted in a first cell. The first signal and the second signal may overlap with a third signal (e.g., sent/transmitted in a second cell). The wireless device may need to determine/select one beam of first beam and the second beam to send/transmit the third signal. The wireless device may determine/select one beam of first beam and the second beam to transmit the third signal, for example, if the wireless device is only configured to use a maximum of two beams at a time. A base station may be aligned to use a beam (e.g., for signal reception), for example, based on a beam selection protocol used at the wireless device. The first signal the second signal, and the third signal may be associated with a first SRS, a second SRS, and a third SRS, and may be used for uplink channel estimation at the base station. Uplink channel estimation based on SRS reception, at the base station, may not yield accurate results, for example, if the base station is not aligned to use the beam based on the beam selection protocol. This may result in inefficient uplink scheduling and/or downlink scheduling.

The wireless device may select and/or prioritize a beam of a signal, among signals (e.g., the first signal and the second signal) of the first cell, for transmission of another signal (e.g., the third signal) in the second cell. The wireless device may prioritize a transmission beam of a signal that is sent/transmitted via an antenna panel with the lowest-antenna panel index. The wireless device may prioritize a transmission beam of a signal that is associated with a signal resource set identified with the lowest signal resource set index. The wireless device may prioritize a transmission beam of a signal with the highest priority. The wireless device may prioritize a transmission beam of a signal based on a combination of two or more of criteria (e.g., of the above criteria). The base station may be aligned to use a beam that is based on a prioritization rule applied at the wireless device. Beam selection/prioritization techniques described herein may be used, at the wireless device, for transmission of SRSs. This may result in improved decoding/reception performance of SRS transmission, uplink channel estimation, uplink scheduling and/or downlink scheduling.

Figure 19:
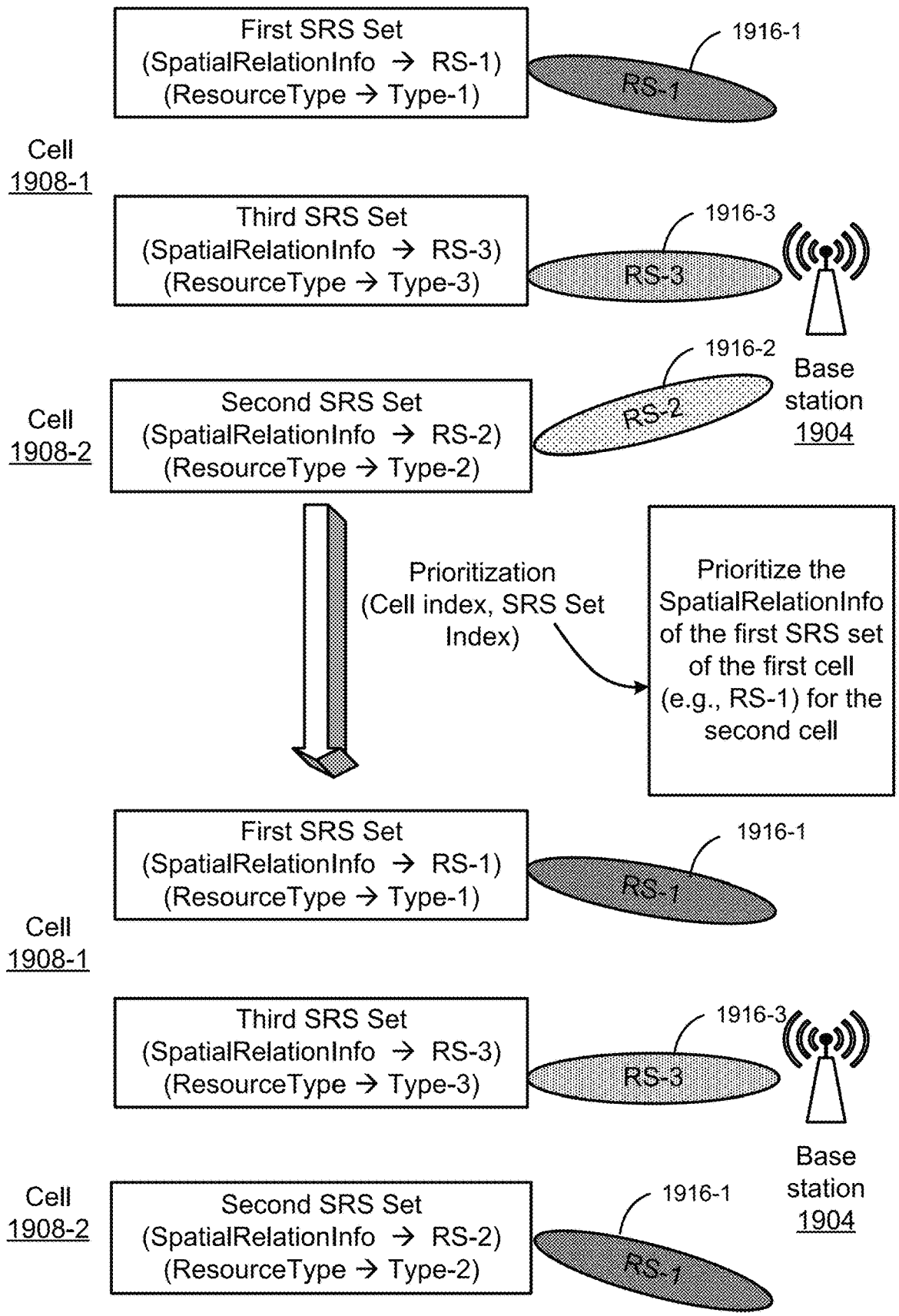
FIG. 19 shows an example SRS beam selection procedure based on SRS priorities and cell indicators.
Figure 20:
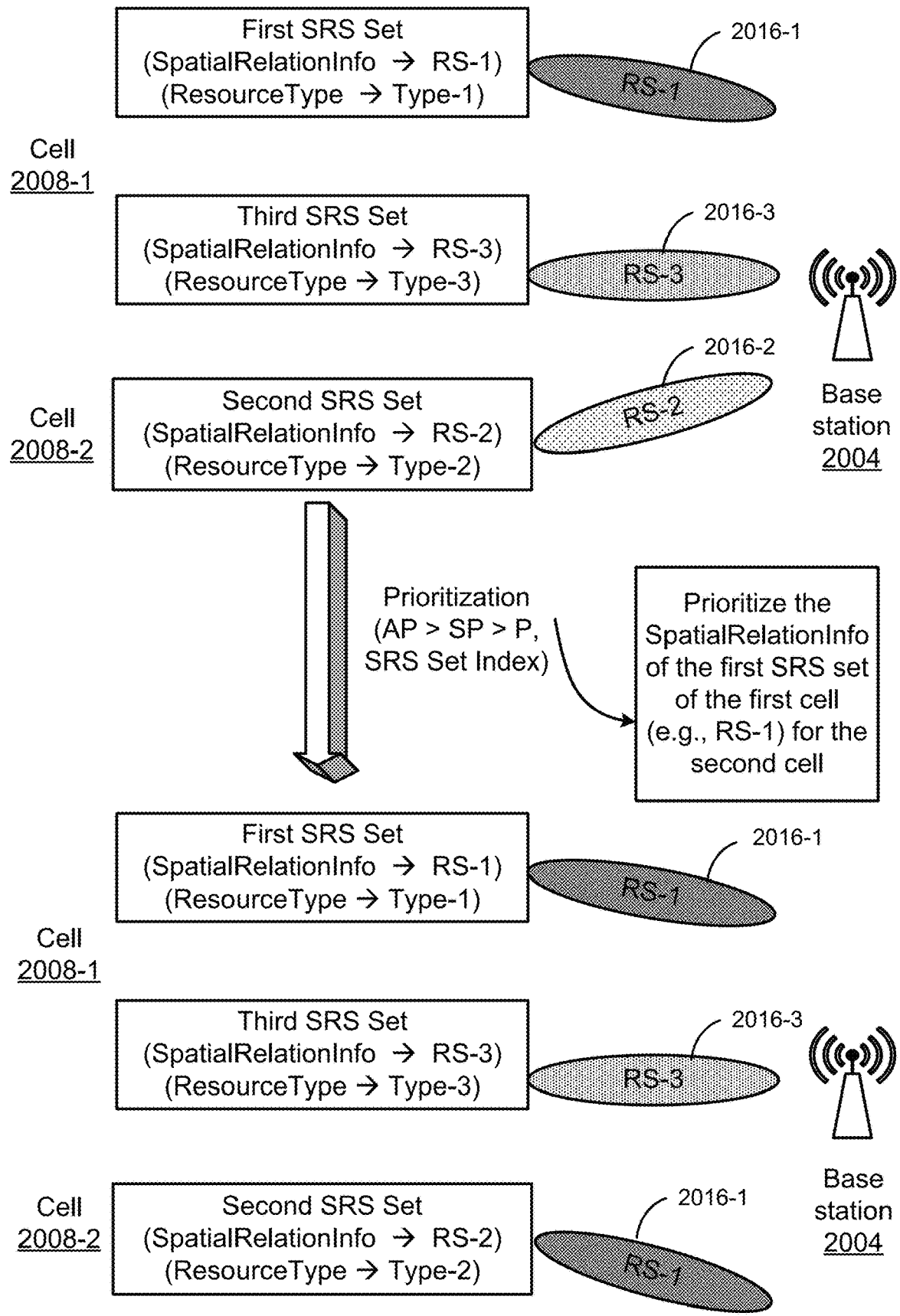
FIG. 20 shows an example SRS beam selection procedure based on SRS priorities and SRS set indicators.
Figure 21:
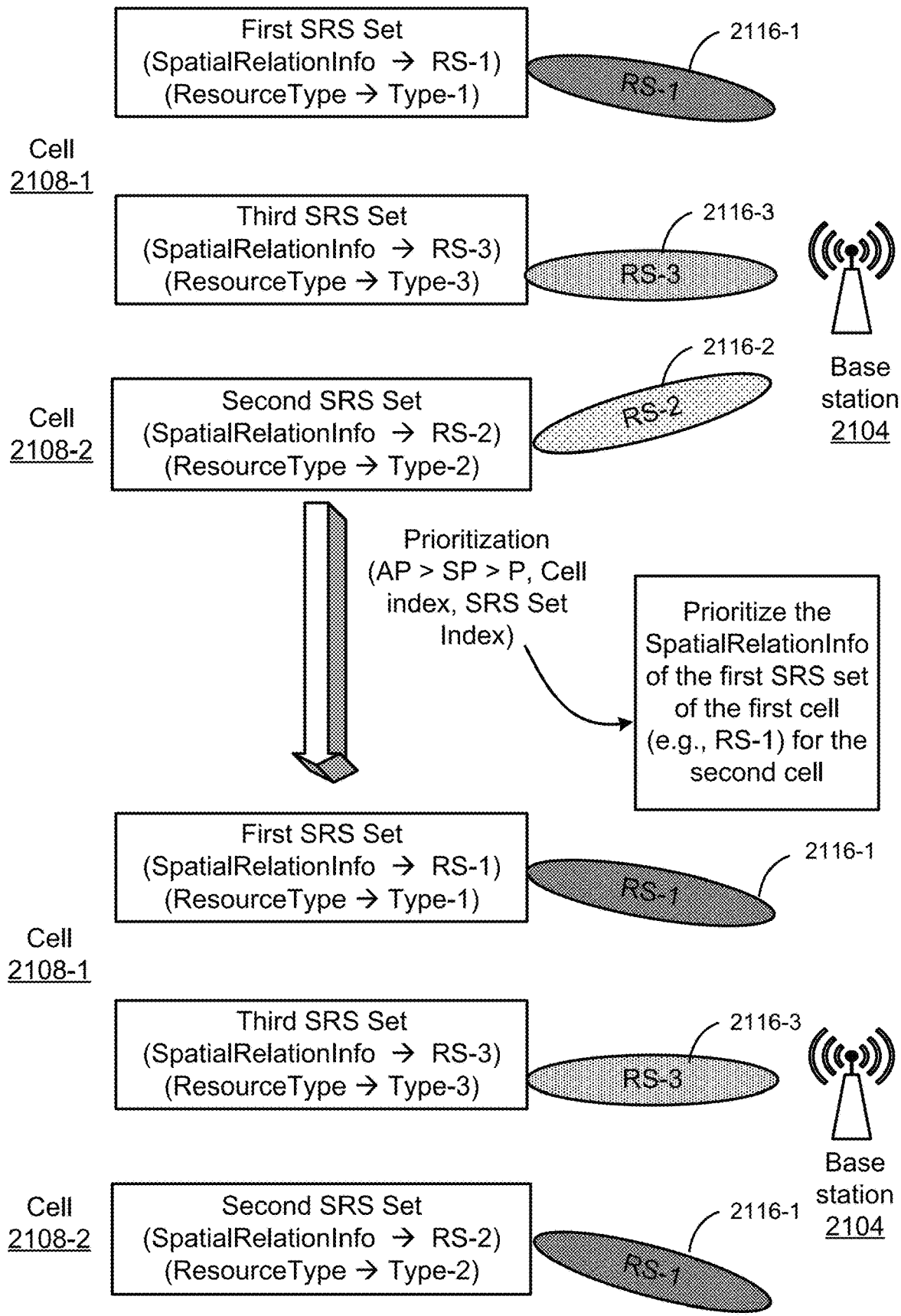
FIG. 21 shows an example SRS beam selection procedure based on SRS priorities, cell indicators, and SRS set indicators.

FIG. 19, FIG. 20, and FIG. 21 show examples of an uplink beam management. A base station and a wireless device may be configured to communicate with each other. A wireless device may receive, from a base station (e.g., base station 1904 in FIG. 19, base station 2004 in FIG. 20, and base station 2104 in FIG. 21) which may send, one or more messages (e.g., RRC configuration messages). The one or more messages may comprise one or more configuration parameters of a plurality of cells. The plurality of cells may comprise a first cell (e.g., cell 1908-1 in FIG. 19, cell 2008-1 in FIG. 20, and cell 2108-1 in FIG. 21) and a second cell (e.g., cell 1908-2 in FIG. 19, cell 2008-2 in FIG. 20, and cell 2108-2 in FIG. 21).

The one or more configuration parameters may indicate cell-specific indices for the plurality of cells. The cell-specific indices may be indicated/provided by a higher layer parameter (e.g., servCellIndex). Each cell of the plurality of cells may be indicated/identified by a respective cell-specific index of the cell-specific indices. The first cell may be indicated/identified by a first cell-specific index. The second cell may be indicated/identified by a second cell-specific index.

The first cell-specific index and the second cell-specific index may be different. The first cell-specific index and the second cell-specific index may be the same.

The one or more configuration parameters may indicate one or more first SRS resource sets for the first cell. The one or more first SRS resource sets may be indicated/provided by a higher layer parameter (e.g., SRS-ResourceSet). The one or more first SRS resource sets may comprise a first SRS resource set (e.g., first SRS set in FIG. 19-FIG. 21) and a third SRS resource set (e.g., third SRS set in FIG. 19-FIG. 21).

The one or more configuration parameters may indicate one or more second SRS resource sets for the second cell. The one or more second SRS resource sets may be indicated/provided by a higher layer parameter (e.g., SRS-ResourceSet). The one or more second SRS resource sets may comprise a second SRS resource set (e.g., second SRS set in FIG. 19-FIG. 21).

The one or more configuration parameters may indicate SRS resource set indices for the one or more first SRS resource sets. The SRS resource set indices may be indicated/provided by a higher layer parameter (e.g., SRS-ResourceSetId). Each SRS resource set of the one or more first SRS resource sets may be indicated/identified by a respective one SRS resource set index of the SRS resource set indices. The first SRS resource set (e.g., first SRS Set in FIG. 19-FIG. 21) may be indicated/identified by a first SRS resource set index. The third SRS resource set (e.g., third SRS Set in FIG. 19-FIG. 21) may be indicated/identified by a third SRS resource set index.

The one or more configuration parameters may indicate SRS resource set indices for the one or more second SRS resource sets. The SRS resource set indices may be indicated/provided by a higher layer parameter (e.g., SRS-ResourceSetId). Each SRS resource set of the one or more second SRS resource sets may be indicated/identified by a respective one SRS resource set index of the SRS resource set indices. The second SRS resource set (e.g., second SRS Set in FIG. 19-FIG. 21) may be indicated/identified by a second SRS resource set index.

The first SRS resource set index and the second SRS resource set index may be the same. The first SRS resource set index and the second SRS resource set index may be different. The third SRS resource set index and the second SRS resource set index may be the same. The third SRS resource set index and the second SRS resource set index may be different. The first SRS resource set index and the third SRS resource set index may be different.

The first SRS resource set may comprise one or more first SRS resources. The one or more first SRS resources may be indicated/provided by a higher layer parameter (e.g., SRS-Resource). The one or more first SRS resources may comprise a first SRS resource. The third SRS resource set may comprise one or more third SRS resources. The one or more third SRS resources may be indicated/provided by a higher layer parameter (e.g., SRS-Resource). The one or more third SRS resources may comprise a third SRS resource.

The one or more configuration parameters may indicate SRS resource indices for the one or more first SRS resources. The SRS resource indices may be indicated/provided by a higher layer parameter (e.g., SRS-ResourceId). Each SRS resource of the one or more first SRS resources may be indicated/identified by a respective SRS resource index of the SRS resource indices. The first SRS resource may be indicated/identified by a first SRS resource index.

The one or more configuration parameters may indicate SRS resource indices for the one or more third SRS resources. The SRS resource indices may be indicated/provided by a higher layer parameter (e.g., SRS-ResourceId). Each SRS resource of the one or more third SRS resources may be indicated/identified by a respective SRS resource index of the SRS resource indices. The third SRS resource may be indicated/identified by a third SRS resource index.

The one or more configuration parameters may indicate SRS resource types for the one or more first SRS resources. The SRS resource types may be indicated/provided by a higher layer parameter (e.g., resourceType). Each SRS resource of the one or more first SRS resources may be indicated/configured by a respective one SRS resource type of the SRS resource types. The first SRS resource may be indicated/configured by a first SRS resource type (e.g., type-1 in FIG. 19-FIG. 21). The first SRS resource type may correspond to a periodic SRS transmission. The first SRS resource type may correspond to a SP SRS transmission. The first SRS resource type may correspond to an aperiodic SRS transmission.

The one or more configuration parameters may indicate SRS resource types for the one or more third SRS resources. The SRS resource types may be indicated/provided by a higher layer parameter (e.g., resourceType). Each SRS resource of the one or more third SRS resources may be indicated/configured by a respective SRS resource type of the SRS resource types. The third SRS resource may be indicated/configured by a third SRS resource type (e.g., type-3 in FIG. 19-FIG. 21). The third SRS resource type may correspond to a periodic SRS transmission. The third SRS resource type may correspond to a SP SRS transmission. The third SRS resource type may correspond to an aperiodic SRS transmission.

The one or more configuration parameters may indicate SRS spatial relations for the one or more first SRS resources. The SRS spatial relations may be indicated/provided by a higher layer parameter (e.g., spatialRelationInfo). Each SRS resource of the one or more first SRS resources may be indicated/configured by a respective SRS spatial relation of the SRS spatial relations. The first SRS resource may be indicated/configured by a first SRS spatial relation. The first SRS spatial relation may indicate a first reference RS (e.g., RS 1916-1 in FIG. 19, RS 2016-1 in FIG. 20, and RS 2116-1 in FIG. 21). The first SRS spatial relation may comprise a first RS indicator/index indicating the first reference RS. The first reference RS may be a first SS/PBCH block. The first reference RS may be a first CSI-RS (e.g., periodic CSI-RS, SP CSI-RS, aperiodic CSI-RS). The first reference RS may be a first SRS (e.g., periodic SRS, SP SRS, aperiodic SRS).

The wireless device may perform a first SRS transmission (e.g., send/transmit a first target SRS) for the first SRS resource with a first spatial domain filter. The wireless device may receive the first SS/PBCH block with a first spatial domain transmission filter. The first spatial domain filter for the first SRS transmission may be the first spatial domain transmission filter (e.g., used for receiving the first SS/PBCH block), for example, if the first reference RS is the first SS/PBCH block.

The wireless device may receive the first CSI-RS with a first spatial domain transmission filter. The first spatial domain filter for the first SRS transmission may be the first spatial domain transmission filter (e.g., used for receiving the first CSI-RS), for example, if the first reference RS is the first CSI-RS.

The wireless device may send (e.g., transmit) the first SRS with a first spatial domain transmission filter. The first spatial domain filter for the first SRS transmission may be the first spatial domain transmission filter (e.g., used for transmitting the first SRS), for example, if the first reference RS is the first SRS.

The one or more configuration parameters may indicate SRS spatial relations for the one or more third SRS resources. The SRS spatial relations may be indicated/provided by a higher layer parameter (e.g., spatialRelation- Info). Each SRS resource of the one or more third SRS resources may be indicated/configured by a respective SRS spatial relation of the SRS spatial relations. The third SRS resource may be indicated/configured by a third SRS spatial relation. The third SRS spatial relation may indicate a third reference RS (e.g., RS 1916-3 in FIG. 19, RS 2016-3 in FIG. 20, and RS 2116-3 in FIG. 21). The third SRS spatial relation may comprise a third RS indicator/index indicating the third reference RS. The third reference RS may be a third SS/PBCH block. The third reference RS may be a third CSI-RS (e.g., periodic CSI-RS, SP CSI-RS, aperiodic CSI-RS). The third reference RS may be a third SRS (e.g., periodic SRS, SP SRS, aperiodic SRS).

The wireless device may perform a third SRS transmission (e.g., transmit a third target SRS) for the third SRS resource with a third spatial domain filter. The wireless device may receive the third SS/PBCH block with a third spatial domain transmission filter. The third spatial domain filter for the third SRS transmission may be the third spatial domain transmission filter (e.g., used for receiving the third SS/PBCH block), for example, if the third reference RS is the third SS/PBCH block.

The wireless device may receive the third CSI-RS with a third spatial domain transmission filter. The third spatial domain filter for the third SRS transmission may be the third spatial domain transmission filter (e.g., used for receiving the third CSI-RS), for example, if the third reference RS is the third CSI-RS.

The wireless device may send (e.g., transmit) the third SRS with a third spatial domain transmission filter. The third spatial domain filter for the third SRS transmission may be the third spatial domain transmission filter (e.g., used for transmitting the third SRS), for example, if the third reference RS is the third SRS.

The second SRS resource set may comprise one or more second SRS resources. The one or more second SRS resources may be indicated/provided by a higher layer parameter (E.g., SRS-Resource). The one or more second SRS resources may comprise a second SRS resource.

The one or more configuration parameters may indicate SRS resource indices for the one or more second SRS resources. The SRS resource indices may be indicated/provided by a higher layer parameter (e.g., SRS-ResourceId). Each SRS resource of the one or more second SRS resources may be indicated/identified by a respective SRS resource index of the SRS resource indices. The second SRS resource may be indicated/identified by a second SRS resource index.

The one or more configuration parameters may indicate SRS resource types for the one or more second SRS resources. The SRS resource types may be indicated/provided by a higher layer parameter resourceType) Each SRS resource of the one or more second SRS resources may be indicated/configured by a respective one SRS resource type of the SRS resource types. The second SRS resource may be indicated/configured by a second SRS resource type (e.g., type-2 in FIG. 19-FIG. 21). The second SRS resource type may correspond to a periodic SRS transmission. The second SRS resource type may correspond to a SP SRS transmission. The second SRS resource type may correspond to an aperiodic SRS transmission.

The one or more configuration parameters may indicate SRS spatial relations for the one or more second SRS resources. The SRS spatial relations may be indicated/provided by a higher layer parameter (e.g., spatialRelation-Info). Each SRS resource of the one or more second SRS resources may be indicated/configured by a respective SRS spatial relation of the SRS spatial relations. The second SRS resource may be indicated/configured by a second SRS spatial relation. The second SRS spatial relation may indicate a second reference RS (e.g., RS 1916-2 in FIG. 19, RS 2016-2 in FIG. 20, RS 2116-2 in FIG. 21). The second SRS spatial relation may comprise a second RS indicator/index indicating the second reference RS. The second reference RS may be a second SS/PBCH block. The second reference RS may be a second CSI-RS (e.g., periodic CSI-RS, SP CSI-RS, aperiodic CSI-RS). The second reference RS may be a second SRS (e.g., periodic SRS, SP SRS, aperiodic SRS).

The wireless device may perform a second SRS transmission (e.g., send/transmit a second target SRS) for the second SRS resource with a second spatial domain filter. The wireless device may receive the second SS/PBCH block with a second spatial domain transmission filter. The second spatial domain filter for the second SRS transmission may be the second spatial domain transmission filter (e.g., used for receiving the second SS/PBCH block), for example, if the second reference RS is the second SS/PBCH block.

The wireless device may receive the second CSI-RS with a second spatial domain transmission filter. The second spatial domain filter for the second SRS transmission may be the second spatial domain transmission filter (e.g., used for receiving the second CSI-RS), for example, if the second reference RS is the second CSI-RS.

The wireless device may send/transmit the second SRS with a second spatial domain transmission filter. The second spatial domain filter for the second SRS transmission may be the second spatial domain transmission filter (e.g., used for transmitting the second SRS), for example, if the second reference RS is the second SRS.

A first SRS transmission for the first SRS resource may be triggered (e.g., by the base station). The base station may request the first SRS transmission (e.g., periodic SRS, SP SRS, aperiodic SRS).

A third SRS transmission for the third SRS resource may be triggered (e.g., by the base station). The base station may request the third SRS transmission (e.g., periodic SRS, SP SRS, aperiodic SRS).

A second SRS transmission for the second SRS resource may be triggered (e.g., by the base station). The base station may request the second SRS transmission (e.g., periodic SRS, SP SRS, aperiodic SRS).

The wireless may determine that the first SRS resource of the first SRS transmission, the second SRS resource of the second SRS transmission, and the third SRS resource of the third SRS transmission overlap in a time duration. The time duration may be at least one symbol (or any other quantity of symbols). The time duration may be at least one slot (or any other quantity of slots). The time duration may be at least one subframe (or any other quantity of subframes). The time duration may be at least one frame (or any other quantity of frames).

The second SRS spatial relation of the second SRS resource may be different (e.g., in the time duration) from the first SRS spatial relation of the first SRS resource and the third SRS spatial relation of the third SRS resource. The second SRS spatial relation being different from the first SRS spatial relation and the third SRS spatial relation may comprise that the wireless device does not perform the first SRS transmission for the first SRS resource and the second SRS transmission for the second SRS resource simultaneously in the time duration. The second SRS spatial relation being different from the first SRS spatial relation and the third SRS spatial relation may comprise that the wireless device does not perform the third SRS transmission for the third SRS resource and the second SRS transmission for the second SRS resource simultaneously in the time duration. The second SRS spatial relation being different from the first SRS spatial relation and the third SRS spatial relation may comprise that the second reference RS indicated by the second SRS spatial relation is different from the first reference RS indicated by the first SRS spatial relation and the third reference RS indicated by the third SRS spatial relation. The second SRS spatial relation being different from the first SRS spatial relation and the third SRS spatial relation may comprise that the first reference RS indicated by the first SRS spatial relation and the second reference RS indicated by the second SRS spatial relation are not QCL-ed. The second SRS spatial relation being different from the first SRS spatial relation and the third SRS spatial relation may comprise that the third reference RS indicated by the third SRS spatial relation and the second reference RS indicated by the second SRS spatial relation are not QCL-ed.

The third SRS spatial relation of the third SRS resource may be different from the first SRS spatial relation of the first SRS resource. The third SRS spatial relation of the third SRS resource and the first SRS spatial relation of the first SRS resource may be the same. The wireless device may perform the first SRS transmission for the first SRS resource and the third SRS transmission for the third SRS resource simultaneously in the time duration.

In FIG. 19, the first cell-specific index may be less than the second cell-specific index. The first SRS resource set index may be less than the third SRS resource set index. The wireless device may select/prioritize an SRS spatial relation among the first SRS spatial relation and the second SRS spatial relation based on determining that the first SRS resource, the second SRS resource, and the third SRS resource overlap in the time duration, and/or based on determining that the second SRS spatial relation is different from the first SRS spatial relation and the third SRS spatial relation. The wireless device may select/prioritize the first SRS spatial relation of the first SRS resource, for example, based on the first cell-specific index being less than the second cell-specific index and/or the first SRS resource set index of the first SRS resource set (e.g., comprising the first SRS resource) being less than the third SRS resource set index of the third SRS resource set (e.g., comprising the third SRS resource).

The first SRS resource type and the third SRS resource type may be the same (e.g., both periodic SRS or both SP SRS or both aperiodic SRS). The first SRS resource type may correspond to an aperiodic SRS transmission. The third SRS resource type may correspond to the aperiodic SRS transmission, for example, based on the first SRS resource type and the third SRS resource type being the same. The second SRS resource type may correspond to a periodic SRS transmission. The second SRS resource type may correspond to a SP SRS transmission. The aperiodic SRS transmission may have a higher priority than the periodic SRS transmission. The aperiodic SRS transmission may have a higher priority than the SP SRS transmission. The first SRS resource type and the third SRS resource type may have a higher priority than the second SRS resource type, for example, based on the aperiodic SRS transmission having a higher priority than the periodic SRS transmission. The first SRS resource type and the third SRS resource type may have a higher priority than the second SRS resource type, for example, based on the aperiodic SRS transmission having a higher priority than the SP SRS transmission.

The first SRS resource type and the third SRS resource type may be the same (e.g., both periodic SRS, both SP SRS, both aperiodic SRS). The first SRS resource type may correspond to an SP SRS transmission. The third SRS resource type may be the SP SRS transmission, for example, based on the first SRS resource type and the third SRS resource type being the same. The second SRS resource type may correspond to a periodic SRS transmission. The SP SRS transmission may have a higher priority than the periodic SRS transmission. The first SRS resource type and the third SRS resource type may have a higher priority the second SRS resource type, for example, based on the SP SRS transmission having a higher priority than the periodic SRS transmission.

In FIG. 20, the first SRS resource set index may be lower than the third SRS resource set index. The wireless device may select/prioritize an SRS spatial relation, among the first SRS spatial relation and the second SRS spatial relation, based on the determining that the first SRS resource, the second SRS resource and the third SRS resource overlap in the time duration, and/or the second SRS spatial relation is different from the first SRS spatial relation and the third SRS spatial relation. The wireless device may prioritize the first SRS spatial relation of the first SRS resource, for example, based on the first SRS resource set index being lower than the second SRS resource set index, and/or the first SRS resource type of the first SRS resource and the third SRS resource type of the third SRS resource having a higher priority the second SRS resource type of the second SRS resource. The first SRS resource type and the third SRS resource type may be the same or may be different.

In FIG. 21, the first cell-specific index may be less than the second cell-specific index. The first SRS resource set index may be less than the third SRS resource set index. The first SRS resource type, the second SRS resource type and the third SRS resource type may be the same (e.g., all periodic SRS or all SP SRS or all aperiodic SRS). The wireless device may prioritize an SRS spatial relation, among the first SRS spatial relation and the second SRS spatial relation, based on the determining that the first SRS resource, the second SRS resource and the third SRS resource overlap in the time duration, and the second SRS spatial relation is different from the first SRS spatial relation and the third SRS spatial relation. The wireless device may prioritize the first SRS spatial relation of the first SRS resource, for example, based on in response to the first cell-specific index being lower than the second cell-specific index and the first SRS resource set index of the first SRS resource set (e.g., comprising the first SRS resource) being less than the third SRS resource set index of the third SRS resource set (e.g., comprising the third SRS resource). The first SRS resource type, the second SRS resource type, and the third SRS resource type may be the same or may be different.

The selecting/prioritizing the first SRS spatial relation of the first SRS resource may comprise, for example, the wireless device performing the second SRS transmission for the second SRS resource with the first SRS spatial relation of the first SRS resource (e.g., on the first cell) in the time duration. The performing the second SRS transmission for the second SRS resource with the first SRS spatial relation may comprise, for example, the wireless device transmitting the second SRS resource with the first spatial domain filter (e.g., of the first SRS transmission for the first SRS resource) in the time duration. The performing the second SRS transmission for the second SRS resource with the first SRS spatial relation may comprise, for example, the wireless device applying/using the first spatial domain filter (e.g., of the first SRS transmission for the first SRS resource) for the second SRS transmission in the time duration.

The selecting/prioritizing the first SRS spatial relation of the first SRS resource may comprise that the first SRS spatial relation of the first SRS resource (e.g., on the first cell) overrides the second SRS spatial relation of the second SRS resource in the time duration. The prioritizing the first SRS spatial relation of the first SRS resource may comprise, for example, the wireless device performing the third SRS transmission for the third SRS resource with the third SRS spatial relation of the third SRS resource in the time duration. The performing the third SRS transmission for the third SRS resource with the third SRS spatial relation may comprise, for example, the wireless device transmitting the third SRS resource with the third spatial domain filter (e.g., of the third SRS transmission for the third SRS resource) in the time duration. The performing the third SRS transmission for the third SRS resource with the third SRS spatial relation may comprise, for example, the wireless device applying/using the third spatial domain filter (e.g., of the third SRS transmission for the third SRS resource) for the third SRS transmission in the time duration.

The selecting/prioritizing the first SRS spatial relation of the first SRS resource may comprise, for example, the wireless device performing the first SRS transmission for the first SRS resource with the first SRS spatial relation of the first SRS resource in the time duration. The performing the first SRS transmission for the first SRS resource with the first SRS spatial relation may comprise, for example, the wireless device transmitting the first SRS resource with the first spatial domain filter (e.g., of the first SRS transmission for the first SRS resource) in the time duration. The performing the first SRS transmission for the first SRS resource with the first SRS spatial relation may comprise, for example, the wireless device applying/using the first spatial domain filter (e.g., of the first SRS transmission for the first SRS resource) for the first SRS transmission in the time duration.

The prioritizing the first SRS spatial relation of the first SRS resource may comprise, for example, the wireless device dropping the second SRS transmission for the second SRS resource. The prioritizing the first SRS spatial relation of the first SRS resource may comprise, for example, the wireless device dropping the second SRS transmission for the second SRS resource at least in the time duration. The dropping the second SRS transmission may comprise, for example, stopping the second SRS transmission. The dropping the second SRS transmission may comprise, for example, not initiating the second SRS transmission. The dropping the second SRS transmission may comprise, for example, not performing the second SRS transmission for the second SRS resource in the time duration. The dropping the second SRS transmission may comprise, for example, not transmitting the second SRS resource in the time duration. The dropping the second SRS transmission may comprise, for example, performing the first SRS transmission for the first SRS resource and the third SRS transmission for the third SRS resource in the time duration.

The one or more configuration parameters may indicate that a higher layer parameter (e.g., usage) is set to a value/indication (e.g., BeamManagement) for the first SRS resource set. The one or more configuration parameters may indicate that a higher layer parameter (e.g., usage) is set to a value/indication (e.g., codebook) for the first SRS resource set. The one or more configuration parameters may indicate that a higher layer parameter (e.g., usage) is set to a value/indication (e.g., nonCodebook) for the first SRS resource set. The one or more configuration parameters may indicate that a higher layer parameter (e.g., usage) is set to a value/indication (e.g., antennaSwitching) for the first SRS resource set.

The one or more configuration parameters may indicate that a higher layer parameter (e.g., usage) is set to a value/indication (e.g., BeamManagement) for the second SRS resource set. The one or more configuration parameters may indicate that a higher layer parameter (e.g., usage) is set to a value/indication (e.g., codebook) for the second SRS resource set. The one or more configuration parameters may indicate that a higher layer parameter (e.g., usage) is set to a value/indication (e.g., nonCodebook) for the second SRS resource set. The one or more configuration parameters may indicate that a higher layer parameter (e.g., usage) is set to a value/indication (e.g., antennaSwitching) for the second SRS resource set.

The one or more configuration parameters may indicate that a higher layer parameter (e.g., usage) is set to a value/indication (e.g., BeamManagement) for the third SRS resource set. The one or more configuration parameters may indicate that a higher layer parameter (e.g., usage) is set to a value/indication (e.g., codebook) for the third SRS resource set. The one or more configuration parameters may indicate that a higher layer parameter (e.g., usage) is set to a value/indication (e.g., nonCodebook) for the third SRS resource set. The one or more configuration parameters may indicate that a higher layer parameter (e.g., usage) is set to a value/indication (e.g., antennaSwitching) for the third SRS resource set.

The wireless device may determine/select a cell (e.g., a selected cell) among the first cell and the second cell (e.g., based on one or more criteria), for example, based on determining that the first SRS resource of the first SRS transmission for the first cell, the second SRS resource of the second SRS transmission for the second cell, and the third SRS resource of the third SRS transmission for the first cell overlap in the time duration, and/or based on the second SRS spatial relation being different from the first SRS spatial relation and the third SRS spatial relation. The one or more criteria may be based on a value of a cell-specific index. The determining/selecting may comprise, for example, determining/selecting a cell with a least/lowest cell-specific index among the first cell-specific index of the first cell and the second cell-specific index of the second cell. The first cell-specific index may be less/lower than the second cell-specific index. The wireless device may determine/select the first cell as the selected cell, for example, based on the first cell-specific index being less/lower than the second cell-specific index. The first cell-specific index may be greater/higher than the second cell-specific index. The wireless device may determine/select the second cell as the selected cell, for example, based on the first cell-specific index being greater/higher than the second cell-specific index.

The one or more criteria may be based on a value of a cell-specific index. The selecting may comprise, for example, determining/selecting a cell with a greatest/highest cell-specific index among the first cell-specific index of the first cell and the second cell-specific index of the second cell. The first cell-specific index may be greater/higher than the second cell-specific index. The wireless device may determine/select the first cell as the selected cell, for example, based on the first cell-specific index being greater/higher than the second cell-specific index. The first cell-specific index may be less/lower than the second cell-specific index. The wireless device may determine/select the second cell as the selected cell, for example, based on the first cell-specific index being less/lower than the second cell-specific index.

The one or more criteria may be based on a SRS resource type. The first SRS resource type and the third SRS resource type may be the same (e.g., both periodic SRS or both SP SRS or both aperiodic SRS). The selecting may comprise determining/selecting a cell associated with an SRS resource type having a highest priority among the first SRS resource type (and/or the third SRS resource type) of the first cell and the second SRS resource type of the second cell. The first SRS resource type may correspond to an aperiodic SRS transmission. The second SRS resource type may correspond to a periodic SRS transmission or an SP SRS transmission The aperiodic SRS transmission may have a higher priority than the periodic SRS transmission. The aperiodic SRS transmission may have a higher priority than the SP SRS transmission. The first SRS resource type may have a higher priority than the second SRS resource type, for example, based on the aperiodic SRS transmission having a higher priority than the periodic SRS transmission. The first SRS resource type may have a higher priority than the second SRS resource type, for example, based on the aperiodic SRS transmission having a higher priority than the SP SRS transmission. The wireless device may determine/select the first cell, associated with the first SRS resource type, as the selected cell, for example, based on the first SRS resource type having the higher priority than the second SRS resource type.

The one or more criteria may be based on a SRS resource type. The first SRS resource type and the third SRS resource type may be the same (e.g., both periodic SRS or both SP SRS or both aperiodic SRS). The determining/selecting may comprise determining/selecting a cell associated with an SRS resource type having a highest priority among the first SRS resource type (and/or the third SRS resource type) of the first cell and the second SRS resource type of the second cell. The first SRS resource type may correspond to a SP SRS transmission. The second SRS resource type may correspond to a periodic SRS transmission. The SP SRS transmission may have a higher priority than the periodic SRS transmission. The first SRS resource type may have a higher priority than the second SRS resource type, for example, based on the SP SRS transmission having a higher priority than the periodic SRS transmission. The wireless device may determine/select the first cell, associated with the first SRS resource type, as the selected cell, for example, based on the first SRS resource type having the higher priority than the second SRS resource type.

The one or more criteria may be based on a SRS resource type and a value of a cell-specific index. The determining/selecting may comprise determining/selecting a cell with a lowest cell-specific index among a plurality of cells (e.g., first cell, second cell), and associated with an SRS resource type (e.g., first SRS resource type, second SRS resource type) having a highest priority among plurality of SRS resource types of the plurality of cells. A first cell-specific index of a first cell of the plurality of cells may be less/lower than a second cell-specific index of a second cell of the plurality of cells and a third cell-specific index of a third cell of the plurality of cells. The second cell-specific index of the second cell may be less/lower than the third cell-specific index of the third cell. A second SRS resource type of the second cell may have a higher priority than a first SRS resource type of the first cell. A third SRS resource type of the third cell may have a higher priority than the first SRS resource type of the first cell. The second SRS resource type of the second cell and the third SRS resource type of the third cell may be the same (e.g. have the same priority). The wireless device may determine/select the second cell as the selected cell, for example, based on the second cell-specific index being lower than the third cell-specific index.

The first SRS resource set index of the first SRS resource set comprising the first SRS resource may be lower (or higher) than the third SRS resource set index of the third SRS resource set comprising the third SRS resource. The selected cell may be the first cell. The wireless device may determine the first SRS resource set index is lower (or higher) than the third SRS resource set index, for example, based on the selected cell being the first cell. The wireless device may prioritize the first SRS spatial relation of the first SRS resource, for example, based on the determining.

The wireless device may be equipped with one or more antenna panels (e.g., for uplink transmission). The wireless device may perform the first SRS transmission for the first SRS resource from a first antenna panel of the one or more antenna panels. The wireless device may perform the third SRS transmission for the third SRS resource from a second antenna panel of the one or more antenna panels.

The one or more configuration parameters may indicate panel-specific indices (e.g., indicated/provided by a higher layer parameter) for the one or more antenna panels. Each antenna panel of the one or more antenna panels may be indicated/identified by a respective panel-specific index of the panel-specific indices. The first antenna panel may be indicated/identified by a first panel-specific index. The second antenna panel may be indicated/identified by a second panel-specific index.

The first panel-specific index associated with the first SRS resource may be less/lower (or greater/higher) than the second panel-specific index associated with the third SRS resource. The determined/selected cell may be the first cell. The wireless device may determine that the first panel-specific index is less/lower (or greater/higher) than the second panel-specific index, for example, based on the selected cell being the first cell. The wireless device may prioritize the first SRS spatial relation of the first SRS resource, for example, based on the determining.

Figure 22:
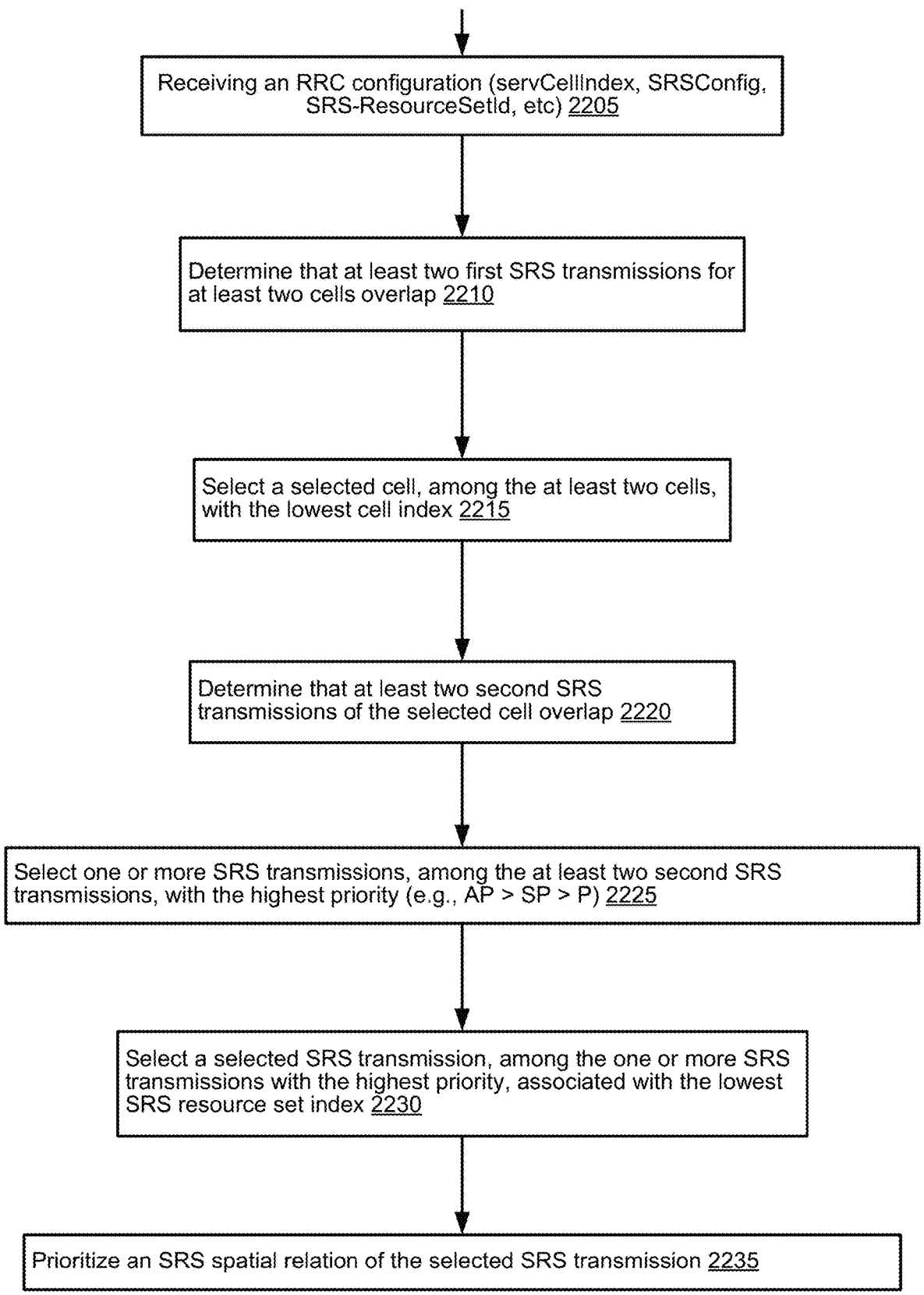
FIG. 22 shows an example method for selecting/prioritizing a beam for an SRS transmission.

FIG. 22 shows an example method for selecting/prioritizing an SRS spatial relation for an SRS transmission. At step 2205, the wireless device may receive one or more RRC configuration messages. The one or more RRC configuration messages may comprise one or more configuration parameters of a plurality of cells. At step 2210, the wireless device may determine that at least two first SRS transmissions for at least two cells overlap (e.g., in time). An SRS transmission for a first cell may overlap in time with an SRS transmission for a second cell. At step 2215, the wireless device may determine/select a cell (e.g., a selected cell), of the plurality of cells. The cell (e.g., selected cell) may have a lowest cell index among the plurality of cells. At step 2220, the wireless device may determine that at least two second SRS transmissions for the cell (e.g., selected cell) overlap in time. At step 2225, the wireless device may select one or more SRS transmissions, among the at least two second SRS transmissions, which have the highest priority. An aperiodic SRS transmission may have a higher priority than an SP SRS transmission. An SP SRS transmission may have a higher priority than a periodic SRS transmission. At step 2230, the wireless device may determine/select an SRS transmission (e.g., a selected SRS transmission), among the one or more SRS transmissions, that is associated with the lowest SRS resource index. At step 2235, the wireless device may prioritize an SRS spatial relation of the SRS transmission (e.g., selected SRS transmission). The prioritizing the SRS spatial relation of the SRS transmission (e.g., selected SRS transmission) may comprise, for example, the wireless device performing an SRS transmission in another cell (e.g., different from the selected cell) with the SRS spatial relation.

Figure 23:
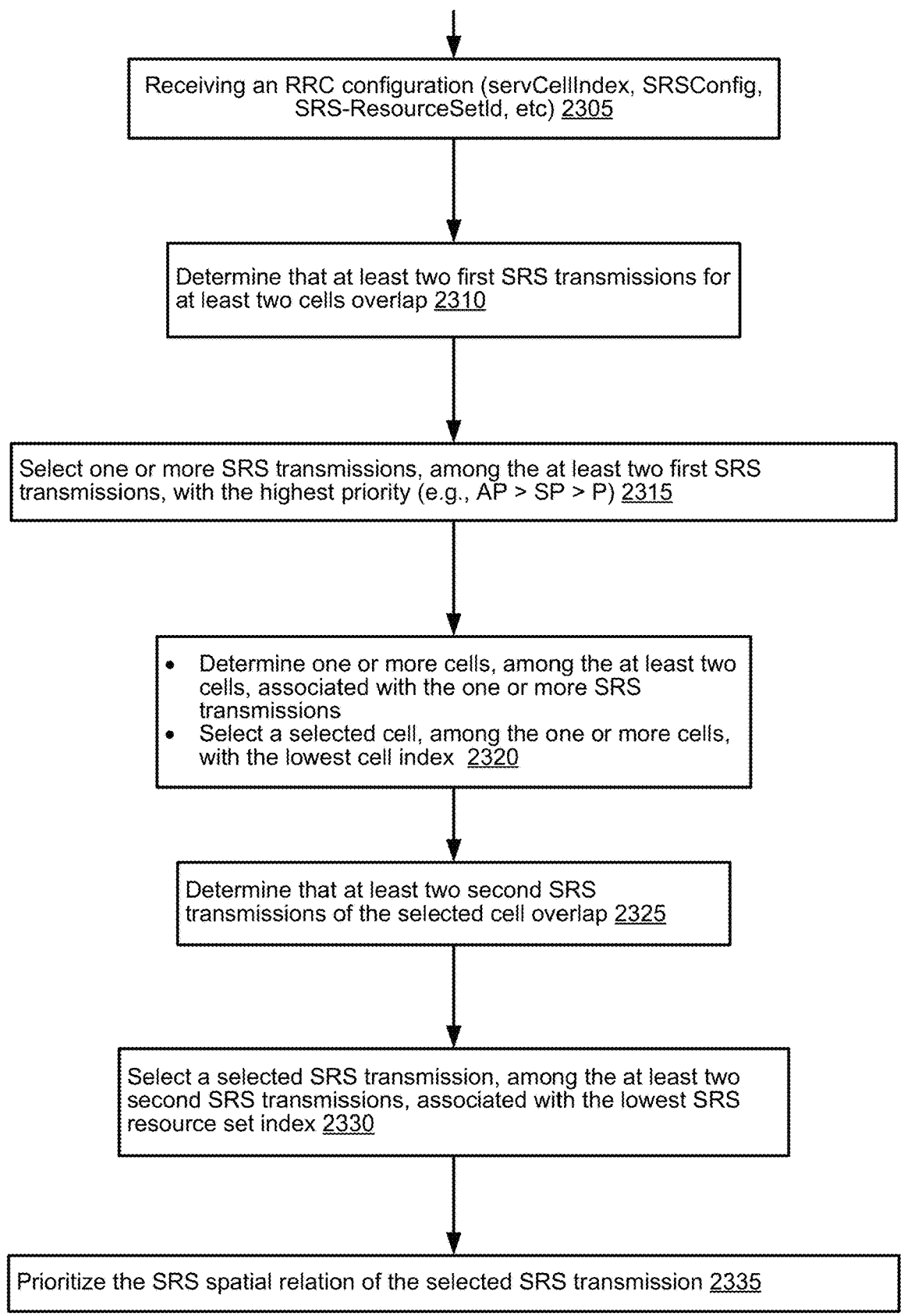
FIG. 23 shows an example method for selecting/prioritizing a beam for an SRS transmission.

FIG. 23 shows an example method for selecting/prioritizing an SRS spatial relation for an SRS transmission. At step 2305, the wireless device may receive one or more RRC configuration messages. The one or more RRC configuration messages may comprise one or more configuration parameters of a plurality of cells. At step 2310, the wireless device may determine that at least two first SRS transmissions for at least two cells overlap (e.g., in time). An SRS transmission for a first cell may overlap in time with an SRS transmission for a second cell. At step 2315, the wireless device may determine/select one or more SRS transmissions, among the at least two first SRS transmissions, with the highest priority. An aperiodic SRS transmission may have a higher priority than an SP SRS transmission. An SP SRS transmission may have a higher priority than a periodic SRS transmission. At step 2320, the wireless device may determine one or more cells, among the at least two cells, that are associated with the one or more SRS transmissions. The wireless device may determine/select a cell (e.g., a selected cell), among the one or more cells, with the lowest cell index. At step 2325, the wireless device may determine that at least two second SRS transmissions for the cell (e.g., selected cell) overlap in time. At step 2330, the wireless device may determine/select an SRS transmission (e.g., selected SRS transmission), among the at least two second SRS transmissions, that is associated with the lowest SRS resource index. At step 2335, the wireless device may prioritize an SRS spatial relation of the SRS transmission (e.g., selected SRS transmission). The prioritizing the SRS spatial relation of the SRS transmission (e.g., selected SRS transmission) may comprise, for example, the wireless device performing an SRS transmission in another cell (e.g., different from the selected cell) with the SRS spatial relation.

Figure 24:
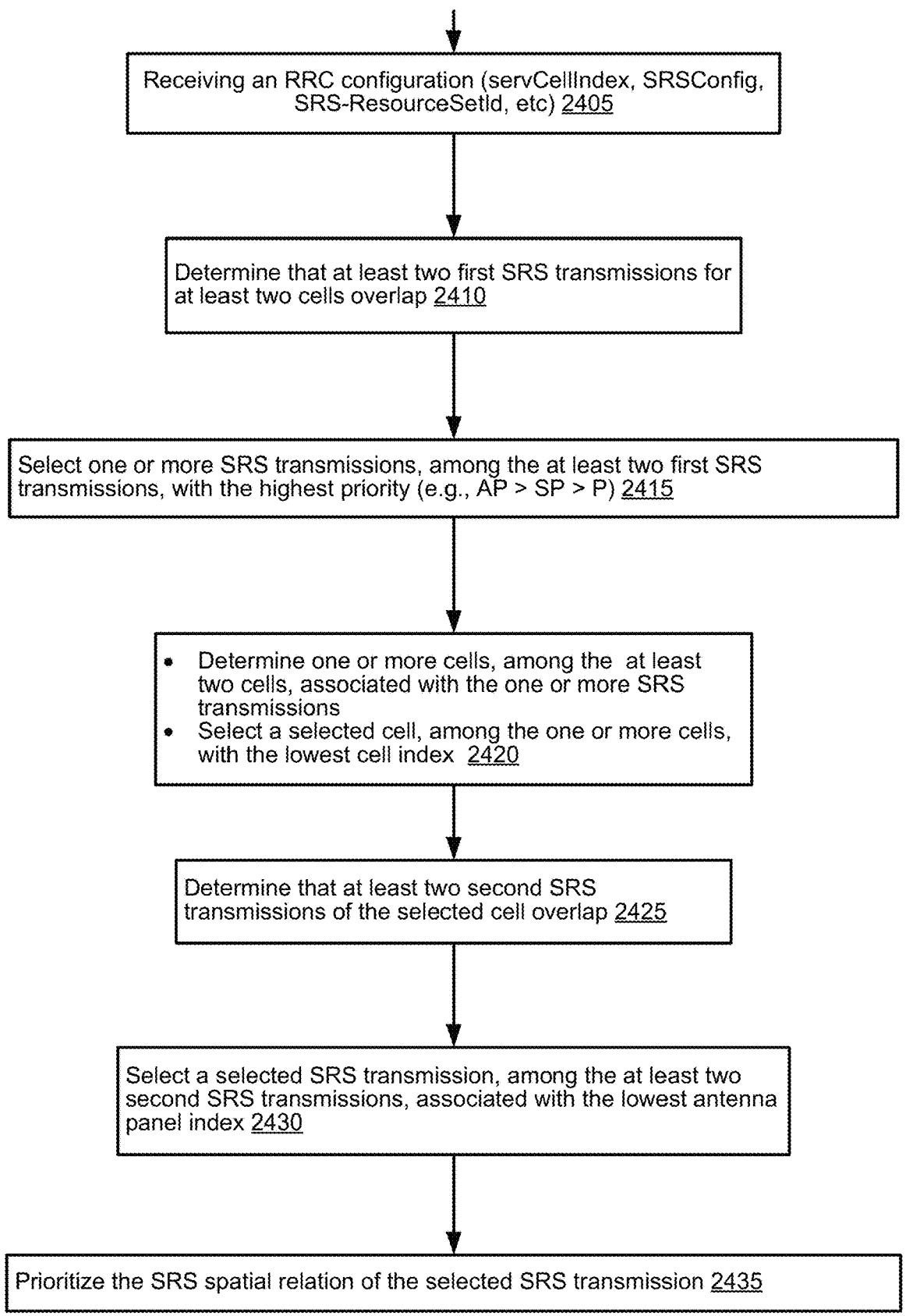
FIG. 24 shows an example method for selecting/prioritizing a beam for an SRS transmission.

FIG. 24 shows an example method for selecting/prioritizing an SRS spatial relation for an SRS transmission. At step 2405, the wireless device may receive one or more RRC configuration messages. The one or more RRC configuration messages may comprise one or more configuration parameters of a plurality of cells. At step 2410, the wireless device may determine that at least two first SRS transmissions for at least two cells overlap (e.g., in time). An SRS transmission for a first cell may overlap in time with an SRS transmission for a second cell. At step 2415, the wireless device may determine/select one or more SRS transmissions, among the at least two first SRS transmissions, with the highest priority. An aperiodic SRS transmission may have a higher priority than an SP SRS transmission. An SP SRS transmission may have a higher priority than a periodic SRS transmission. At step 2420, the wireless device may determine one or more cells, among the at least two cells, that are associated with the one or more SRS transmissions. The wireless device may determine/select a cell (e.g., selected cell), among the one or more cells, with the lowest cell index. At step 2425, the wireless device may determine that at least two second SRS transmissions for the cell (e.g., selected cell) overlap in time. At step 2430, the wireless device may determine/select an SRS transmission, among the at least two second SRS transmissions, that is associated with the lowest antenna panel index. At step 2435, the wireless device may prioritize an SRS spatial relation of the SRS transmission (e.g., selected SRS transmission). The prioritizing the SRS spatial relation of the SRs transmission (e.g., selected SRS transmission) may comprise, for example, the wireless device performing an SRS transmission in another cell (e.g., different from the selected cell) with the SRS spatial relation.

Figure 25:
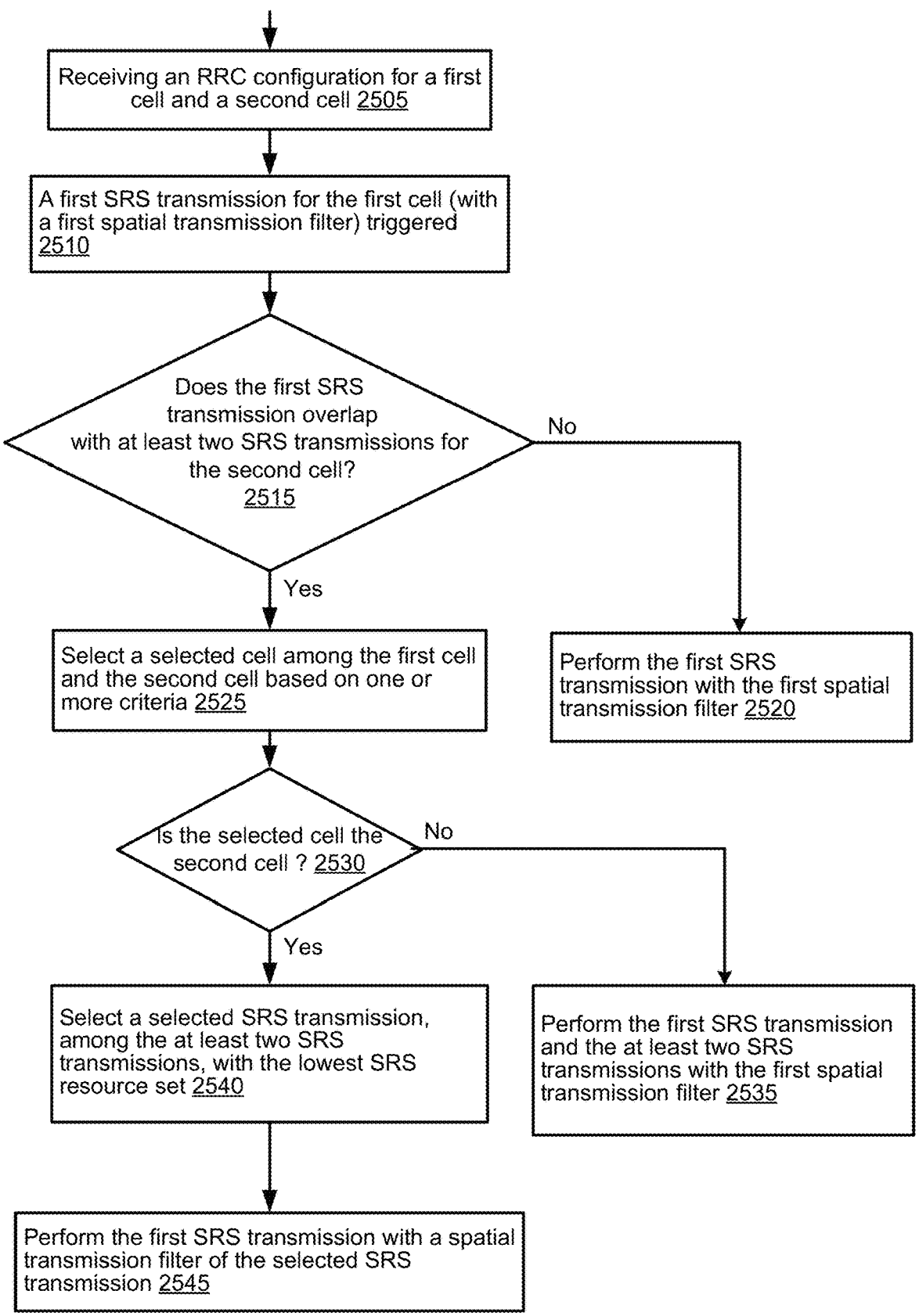
FIG. 25 shows an example method for selecting/prioritizing a beam for an SRS transmission.

FIG. 25 shows an example method for selecting/prioritizing an SRS spatial relation for an SRS transmission. At step 2505, the wireless device may receive one or more RRC configuration messages. The one or more RRC configuration messages may comprise one or more configuration parameters of a plurality of cells. At step 2510, a first SRS transmission for a first cell may be triggered (e.g., by a base station). At step 2520, the wireless device may perform the first SRS transmission (e.g., with the first spatial transmission filter) if the first SRS transmission does not overlap with at least two SRS transmissions for the second cell. At step 2525, the wireless device may determine/select a cell (e.g., selected cell) among the first cell and the second cell based on one or more criteria, for example, if the first SRS transmission overlaps with at least two SRS transmissions for the second cell. The one or more criteria may be based on for example, cell indices, SRS transmission priorities, etc. The wireless device may determine/select a cell, among the first cell and the second cell, with a lowest cell index. At step 2535, the wireless device may perform the first SRS transmission and the at least two SRS transmissions with the first spatial transmission filter, for example, if the cell (e.g., selected cell) is not the second cell. At step 2540, the wireless device may determine/select an SRS transmission (e.g., selected SRS transmission), among the at least two SRS transmissions, with the lowest SRS resource set, for example, if the cell (e.g., selected cell) is the second cell. At step 2545, the wireless device may perform the first SRS transmission with a spatial transmission filter of the selected SRS transmission.

Figure 26:
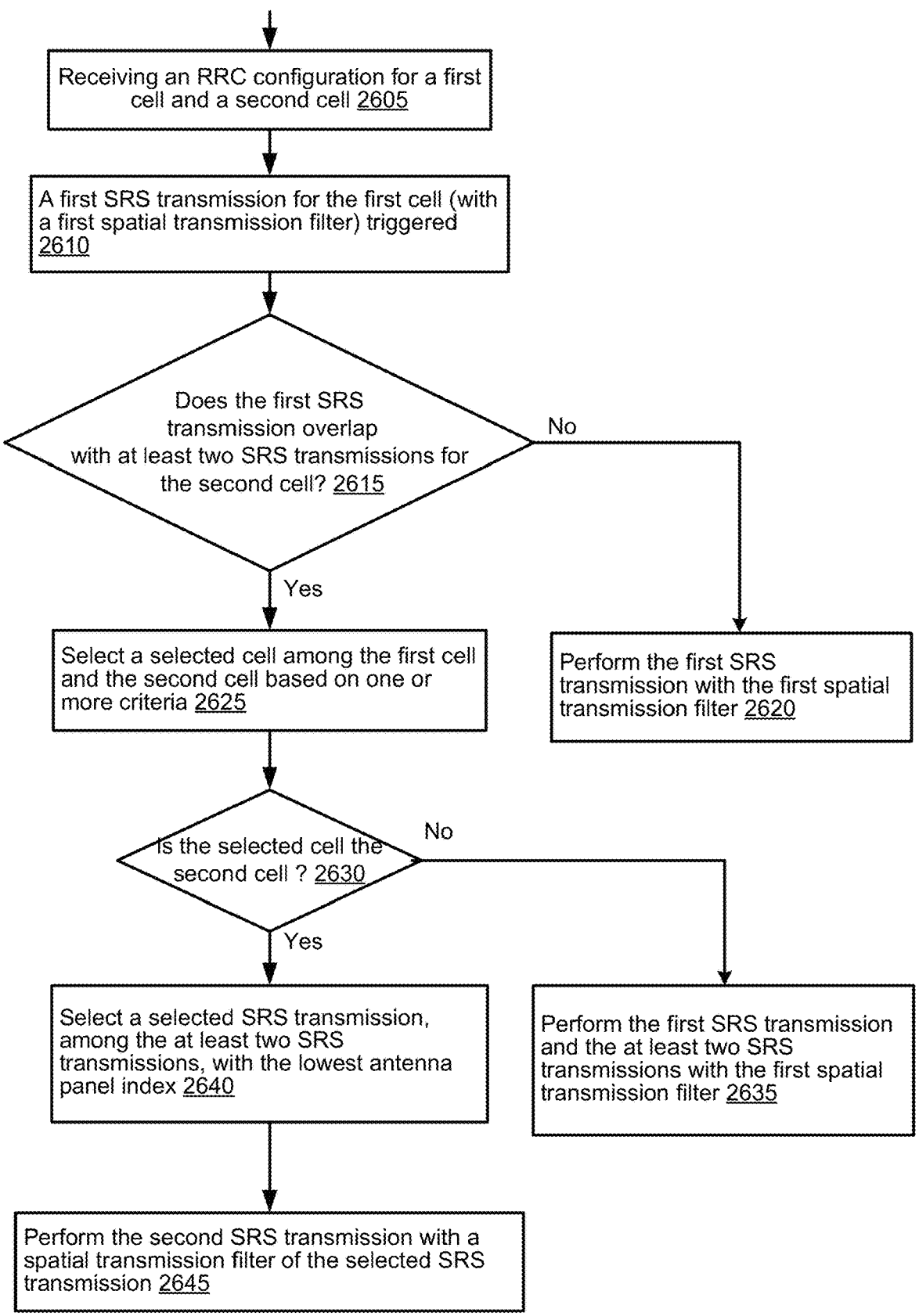
FIG. 26 shows an example method for selecting/prioritizing a beam for an SRS transmission.

FIG. 26 shows an example method for selecting/prioritizing an SRS spatial relation for an SRS transmission. At step 2605, the wireless device may receive one or more RRC configuration messages. The one or more RRC configuration messages may comprise one or more configuration parameters of a plurality of cells. At step 2610, a first SRS transmission for a first cell may be triggered (e.g., by a base station). At step 2620, the wireless device may perform the first SRS transmission (e.g., with the first spatial transmission filter) if the first SRS transmission does not overlap with at least two SRS transmissions for the second cell. At step 2625, the wireless device may determine/select a cell (e.g., selected cell) among the first cell and the second cell based on one or more criteria, for example, if the first SRS transmission overlaps with at least two SRS transmissions for the second cell. The one or more criteria may be based on for example, cell indices, SRS transmission priorities, etc. The wireless device may determine/select a cell, among the first cell and the second cell, with a lowest cell index. At step 2635, the wireless device may perform the first SRS transmission and the at least two SRS transmissions with the first spatial transmission filter, for example, if the cell (e.g., selected cell) is not the second cell. At step 2640, the wireless device may determine/select an SRS transmission (e.g., selected SRS transmission), among the at least two SRS transmissions, with the lowest antenna panel index, for example, if the cell (e.g., selected cell) is the second cell. At step 2645, the wireless device may perform the first SRS transmission with a spatial transmission filter of the selected SRS transmission.

A wireless device may perform a method comprising multiple operations. The wireless device may determine that a first sounding reference signal (SRS) resource of a first cell and a second SRS resource of the first cell overlap with a third SRS resource of a second cell. The wireless device may determine that a first spatial transmission filter of the first SRS resource and a second spatial transmission filter of the second SRS resource are different from a third spatial transmission filter of the third SRS resource. The wireless device may, based on the determining that the first SRS resource of the first cell and the second SRS resource of the first cell overlap with the third SRS resource of the second cell, and based on the determining that the first spatial transmission filter of the first SRS resource and the second spatial transmission filter of the second SRS resource are different from the third spatial transmission filter of the third SRS resource, select a spatial transmission filter from the first spatial transmission filter or the second spatial transmission filter. The wireless device may transmit via the selected spatial transmission filter, an SRS for the third SRS resource.

The wireless device may also perform one or more additional operations. The transmitting the SRS via the selected spatial transmission filter may be for estimating a channel associated with the third SRS resource that overlaps with the first SRS resource and the second SRS resource. The first SRS resource, the second SRS resource, and the third SRS resource may overlap in a time duration. The time duration may comprise at least one of: a symbol; a slot; a transmission time interval; a subframe; and a frame. The selecting the spatial filter may be based on at least one of: a first cell index of the first cell being less than a second cell index of the second cell; or the first cell index of the first cell being greater than the second cell index of the second cell. The selecting the spatial transmission filter may be based on a first SRS resource set index of a first SRS resource set comprising the first SRS resource and a second SRS resource set index of a second SRS resource set comprising the second SRS resource. The selecting the spatial transmission filter may be based on at least one of a first SRS resource type of the first SRS resource and a second SRS resource type of the second SRS resource having a higher priority than a third SRS resource type of the third SRS resource. The first SRS resource may be associated with a first antenna panel, wherein the first antenna panel is indicated by a first antenna panel index. The second SRS resource may be associated with a second antenna panel, wherein the second antenna panel is indicated by a second antenna panel index. The transmitting the third SRS via the selected spatial transmission filter may be based on the first antenna panel index and the second antenna panel index. The wireless device may drop a transmission of an SRS for a fourth SRS resource of the second cell, based on determining that a fifth SRS resource of the first cell and a sixth SRS resource of the first cell overlap with the fourth SRS resource of the second cell. The wireless device may drop a transmission of an SRS for a fourth SRS resource of the second cell, based on determining that a fifth spatial transmission filter of the fifth SRS resource and a sixth spatial transmission filter of the sixth SRS resource are different from a fourth spatial transmission filter of the fourth SRS resource.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to receive the SRS for the third SRS resource. A computer-readable medium may store instructions that, when executed, cause performance of the described method, additional operations and/or include the additional elements.

A wireless device may perform a method comprising multiple operations. The wireless device may receive one or more configuration parameters of a first cell and a second cell. The wireless device may determine that a first sounding reference signal (SRS) transmission for a first SRS resource of the first cell and a second SRS transmission for a second SRS resource of the first cell overlap a third SRS transmission for a third SRS resource of the second cell The wireless device may determine that a first spatial transmission filter of the first SRS transmission and a second spatial transmission filter of the second SRS transmission are different from a third spatial transmission filter of the third SRS transmission. The wireless device may transmit via one of the first spatial transmission filter or the second spatial transmission filter, based on the determining that the first SRS transmission and the second SRS transmission overlap the third SRS transmission, and based on the determining that the first spatial transmission filter and the second spatial transmission filter are different from the third spatial transmission filter, the third SRS transmission.

The wireless device may also perform one or more additional operations. The one or more configuration parameters may comprise at least one of a first index of the first cell and a second index of the second cell. The one or more configuration parameters may comprise at least one of a first SRS spatial relation associated with the first SRS transmission, a second SRS spatial relation associated with the second SRS transmission, and a third SRS spatial relation associated with a third SRS transmission. The transmitting the third SRS transmission may be based on at least one of the first SRS transmission and the second SRS transmission having a higher priority than the third SRS transmission. The transmitting the third SRS transmission may be based on a first SRS resource set index associated with the first SRS resource and a second SRS resource set index associated with the second SRS resource. The first SRS transmission may be associated with a first antenna panel, wherein the first antenna panel is indicated by a first antenna panel index. The second SRS transmission may be associated with a second antenna panel, wherein the second antenna panel is indicated by a second antenna panel index. The transmitting the third SRS transmission may be based on the first antenna panel index and the second antenna panel index. The wireless device may drop a fourth SRS transmission of the second cell, based on determining, by the wireless device, that a fifth SRS transmission of the first cell and a sixth SRS transmission of the first cell overlap with the fourth SRS transmission of the second cell. The wireless device may drop a fourth SRS transmission of the second cell, based on determining, by the wireless device, that a fifth spatial transmission filter of the fifth SRS transmission and a sixth spatial transmission filter of the sixth SRS transmission are different from a fourth spatial transmission filter of the fourth SRS transmission. The first spatial transmission filter and the second spatial transmission filter may be different.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to receive the third SRS transmission. A computer-readable medium may store instructions that, when executed, cause performance of the described method, additional operations and/or include the additional elements.

A wireless device may perform a method comprising multiple operations. The wireless device may transmit via a first spatial transmission filter of a first sounding reference signal (SRS) resource of a first cell, a first SRS. The wireless device may transmit via a second spatial transmission filter of a second SRS resource of the first cell, a second SRS. The wireless device may transmit via one of the first spatial transmission filter or the second spatial transmission filter, based on determining that the first SRS resource and the second SRS resource overlap with a third SRS resource of a second cell, and based on determining that the first spatial transmission filter and the second spatial transmission filter are different from a third spatial transmission filter of a third SRS of the second cell, the third SRS.

The wireless device may also perform one or more additional operations. The transmitting the third SRS may be based on at least one of the first SRS and the second SRS having a higher priority than the third SRS. The transmitting the third SRS may be based on a first SRS resource set index of a first SRS resource set comprising the first SRS resource and a second SRS resource set index of a first SRS resource set comprising the second SRS resource. The first SRS resource may be associated with a first antenna panel, wherein the first antenna panel is indicated by a first antenna panel index. The second SRS resource may be associated with a second antenna panel, wherein the second antenna panel is indicated by a second antenna panel index. The transmitting the third SRS may be based on the first antenna panel index and the second antenna panel index. The wireless device may drop a transmission of a fourth SRS for a fourth SRS resource of the second cell, based on determining, by the wireless device, that a fifth SRS resource of the first cell and a sixth SRS resource of the first cell overlap with the fourth SRS resource of the second cell. The wireless device may drop a transmission of a fourth SRS for a fourth SRS resource of the second cell, based on determining, by the wireless device, that a fifth spatial transmission filter of the first SRS resource and a sixth spatial transmission filter of the sixth SRS resource are different from a fourth spatial transmission filter of the fourth SRS resource. The first spatial transmission filter and the second spatial transmission filter may be different.

Systems, devices and media may be configured with the method. A computing device may comprise one or more processors; and memory storing instructions that, when executed, cause the computing device to perform the described method, additional operations and/or include the additional elements. A system may comprise a first computing device configured to perform the described method, additional operations and/or include the additional elements; and a second computing device configured to receive the third SRS. A computer-readable medium may store instructions that, when executed, cause performance of the described method, additional operations and/or include the additional elements.

Figure 27:
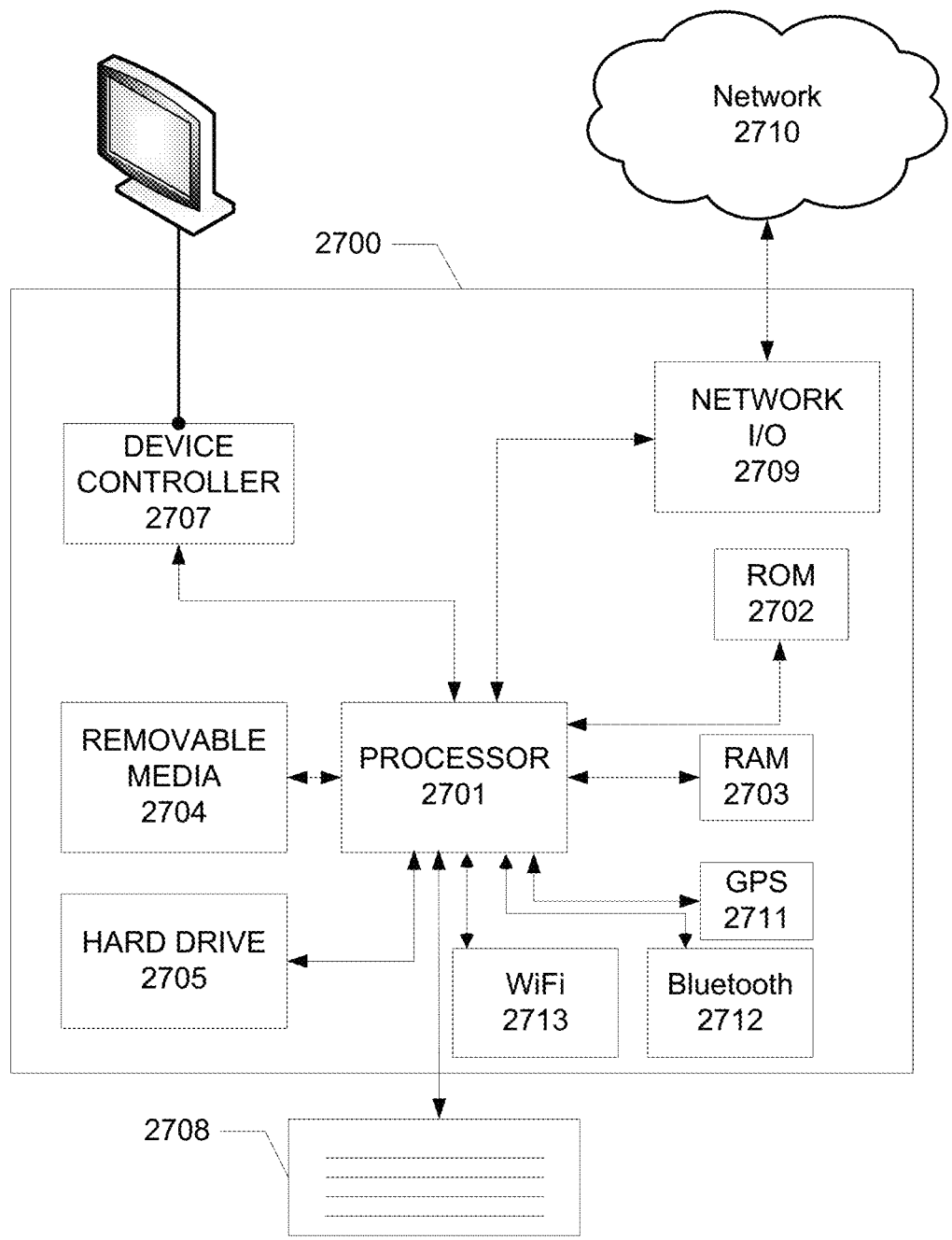
FIG. 27 shows example elements of a computing device that may be used to implement any of the various devices described herein.

FIG. 27 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 2700 may include one or more processors 2701, which may execute instructions stored in the random-access memory (RAM) 2703, the removable media 2704 (such as a Universal Serial Bus (USB) drive, compact disk (CD) or digital versatile disk (DVD), or floppy disk drive), or any other desired storage medium. Instructions may also be stored in an attached (or internal) hard drive 2705. The computing device 2700 may also include a security processor (not shown), which may execute instructions of one or more computer programs to monitor the processes executing on the processor 2701 and any process that requests access to any hardware and/or software components of the computing device 2700 (e.g., ROM 2702, RAM 2703, the removable media 2704, the hard drive 2705, the device controller 2707, a network interface 2709, a GPS 2711, a Bluetooth interface 2712, a WiFi interface 2713, etc.). The computing device 2700 may include one or more output devices, such as the display 2706 (e.g., a screen, a display device, a monitor, a television, etc.), and may include one or more output device controllers 2707, such as a video processor. There may also be one or more user input devices 2708, such as a remote control, keyboard, mouse, touch screen, microphone, etc. The computing device 2700 may also include one or more network interfaces, such as a network interface 2709, which may be a wired interface, a wireless interface, or a combination of the two. The network interface 2709 may provide an interface for the computing device 2700 to communicate with a network 2710 (e.g., a RAN, or any other network). The network interface 2709 may include a modem (e.g., a cable modem), and the external network 2710 may include communication links, an external network, an in-home network, a provider's wireless, coaxial, fiber, or hybrid fiber/coaxial distribution system (e.g., a DOCSIS network), or any other desired network. Additionally, the computing device 2700 may include a location-detecting device, such as a global positioning system (GPS) microprocessor 2711, which may be configured to receive and process global positioning signals and determine, with possible assistance from an external server and antenna, a geographic position of the computing device 2700.

The example in FIG. 27 may be a hardware configuration, although the components shown may be implemented as software as well. Modifications may be made to add, remove, combine, divide, etc. components of the computing device 2700 as desired. Additionally, the components may be implemented using basic computing devices and components, and the same components (e.g., processor 2701, ROM storage 2702, display 2706, etc.) may be used to implement any of the other computing devices and components described herein. For example, the various components described herein may be implemented using computing devices having components such as a processor executing computer-executable instructions stored on a computer-readable medium, as shown in FIG. 27. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
   triggering:
      a first sounding reference signal (SRS) transmission via a first SRS resource of a first cell;
      a second SRS transmission via a second SRS resource of the first cell; and
      a third SRS transmission via a third SRS resource of a second cell, wherein the first SRS resource, the second SRS resource, and the third SRS resource overlap in at least one symbol; and
   transmitting:
      the first SRS transmission via a first spatial domain filter based on the first SRS resource;
      the second SRS transmission via a second spatial domain filter based on the second SRS resource; and
      the third SRS transmission via the first spatial domain filter, wherein the first spatial domain filter is used for the third SRS transmission based on a first SRS resource index of the first SRS resource being lower than a second SRS resource index of the second SRS resource.

2. The method of claim 1, wherein the first spatial domain filter is used for the third SRS transmission based on:
the first SRS resource index of the first SRS resource being lower than the second SRS resource index of the second SRS resource; and
a first cell index of the first cell being lower than a second cell index of the second cell.

3. The method of claim 2, wherein:
an SRS transmission type of the first SRS transmission and an SRS transmission type of the second SRS transmission are the same; and
each of the SRS transmission type of the first SRS transmission and the SRS transmission type of the second SRS transmission is:
an aperiodic SRS transmission;
a semi-persistent SRS transmission; or
a periodic SRS transmission.

4. The method of claim 1, wherein:
SRS transmission types of the first SRS transmission and the second SRS transmission are different; and
the SRS transmission types comprise any two of:
aperiodic SRS transmissions;
semi-persistent SRS transmissions; and
periodic SRS transmissions.

5. The method of claim 4, wherein the first spatial domain filter is used for the third SRS transmission based on a priority of an SRS transmission type of the first SRS transmission being higher than a priority of an SRS transmission type of the second SRS transmission.

6. The method of claim 5, wherein a priority of the semi-persistent SRS transmissions is:
lower than a priority of the aperiodic SRS transmissions; and
higher than a priority of the periodic SRS transmissions.

7. The method of claim 6, wherein the first spatial domain filter is used for the third SRS transmission based on at least one of:
the priority of an SRS transmission type of the first SRS transmission being higher than the priority of an SRS transmission type of the second SRS transmission; and
a first cell index of the first cell being lower than a second cell index of the second cell.

8. A wireless device comprising:
one or more processors; and
memory storing instructions that, when executed by the one or more processors, cause the wireless device to:
trigger:
a first sounding reference signal (SRS) transmission via a first SRS resource of a first cell;
a second SRS transmission via a second SRS resource of the first cell; and
a third SRS transmission via a third SRS resource of a second cell, wherein the first SRS resource, the second SRS resource, and the third SRS resource overlap in at least one symbol; and
transmit:
the first SRS transmission via a first spatial domain filter based on the first SRS resource;
the second SRS transmission via a second spatial domain filter based on the second SRS resource; and
the third SRS transmission via the first spatial domain filter, wherein the first spatial domain filter is used for the third SRS transmission based on a first SRS resource index of the first SRS resource being lower than a second SRS resource index of the second SRS resource.

9. The wireless device of claim 8, wherein the first spatial domain filter is used for the third SRS transmission based on:
the first SRS resource index of the first SRS resource being lower than the second SRS resource index of the second SRS resource; and
a first cell index of the first cell being lower than a second cell index of the second cell.

10. The wireless device of claim 9, wherein:
an SRS transmission type of the first SRS transmission and an SRS transmission type of the second SRS transmission is the same; and
each of the SRS transmission type of the first SRS transmission and the SRS transmission type of the second SRS transmission is:
an aperiodic SRS transmission;
a semi-persistent SRS transmission; or
a periodic SRS transmission.

11. The wireless device of claim 8, wherein:
SRS transmission types of the first SRS transmission and the second SRS transmission are different; and
the SRS transmission types comprise any two of:
aperiodic SRS transmissions;
semi-persistent SRS transmissions; and
periodic SRS transmissions.

12. The wireless device of claim 11, wherein the first spatial domain filter is used for the third SRS transmission based on at least one of:
a priority of an SRS transmission type of the first SRS transmission being higher than a priority of an SRS transmission type of the second SRS transmission; and
a first cell index of the first cell being lower than a second cell index of the second cell.

13. The wireless device of claim 12, wherein a priority of the semi-persistent SRS transmissions is:
lower than a priority of the aperiodic SRS transmissions; and
higher than a priority of the periodic SRS transmissions.

14. A non-transitory computer-readable medium comprising instructions that, when executed by one or more processors of a wireless device, cause the wireless device to:
trigger:
a first sounding reference signal (SRS) transmission via a first SRS resource of a first cell;
a second SRS transmission via a second SRS resource of the first cell; and
a third SRS transmission via a third SRS resource of a second cell, wherein the first SRS resource, the second SRS resource, and the third SRS resource overlap in at least one symbol; and
transmit:
the first SRS transmission via a first spatial domain filter based on the first SRS resource;
the second SRS transmission via a second spatial domain filter based on the second SRS resource; and
the third SRS transmission via the first spatial domain filter, wherein the first spatial domain filter is used for the third SRS transmission based on a first SRS resource index of the first SRS resource being lower than a second SRS resource index of the second SRS resource.

15. The non-transitory computer-readable medium of claim 14, wherein the first spatial domain filter is used for the third SRS transmission based on:
- the first SRS resource index of the first SRS resource being lower than the second SRS resource index of the second SRS resource; and
- a first cell index of the first cell being lower than a second cell index of the second cell.

16. The non-transitory computer-readable medium of claim 15, wherein:
- an SRS transmission type of the first SRS transmission and an SRS transmission type of the second SRS transmission are the same; and
- each of the SRS transmission type of the first SRS transmission and the SRS transmission type of the second SRS transmission is:
  - an aperiodic SRS transmission;
  - a semi-persistent SRS transmission; or
  - a periodic SRS transmission.

17. The non-transitory computer-readable medium of claim 14, wherein:
- SRS transmission types of the first SRS transmission and the second SRS transmission are different; and
- the SRS transmission types comprise any two of:
  - aperiodic SRS transmissions;
  - semi-persistent SRS transmissions; and
  - periodic SRS transmissions.

18. The non-transitory computer-readable medium of claim 17, wherein the first spatial domain filter is used for the third SRS transmission based on at least one of:
- a priority of an SRS transmission type of the first SRS transmission being higher than a priority of an SRS transmission type of the second SRS transmission; and
- a first cell index of the first cell being lower than a second cell index of the second cell.

* * * * *